United States Patent
Forbes et al.

(10) Patent No.: US 11,180,690 B2
(45) Date of Patent: Nov. 23, 2021

(54) DILUTED MICROEMULSIONS WITH LOW SURFACE TENSIONS

(71) Applicant: Flotek Chemistry, LLC, Houston, TX (US)

(72) Inventors: Natalie Forbes, Houston, TX (US); James Silas, Cypress, TX (US); Randal M. Hill, The Woodlands, TX (US)

(73) Assignee: Flotek Chemistry, LLC, Houston, TX (US)

( * ) Notice: Subject to any disclaimer, the term of this patent is extended or adjusted under 35 U.S.C. 154(b) by 0 days.

(21) Appl. No.: 16/430,898

(22) Filed: Jun. 4, 2019

(65) Prior Publication Data

US 2019/0284467 A1 Sep. 19, 2019

Related U.S. Application Data

(63) Continuation-in-part of application No. 16/267,032, filed on Feb. 4, 2019, now Pat. No. 10,738,235, which
(Continued)

(51) Int. Cl.
*C09K 8/60* (2006.01)
*C09K 8/72* (2006.01)
(Continued)

(52) U.S. Cl.
CPC ............... *C09K 8/602* (2013.01); *C09K 8/26* (2013.01); *C09K 8/40* (2013.01); *C09K 8/604* (2013.01);
(Continued)

(58) Field of Classification Search
CPC . C09K 8/602; C09K 8/26; C09K 8/40; C09K 8/604; C09K 8/68; C09K 8/70; C09K 8/72; C09K 8/86; C09K 8/90; E21B 43/26
See application file for complete search history.

(56) References Cited

U.S. PATENT DOCUMENTS 3,060,210 A 4/1961 De Groote
3,047,062 A 7/1962 Meadors
(Continued)

FOREIGN PATENT DOCUMENTS

CN 102127414 A 7/2011
CN 102277143 B 12/2011
(Continued)

OTHER PUBLICATIONS

International Search Report and Written Opinion for Application No. PCT/US2014/042326 dated Oct. 17, 2014.
(Continued)

*Primary Examiner* — Crystal J Miller
(74) *Attorney, Agent, or Firm* — Wolf, Greenfield & Sacks, P.C.

(57) ABSTRACT

Compositions relating to microemulsions or diluted microemulsions for treating gas wells having wellbores and methods related to treating gas wells having wellbores using the same are generally provided. In some embodiments, the microemulsions or diluted microemulsions have an especially low surface tension at a gas well bottom hole temperature and pressure.

21 Claims, 18 Drawing Sheets

Related U.S. Application Data is a continuation of application No. 15/071,332, filed on Mar. 16, 2016, now Pat. No. 10,196,557, which is a continuation of application No. 13/918,155, filed on Jun. 14, 2013, now Pat. No. 9,321,955, application No. 16/430,898, which is a continuation-in-part of application No. 15/869,406, filed on Jan. 12, 2018, now Pat. No. 10,731,071, which is a continuation of application No. 14/644,351, filed on Mar. 11, 2015, now Pat. No. 9,868,893, which is a continuation-in-part of application No. 14/489,437, filed on Sep. 17, 2014, now Pat. No. 10,000,693, which is a continuation-in-part of application No. 14/212,763, filed on Mar. 14, 2014, now Pat. No. 9,884,988, which is a continuation-in-part of application No. 13/918,155, and a continuation-in-part of application No. 13/918,166, filed on Jun. 14, 2013, now abandoned, and a continuation-in-part of application No. 13/829,495, filed on Mar. 14, 2013, now Pat. No. 9,428,683, and a continuation-in-part of application No. 13/829,434, filed on Mar. 14, 2013, now Pat. No. 9,068,108, said application No. 14/644,351 is a continuation-in-part of application No. 14/212,763.

(60) Provisional application No. 62/680,457, filed on Jun. 4, 2018, provisional application No. 61/946,176, filed on Feb. 28, 2014.

(51) Int. Cl.

| | |
|---|---|
| *C09K 8/70* | (2006.01) |
| *C09K 8/40* | (2006.01) |
| *C09K 8/86* | (2006.01) |
| *C09K 8/68* | (2006.01) |
| *C09K 8/90* | (2006.01) |
| *C09K 8/26* | (2006.01) |
| *E21B 43/26* | (2006.01) |

(52) U.S. Cl.
CPC ............... *C09K 8/68* (2013.01); *C09K 8/70* (2013.01); *C09K 8/72* (2013.01); *C09K 8/86* (2013.01); *C09K 8/90* (2013.01); *E21B 43/26* (2013.01)

(56) References Cited

U.S. PATENT DOCUMENTS

| | | |
|---|---|---|
| 3,347,789 A | 10/1967 | Dickson et al. |
| 3,368,624 A | 2/1968 | Heuer et al. |
| 3,483,923 A | 12/1969 | Darley |
| 3,710,865 A | 1/1973 | Kiel |
| 3,756,319 A | 9/1973 | Holm et al. |
| 3,760,881 A | 9/1973 | Kiel |
| 3,850,248 A | 11/1974 | Carney |
| 3,865,544 A | 2/1975 | Keil |
| 3,919,411 A | 11/1975 | Glass et al. |
| 3,981,361 A | 9/1976 | Healy |
| 4,005,020 A | 1/1977 | McCormick |
| 4,122,029 A | 10/1978 | Gee et al. |
| 4,146,499 A | 3/1979 | Rosano |
| 4,206,809 A | 6/1980 | Jones |
| 4,233,165 A | 11/1980 | Salathiel et al. |
| 4,276,935 A | 7/1981 | Hessert et al. |
| 4,360,061 A | 11/1982 | Canter et al. |
| 4,381,241 A | 4/1983 | Romenesko et al. |
| 4,414,128 A | 11/1983 | Goffinet |
| 4,421,656 A * | 12/1983 | Donatelli ............... C08L 83/04 507/127 |
| 4,442,043 A | 4/1984 | McCoy et al. |
| 4,472,291 A | 9/1984 | Rosano |
| 4,511,488 A | 4/1985 | Matta |
| 4,650,000 A | 3/1987 | Andreasson et al. |
| 4,698,178 A | 10/1987 | Huettinger et al. |
| 4,708,753 A | 11/1987 | Forsberg |
| 4,738,789 A | 4/1988 | Jones |
| 4,844,756 A | 7/1989 | Forsberg |
| 5,008,026 A | 4/1991 | Gardner et al. |
| 5,034,140 A | 7/1991 | Gardner et al. |
| 5,076,954 A | 12/1991 | Loth et al. |
| 5,083,613 A | 1/1992 | Gregoli et al. |
| 5,095,989 A | 3/1992 | Prukop |
| 5,213,624 A | 5/1993 | Williams |
| 5,217,531 A | 6/1993 | Cheung |
| 5,247,995 A | 9/1993 | Tjon-Joe-Pin et al. |
| 5,292,503 A | 3/1994 | Raleigh et al. |
| 5,310,002 A | 5/1994 | Blauch et al. |
| 5,356,482 A | 10/1994 | Mehta et al. |
| 5,547,022 A | 8/1996 | Juprasert et al. |
| 5,567,675 A | 10/1996 | Romocki |
| 5,587,354 A | 12/1996 | Duncan, Jr. |
| 5,587,357 A | 12/1996 | Rhinesmith |
| 5,604,195 A | 2/1997 | Misselyn et al. |
| 5,634,984 A | 6/1997 | Van Slyke |
| 5,652,200 A | 7/1997 | Davies et al. |
| 5,665,689 A | 9/1997 | Durbut |
| 5,676,763 A | 10/1997 | Salisbury et al. |
| 5,697,458 A | 12/1997 | Carney |
| 5,707,940 A | 1/1998 | Bush et al. |
| 5,723,423 A | 3/1998 | Van Slyke |
| 5,762,138 A | 6/1998 | Ford et al. |
| 5,780,407 A | 7/1998 | Van Slyke |
| 5,784,386 A | 7/1998 | Norris |
| 5,788,781 A | 8/1998 | Van Slyke |
| 5,811,383 A | 9/1998 | Klier et al. |
| 5,830,831 A | 11/1998 | Chan et al. |
| 5,874,386 A | 2/1999 | Chan et al. |
| 5,925,233 A | 7/1999 | Miller et al. |
| 5,942,469 A | 8/1999 | Juprasert et al. |
| 5,975,206 A | 11/1999 | Woo et al. |
| 5,977,032 A | 11/1999 | Chan |
| 5,990,072 A | 11/1999 | Gross et al. |
| 5,996,692 A | 12/1999 | Chan et al. |
| 6,046,140 A | 4/2000 | Woo et al. |
| 6,090,754 A | 7/2000 | Chan et al. |
| 6,110,885 A | 8/2000 | Chan |
| 6,112,814 A | 9/2000 | Chan et al. |
| 6,165,946 A | 12/2000 | Mueller et al. |
| 6,173,776 B1 | 1/2001 | Furman et al. |
| 6,191,090 B1 | 2/2001 | Mondin et al. |
| 6,228,830 B1 | 5/2001 | Vlasblom |
| 6,260,621 B1 | 7/2001 | Furman et al. |
| 6,302,209 B1 | 10/2001 | Thompson, Sr. et al. |
| 6,364,020 B1 | 4/2002 | Crawshaw et al. |
| 6,486,115 B1 | 11/2002 | Weaver et al. |
| 6,566,410 B1 | 5/2003 | Zaki et al. |
| 6,581,687 B2 | 6/2003 | Collins et al. |
| 6,593,279 B2 | 7/2003 | Von Krosigk et al. |
| 6,613,720 B1 | 9/2003 | Feraud et al. |
| 6,652,867 B1 | 11/2003 | Vincent et al. |
| 6,729,402 B2 | 5/2004 | Chang et al. |
| 6,770,603 B1 | 8/2004 | Sawdon et al. |
| 6,793,025 B2 | 9/2004 | Patel et al. |
| 6,800,593 B2 | 10/2004 | Dobson, Jr. et al. |
| 6,818,595 B2 | 11/2004 | Benton et al. |
| 6,911,417 B2 | 6/2005 | Chan et al. |
| 6,914,040 B2 | 7/2005 | Deak et al. |
| 6,939,832 B2 | 9/2005 | Collins |
| 6,984,610 B2 | 1/2006 | VonKrosigk et al. |
| 6,998,424 B2 | 2/2006 | Feng et al. |
| 7,021,378 B2 | 4/2006 | Prukop |
| 7,134,496 B2 | 11/2006 | Jones et al. |
| 7,205,262 B2 | 4/2007 | Schwartz et al. |
| 7,205,264 B2 | 4/2007 | Boles |
| 7,231,976 B2 | 6/2007 | Berry et al. |
| 7,380,606 B2 | 6/2008 | Pursley et al. |
| 7,392,844 B2 | 7/2008 | Berry et al. |
| 7,407,915 B2 | 8/2008 | Jones et al. |
| 7,468,402 B2 | 12/2008 | Yang et al. |
| 7,481,273 B2 | 1/2009 | Javora et al. |
| 7,514,390 B2 | 4/2009 | Chan |

(56) References Cited

U.S. PATENT DOCUMENTS

| | | |
|---|---|---|
| 7,514,391 B2 | 4/2009 | Chan |
| 7,533,723 B2 | 5/2009 | Hughes et al. |
| 7,543,644 B2 | 6/2009 | Huang et al. |
| 7,543,646 B2 | 6/2009 | Huang et al. |
| 7,544,639 B2 | 6/2009 | Pursley et al. |
| 7,547,665 B2 | 6/2009 | Welton et al. |
| 7,552,771 B2 | 6/2009 | Eoff et al. |
| 7,559,369 B2 | 7/2009 | Roddy et al. |
| 7,581,594 B2 | 9/2009 | Tang |
| 7,615,516 B2 | 11/2009 | Yang et al. |
| 7,621,334 B2 | 11/2009 | Welton et al. |
| 7,622,436 B2 | 11/2009 | Tuzi et al. |
| 7,655,603 B2 | 2/2010 | Crews |
| 7,677,311 B2 | 3/2010 | Abad et al. |
| 7,687,439 B2 | 3/2010 | Jones et al. |
| 7,709,421 B2 | 5/2010 | Jones et al. |
| 7,712,534 B2 | 5/2010 | Bryant et al. |
| 7,727,936 B2 | 6/2010 | Pauls et al. |
| 7,727,937 B2 | 6/2010 | Pauls et al. |
| 7,730,958 B2 | 6/2010 | Smith |
| 7,754,657 B2 | 7/2010 | Trimble et al. |
| 7,825,073 B2 | 11/2010 | Welton et al. |
| 7,833,943 B2 | 11/2010 | Van Zanten et al. |
| 7,838,467 B2 | 11/2010 | Jones et al. |
| 7,846,877 B1 | 12/2010 | Robb |
| 7,851,414 B2 | 12/2010 | Yang et al. |
| 7,855,168 B2 | 12/2010 | Fuller et al. |
| 7,857,051 B2 | 12/2010 | Abad et al. |
| 7,886,824 B2 | 2/2011 | Kakadjian et al. |
| 7,893,010 B2 * | 2/2011 | Ali .................... C09K 8/602 166/305.1 |
| 7,902,123 B2 | 3/2011 | Harrison et al. |
| 7,906,464 B2 | 3/2011 | Davidson |
| 7,910,524 B2 | 3/2011 | Welton et al. |
| 7,931,088 B2 | 4/2011 | Stegemoeller et al. |
| 7,960,314 B2 | 6/2011 | Van Zanten et al. |
| 7,960,315 B2 | 6/2011 | Welton et al. |
| 7,963,720 B2 | 6/2011 | Hoag et al. |
| 7,971,659 B2 | 7/2011 | Gatlin et al. |
| 7,976,241 B2 | 7/2011 | Hoag et al. |
| 7,989,404 B2 | 8/2011 | Kakdjian et al. |
| 7,992,656 B2 | 8/2011 | Dusterhoft et al. |
| 7,998,911 B1 | 8/2011 | Berger et al. |
| 8,043,996 B2 | 10/2011 | Harris |
| 8,053,396 B2 | 11/2011 | Huff et al. |
| 8,053,397 B2 | 11/2011 | Huang et al. |
| 8,057,682 B2 | 11/2011 | Hoag et al. |
| 8,091,644 B2 | 1/2012 | Clark et al. |
| 8,091,645 B2 | 1/2012 | Quintero et al. |
| 8,091,646 B2 | 1/2012 | Quintero et al. |
| 8,100,190 B2 | 1/2012 | Weaver et al. |
| 8,101,812 B2 | 1/2012 | Fan et al. |
| 8,148,303 B2 | 4/2012 | Van Zanten et al. |
| 8,163,678 B2 | 4/2012 | Campbell et al. |
| 8,183,182 B2 | 5/2012 | Oliveira et al. |
| 8,206,062 B2 | 6/2012 | Hoag et al. |
| 8,207,096 B2 | 6/2012 | van Zanten et al. |
| 8,210,263 B2 | 7/2012 | Quintero et al. |
| 8,220,546 B2 | 7/2012 | Kakadjian et al. |
| 8,227,382 B2 | 7/2012 | Dakin et al. |
| 8,231,947 B2 | 7/2012 | Vaidya et al. |
| 8,235,120 B2 | 8/2012 | Quintero et al. |
| 8,242,059 B2 | 8/2012 | Sawdon |
| 8,293,687 B2 | 10/2012 | Giffin |
| 8,342,241 B2 | 1/2013 | Hartshorne et al. |
| 8,349,771 B2 | 1/2013 | Seth et al. |
| 8,356,667 B2 | 1/2013 | Quintero et al. |
| 8,357,639 B2 | 1/2013 | Quintero et al. |
| 8,372,789 B2 | 2/2013 | Harris et al. |
| 8,383,560 B2 | 2/2013 | Pich et al. |
| 8,403,051 B2 | 3/2013 | Huang et al. |
| 8,404,623 B2 | 3/2013 | Robb et al. |
| 8,413,721 B2 | 4/2013 | Welton et al. |
| 8,415,279 B2 | 4/2013 | Quintero et al. |
| 8,431,620 B2 | 4/2013 | Del Gaudio et al. |
| 8,453,741 B2 | 6/2013 | van Zanten |
| 8,499,832 B2 | 8/2013 | Crews et al. |
| 8,517,100 B2 | 8/2013 | Ali et al. |
| 8,517,104 B2 | 8/2013 | Kieffer |
| 8,524,643 B2 | 9/2013 | Huff et al. |
| 8,551,926 B2 | 10/2013 | Huang et al. |
| 8,592,350 B2 | 11/2013 | van Zanten et al. |
| 8,618,025 B2 | 12/2013 | Webber |
| 8,684,079 B2 | 4/2014 | Wattenbarger et al. |
| 8,778,850 B2 | 7/2014 | Andrecola |
| 8,865,632 B1 | 10/2014 | Parnell et al. |
| 8,916,508 B2 | 12/2014 | Parnell et al. |
| 9,004,167 B2 | 4/2015 | Luyster et al. |
| 9,068,108 B2 | 6/2015 | Hill et al. |
| 9,096,755 B2 | 8/2015 | Chari et al. |
| 9,102,860 B2 | 8/2015 | Cawiezel et al. |
| 9,200,192 B2 | 12/2015 | Zelenev et al. |
| 9,222,013 B1 | 12/2015 | Champagne et al. |
| 9,321,955 B2 | 4/2016 | Penny et al. |
| 9,428,683 B2 | 8/2016 | Hill et al. |
| 9,464,223 B2 | 10/2016 | Champagne et al. |
| 9,505,970 B2 | 11/2016 | Vaughn et al. |
| 9,790,414 B2 | 10/2017 | Champagne et al. |
| 9,809,741 B2 | 11/2017 | Hill et al. |
| 9,850,418 B2 | 12/2017 | Champagne et al. |
| 9,868,893 B2 | 1/2018 | Saboowala et al. |
| 9,884,988 B2 | 2/2018 | Dismuke et al. |
| 9,890,624 B2 | 2/2018 | Portwood |
| 9,890,625 B2 | 2/2018 | Portwood et al. |
| 9,951,264 B2 | 4/2018 | Penny et al. |
| 9,957,779 B2 | 5/2018 | Fursdon-Welsh et al. |
| 9,994,762 B2 | 6/2018 | Hill et al. |
| 10,000,693 B2 | 6/2018 | Hill et al. |
| 10,005,948 B2 | 6/2018 | Champagne et al. |
| 10,053,619 B2 | 8/2018 | Saboowala et al. |
| 10,081,760 B2 | 9/2018 | Ngantung et al. |
| 10,087,361 B2 | 10/2018 | Hill et al. |
| 10,144,862 B2 | 12/2018 | Zelenev et al. |
| 10,196,557 B2 | 2/2019 | Hill et al. |
| 10,280,360 B2 | 5/2019 | Champagne et al. |
| 10,287,483 B2 | 5/2019 | Saboowala et al. |
| 10,294,757 B2 | 5/2019 | Fursdon-Welsh et al. |
| 10,294,764 B2 | 5/2019 | Champagne et al. |
| 10,308,859 B2 | 6/2019 | Champagne et al. |
| 10,421,707 B2 | 9/2019 | Trabelsi et al. |
| 10,544,355 B2 | 1/2020 | Hill et al. |
| 10,577,531 B2 | 3/2020 | Pursley et al. |
| 10,590,332 B2 | 3/2020 | Penny et al. |
| 2001/0007663 A1 | 7/2001 | Von Corswant |
| 2003/0022944 A1 | 1/2003 | Gumkowski et al. |
| 2003/0069143 A1 | 4/2003 | Collins |
| 2003/0143176 A1 | 7/2003 | Liu et al. |
| 2003/0166472 A1 | 9/2003 | Pursley et al. |
| 2003/0232095 A1 | 12/2003 | Garti et al. |
| 2005/0142087 A1 * | 6/2005 | Liu .................... A61K 8/06 424/66 |
| 2005/0209107 A1 | 9/2005 | Pursley et al. |
| 2006/0014648 A1 | 1/2006 | Milson et al. |
| 2006/0211593 A1 | 9/2006 | Smith et al. |
| 2006/0223715 A1 | 10/2006 | Svodboda et al. |
| 2006/0258541 A1 | 11/2006 | Crews |
| 2007/0039732 A1 | 2/2007 | Dawson et al. |
| 2007/0123445 A1 | 5/2007 | Tuzi et al. |
| 2007/0293404 A1 | 12/2007 | Hutchins et al. |
| 2007/0295368 A1 | 12/2007 | Harrison et al. |
| 2008/0020949 A1 | 1/2008 | Trimble et al. |
| 2008/0064614 A1 | 3/2008 | Ahrenst et al. |
| 2008/0153929 A1 * | 6/2008 | Miyahara ............ A61K 8/068 516/55 |
| 2008/0274918 A1 | 11/2008 | Quintero et al. |
| 2008/0287324 A1 | 11/2008 | Pursley et al. |
| 2009/0078415 A1 | 3/2009 | Fan et al. |
| 2009/0078612 A1 | 3/2009 | Fan et al. |
| 2009/0111717 A1 | 4/2009 | Campbell et al. |
| 2009/0120642 A1 | 5/2009 | Eoff et al. |
| 2009/0137432 A1 | 5/2009 | Sullivan et al. |
| 2009/0159288 A1 | 6/2009 | Horvath Szabo et al. |
| 2009/0192234 A1 | 7/2009 | Saxena et al. |
| 2009/0200033 A1 | 8/2009 | Kakadjian et al. |

(56) References Cited

U.S. PATENT DOCUMENTS

| | | |
|---|---|---|
| 2009/0221456 A1 | 9/2009 | Harrison et al. |
| 2009/0260819 A1 | 10/2009 | Kurian et al. |
| 2009/0275488 A1 | 11/2009 | Zamora et al. |
| 2009/0281004 A1 | 11/2009 | Ali et al. |
| 2009/0325826 A1 | 12/2009 | Quintero et al. |
| 2010/0022421 A1 | 1/2010 | Gutierrez et al. |
| 2010/0173805 A1 | 7/2010 | Pomerleau |
| 2010/0210745 A1 | 8/2010 | McDaniel et al. |
| 2010/0216670 A1 | 8/2010 | Del Gaudio et al. |
| 2010/0243248 A1 | 9/2010 | Golomb et al. |
| 2010/0252267 A1 | 10/2010 | Harris et al. |
| 2010/0263863 A1 | 10/2010 | Quintero et al. |
| 2010/0272765 A1 | 10/2010 | Ho et al. |
| 2010/0298173 A1 | 11/2010 | Smith et al. |
| 2010/0307757 A1 | 12/2010 | Blow et al. |
| 2011/0021386 A1 | 1/2011 | Ali et al. |
| 2011/0105369 A1 | 5/2011 | Reddy |
| 2011/0136706 A1 | 6/2011 | Carroll et al. |
| 2011/0146983 A1 | 6/2011 | Sawdon |
| 2011/0183872 A1 | 7/2011 | Kakadjian et al. |
| 2011/0190174 A1 | 8/2011 | Weerasooriya et al. |
| 2011/0220353 A1 | 9/2011 | Bittner et al. |
| 2011/0237467 A1 | 9/2011 | Cornette et al. |
| 2011/0253365 A1 | 10/2011 | Crews et al. |
| 2011/0257051 A1 | 10/2011 | Welton et al. |
| 2011/0290491 A1 | 12/2011 | Gupta et al. |
| 2012/0004146 A1 | 1/2012 | Van Zanten et al. |
| 2012/0015852 A1 | 1/2012 | Quintero et al. |
| 2012/0035085 A1 | 2/2012 | Parnell et al. |
| 2012/0067575 A1 | 3/2012 | Luyster et al. |
| 2012/0071366 A1 | 3/2012 | Falana et al. |
| 2012/0080232 A1 | 4/2012 | Muller et al. |
| 2012/0129738 A1 | 5/2012 | Gupta et al. |
| 2012/0149626 A1 | 6/2012 | Fluck et al. |
| 2012/0157351 A1 | 6/2012 | Webber |
| 2012/0168165 A1 | 7/2012 | Holcomb et al. |
| 2012/0181019 A1 | 7/2012 | Saini et al. |
| 2012/0193095 A1 | 8/2012 | Varadaraj et al. |
| 2012/0208726 A1 | 8/2012 | Smith et al. |
| 2012/0234548 A1 | 9/2012 | Dyer |
| 2012/0241155 A1 | 9/2012 | Ali et al. |
| 2012/0241220 A1 | 9/2012 | Quintero et al. |
| 2012/0255887 A1 | 10/2012 | Holms et al. |
| 2012/0261120 A1 | 10/2012 | Del Gaudio et al. |
| 2012/0285690 A1 | 11/2012 | Weaver et al. |
| 2012/0285694 A1 | 11/2012 | Morvan et al. |
| 2012/0318504 A1 | 12/2012 | Fan et al. |
| 2012/0318515 A1* | 12/2012 | Cawiezel ............ C09K 8/035 166/310 |
| 2012/0322697 A1 | 12/2012 | Zhang |
| 2012/0325492 A1 | 12/2012 | Fefer et al. |
| 2013/0029883 A1 | 1/2013 | Dismuke et al. |
| 2013/0029884 A1* | 1/2013 | Malchesky ........... C09K 8/605 507/219 |
| 2013/0048281 A1 | 2/2013 | Van Zanten et al. |
| 2013/0079255 A1 | 3/2013 | Del Gaudio et al. |
| 2013/0109597 A1 | 5/2013 | Sarkar et al. |
| 2013/0133886 A1 | 5/2013 | Quintero |
| 2013/0137611 A1 | 5/2013 | Pierce et al. |
| 2013/0146288 A1 | 6/2013 | Smith et al. |
| 2013/0146545 A1 | 6/2013 | Pabalan et al. |
| 2013/0153232 A1 | 6/2013 | Bobier et al. |
| 2013/0153234 A1 | 6/2013 | Bobier et al. |
| 2013/0192826 A1 | 8/2013 | Kurian et al. |
| 2013/0197108 A1 | 8/2013 | Koczo et al. |
| 2013/0213659 A1* | 8/2013 | Luyster ................ C09K 8/528 166/312 |
| 2013/0233559 A1 | 9/2013 | van Zanten et al. |
| 2013/0244913 A1 | 9/2013 | Maberry et al. |
| 2013/0261033 A1 | 10/2013 | Nguyen |
| 2013/0267570 A1 | 10/2013 | Premahandran et al. |
| 2013/0292121 A1 | 11/2013 | Penny et al. |
| 2014/0005079 A1 | 1/2014 | Dahanayake et al. |
| 2014/0090896 A1 | 4/2014 | Wagle et al. |
| 2014/0094393 A1 | 4/2014 | Webber |
| 2014/0106991 A1 | 4/2014 | Acosta et al. |
| 2014/0110344 A1 | 4/2014 | Hoag et al. |
| 2014/0127320 A1* | 5/2014 | Salamone .......... A61K 31/4174 424/618 |
| 2014/0202700 A1 | 7/2014 | Blair |
| 2014/0260466 A1 | 9/2014 | Rehage |
| 2014/0262261 A1 | 9/2014 | Hill et al. |
| 2014/0262274 A1 | 9/2014 | Dismuke et al. |
| 2014/0262288 A1 | 9/2014 | Penny et al. |
| 2014/0262297 A1 | 9/2014 | Huang |
| 2014/0274817 A1 | 9/2014 | Hill et al. |
| 2014/0274822 A1 | 9/2014 | Dismuke et al. |
| 2014/0284053 A1 | 9/2014 | Germack |
| 2014/0284057 A1 | 9/2014 | Champagne et al. |
| 2014/0299325 A1 | 10/2014 | Zelenev et al. |
| 2014/0323366 A1 | 10/2014 | Parnell et al. |
| 2014/0332212 A1 | 11/2014 | Ayers et al. |
| 2014/0338911 A1 | 11/2014 | Dismuke et al. |
| 2014/0341957 A1 | 11/2014 | Yang et al. |
| 2014/0348887 A1 | 11/2014 | Hsu et al. |
| 2014/0364511 A1 | 12/2014 | Chari et al. |
| 2014/0367107 A1 | 12/2014 | Hill et al. |
| 2014/0371115 A1 | 12/2014 | Hill et al. |
| 2015/0053404 A1 | 2/2015 | Penny et al. |
| 2015/0068751 A1 | 3/2015 | Saboowala et al. |
| 2015/0068755 A1 | 3/2015 | Hill et al. |
| 2015/0094383 A1 | 4/2015 | Bernhardt et al. |
| 2015/0099681 A1 | 4/2015 | Rehage |
| 2015/0159074 A1 | 6/2015 | Luyster et al. |
| 2015/0175871 A1 | 6/2015 | Mettath et al. |
| 2015/0175878 A1 | 6/2015 | Kelly et al. |
| 2015/0184061 A1 | 7/2015 | Saboowala et al. |
| 2015/0184062 A1 | 7/2015 | Luyster et al. |
| 2015/0197683 A1 | 7/2015 | Hategan et al. |
| 2015/0197998 A1 | 7/2015 | Kapila et al. |
| 2015/0344767 A1 | 12/2015 | Lei et al. |
| 2016/0015622 A1* | 1/2016 | Rafferty ................ A61K 8/585 424/70.12 |
| 2016/0096989 A1 | 4/2016 | Ngantung et al. |
| 2017/0275518 A1 | 9/2017 | Trabelsi et al. |
| 2017/0335179 A1 | 11/2017 | Ngantung et al. |
| 2018/0134941 A1 | 5/2018 | Saboowala et al. |
| 2018/0171213 A1 | 6/2018 | Hill et al. |
| 2018/0282611 A1 | 10/2018 | Hill et al. |
| 2019/0031948 A1 | 1/2019 | Hill et al. |
| 2019/0055457 A1 | 2/2019 | Smith, Jr. et al. |
| 2019/0055458 A1 | 2/2019 | Smith, Jr. et al. |
| 2019/0055459 A1 | 2/2019 | Zelenev et al. |
| 2019/0085236 A1 | 3/2019 | Saboowala et al. |
| 2019/0090476 A1 | 3/2019 | Smith, Jr. et al. |
| 2019/0100689 A1 | 4/2019 | Zelenev et al. |
| 2019/0169488 A1 | 6/2019 | Hill et al. |
| 2019/0169492 A1 | 6/2019 | Hill et al. |
| 2019/0241796 A1 | 8/2019 | Mast et al. |
| 2019/0264094 A1 | 8/2019 | Hill et al. |
| 2019/0315674 A1 | 10/2019 | Trabelsi et al. |
| 2019/0316021 A1 | 10/2019 | Champagne et al. |

FOREIGN PATENT DOCUMENTS

| | | |
|---|---|---|
| CN | 103614128 A | 3/2014 |
| CN | 103642477 A | 3/2014 |
| EP | 1 051 237 B1 | 11/2003 |
| EP | 1 378 554 A1 | 1/2004 |
| EP | 1 786 879 B1 | 2/2012 |
| EP | 2 195 400 B1 | 8/2012 |
| EP | 1 880 081 B1 | 3/2013 |
| WO | WO 1999/049182 A1 | 9/1999 |
| WO | WO 2005/048706 A2 | 6/2005 |
| WO | WO 2007/011475 A1 | 1/2007 |
| WO | WO 2012/158645 A1 | 11/2012 |
| WO | WO 2017/099709 A1 | 6/2017 |
| WO | WO 2018/111229 A1 | 6/2018 |

OTHER PUBLICATIONS

International Search Report and Written Opinion dated Jul. 31, 2014 for Application No. PCT/US2014/029079.

(56) References Cited

OTHER PUBLICATIONS

Extended European Search Report for Application No. EP 15185607.7 dated Dec. 22, 2015.
[No Author Listed], The HLB system: a time-saving guide to emulsifier selection. ICI Americas Inc. 1976. 22 pages.
ADM, Evolution Chemicals E5789-117 Description. Jun. 2014. 1 page.
Brost et al., Surfactants assist water-in-oil monitoring by fluroescence. World Oil. Oct. 2008;229(10): 12 pages.
Champagne et al., Critical assessment of microemulsion technology for enhancing fluid recovery from tight gas formations and propped fractures. SPE European Formation Damage Conference. Noordwijk, The Netherlands. Jun. 7-10, 2011. SPE-144095. 10 pages.
Crafton et al., Micro-emulsion effectiveness for twenty four wells, Eastern Green River, Wyoming. 2009 SPE Rocky Mountain Petroleum Technology Conference. Denver, Colorado, USA, Apr. 14-16, 2009. SPE-123280. 13 pages.
Haw, The HLB system: a time saving guide to surfactant selection. Presentation to the Midwest chapter of the society of cosmetic chemists. Uniqema. Mar. 9, 2004. 39 slides.
Howard et al., Comparison of flowback aids: understanding their capillary pressure and wetting properties. SPE Production & Operations. Aug. 2010;:376-87.
Kunieda et al. Evaluation of hydrophile-lipophile balance (HLB) of nonionic surfactants. J Colloid and Interface Sci. Sep. 1985;107(1): 107-21.
Yang et al., Optimizing nanoemulsions as fluid flowback additives in enhancing tight gas production. J Petroleum Sci Eng. 2014;121:122-5.
Zelenev et al., Microemulsion technology for improved fluid recovery and enhanced core permeability to gas. 2009 SPE European Formation Damage Conference. Scheveningen, The Netherlands. May 27-29, 2009. SPE 122109. 13 pages.
Zelenev et al., Microemulsion-assisted fluid recovery and improved permeability to gas in shale formations. 2010 SPE International Symposium and Exhibition on Formation Damage Control. Lafayette, Louisiana, USA. Feb. 10-12, 2010. SPE 127922. 7 pages.
Zelenev, Surface energy of north American shales and its role in interaction of shale with surfactants and microemulsions. SPE International Symposium on Oilfield Chemistry. The Woodlands, Texas, USA. Apr. 11-13, 2011. SPE-141459. 7 pages.
U.S. Appl. No. 16/267,032, filed Feb. 4, 2019, Hill et al.
U.S. Appl. No. 15/869,406, filed Jan. 12, 2018, Saboowala et al.
PCT/US2014/042326, Oct. 17, 2014, International Search Report and Written Opinion.
PCT/US2014/029079, Jul. 31, 2014, International Search Report and Written Opinion.
EP 15185607.7, Dec. 22, 2015, Extended European Search Report.

* cited by examiner

DILUTED MICROEMULSIONS WITH LOW SURFACE TENSIONS

RELATED APPLICATIONS

This application claims priority under 35 U.S.C. § 119(e) to U.S. Provisional Application No. 62/680,457, filed Jun. 4, 2018, and entitled "Diluted Microemulsions with Low Surface Tensions", which is incorporated herein by reference in its entirety. This application is also a continuation-in-part of U.S. patent application Ser. No. 16/267,032, (now U.S. Pat. No. 10,738,235), filed Feb. 4, 2019, and entitled "Methods and Compositions for Stimulating the Production of Hydrocarbons from Subterranean Formations", which is a continuation of U.S. patent application Ser. No. 15/071,332 (now U.S. Pat. No. 10,196,557), filed Mar. 16, 2016, and entitled "Methods and Compositions for Stimulating the Production of Hydrocarbons from Subterranean Formations", which is a continuation of U.S. patent application Ser. No. 13/918,155 (now U.S. Pat. No. 9,321,955), filed Jun. 14, 2013, and entitled "Methods and Compositions for Stimulating the Production of Hydrocarbons from Subterranean Formations", each of which is incorporated by herein by reference in its entirety for all purposes. This application is also a continuation-in-part of U.S. patent application Ser. No. 15/869,406, (now U.S. Pat. No. 10,731,071), filed Jan. 12, 2018, and entitled "Methods and Compositions for Use in Oil and/or Gas Wells", which is a continuation of U.S. patent application Ser. No. 14/644,351 (now U.S. Pat. No. 9,868,893), filed Mar. 11, 2015, and entitled "Methods and Compositions for Use in Oil and/or Gas Wells", which is a continuation-in-part of U.S. patent application Ser. No. 14/489,437 (now U.S. Pat. No. 10,000,693), filed Sep. 17, 2014, which claims priority under 35 U.S.C. § 119(e) to U.S. Provisional Application No. 61/946,176 filed Feb. 28, 2014, and entitled "Methods and Compositions for Use in Oil and/or Gas Wells", each of which is incorporated herein by reference in its entirety for all purposes. U.S. patent application Ser. No. 14/644,351 is also a continuation-in-part of U.S. patent application Ser. No. 14/212,763 (now U.S. Pat. No. 9,884,988), filed Mar. 14, 2014, and entitled "Methods and Compositions for Use in Oil and/or Gas Wells", which also claims priority under 35 U.S.C. § 119(e) to U.S. Provisional Application No. 61/946,176, each of which is incorporated herein by reference in its entirety for all purposes. U.S. patent application Ser. No. 14/489,437 is also a continuation-in-part of U.S. patent application Ser. No. 14/212,763. U.S. patent application Ser. No. 14/212,763 is also a continuation-in-part of U.S. application Ser. No. 13/918,155. U.S. patent application Ser. No. 14/212,763 is also a continuation-in-part of U.S. patent application Ser. No. 13/918,166, (now abandoned), filed Jun. 14, 2013, and entitled "Methods and Compositions for Use in Oil and/or Gas Wells", which is incorporated by reference herein in its entirety. U.S. patent application Ser. No. 14/212,763 is also a continuation-in-part of U.S. application Ser. No. 13/829,495 (now U.S. Pat. No. 9,428,683), filed Mar. 14, 2013, and entitled "Methods and Compositions for Stimulating the Production of Hydrocarbons from Subterranean Formations", which is incorporated by reference herein in its entirety. U.S. patent application Ser. No. 14/212,763 is also a continuation-in-part of U.S. application Ser. No. 13/829,434 (now U.S. Pat. No. 9,068,108), filed Mar. 14, 2013, and entitled "Methods and Compositions for Stimulating the Production of Hydrocarbons from Subterranean Formations", which is incorporated by reference herein in its entirety.

FIELD

The present invention relates generally to microemulsions and/or diluted microemulsions that have low surface tensions in gas wells.

BACKGROUND

Diluted microemulsions may be useful for treating gas wells. However, diluted microemulsions may have undesirably high surface tensions under gas well conditions. Accordingly, improved methods of formulating microemulsions and/or diluted microemulsions with especially low surface tension and improved methods of treating gas wells with diluted microemulsions with especially low surface tension may be advantageous.

SUMMARY

The present invention generally relates to methods related to making, manufacturing, and/or formulating microemulsions and/or diluted microemulsions with especially low surface tensions for use in in gas wells. The present subject matter of the present invention involves, in some cases, interrelated products, alternative solutions to a particular problem, and/or a plurality of different uses of one or more systems and/or articles.

In some embodiments, a method of formulating a microemulsion and/or a diluted microemulsion for treating a gas well having a wellbore is provided. The method comprises selecting a solvent or combination of solvents to form a non-aqueous phase of a microemulsion based on a temperature and pressure of the gas well, combining the non-aqueous phase with an aqueous phase and a surfactant to form the microemulsion, and diluting the microemulsion into an aqueous dilution phase. In some embodiments, the solvent or combination of solvents has a surface tension of less than or equal to 34 mN/m and greater than or equal to 15 mN/m at the temperature and pressure of the gas well. In some embodiments, the solvent or combination of solvents has a surface tension of less than or equal to 24 mN/m and greater than or equal to 15 mN/m at ambient temperature and pressure. In some embodiments, the microemulsion or the diluted microemulsion has a surface tension of less than or equal to 28 mN/m and greater than or equal to 15 mN/m at the temperature and pressure of the gas well. In some embodiments, the microemulsion or the diluted microemulsion (a microemulsion diluted to a use concentration) has a surface tension of less than or equal to 24 mN/m and greater than or equal to 15 mN/m as measured using the capillary rise technique or the rising bubble technique at ambient temperature and pressure.

In some embodiments, a method of treating a gas well having a wellbore based on the temperature and pressure of the gas well, is provided. The method comprises injecting a diluted microemulsion into the wellbore to increase formation gas production by the gas well. The diluted microemulsion comprises a microemulsion comprising an aqueous phase, a surfactant, and a non-aqueous phase comprising a solvent or combination of solvents. In some embodiments, the solvent or combination of solvents has a surface tension of less than or equal to 34 mN/m and greater than or equal to 15 mN/m at the temperature and pressure of the gas well. In some embodiments, the solvent or combination of solvents has a surface tension of less than or equal to 24 mN/m and greater than or equal to 15 mN/m at ambient temperature and pressure. In some embodiments, the diluted microemulsion has a surface tension of less than or equal to 28 mN/m and greater than or equal to 15 mN/m at the temperature and pressure of the gas well. In some embodiments, the microemulsion or a diluted microemulsion (a microemulsion diluted to a use concentration) has a surface tension of less than or equal to 24 mN/m and greater than or equal to 15 mN/m as measured using the capillary rise technique or the rising bubble technique at ambient temperature and pressure.

The method also comprises formulating or using microemulsions comprising solvents having a vapor pressure at the bottom hole temperature and pressure of the gas well best suited to provide especially low surface tension at that bottom hole temperature and pressure of the gas well.

In some embodiments, a microemulsion suitable for treating a gas well is provided. The microemulsion comprises an aqueous phase, a surfactant, and a non-aqueous phase comprising a solvent or combination of solvents. The solvent or combination of solvents comprises one or more $C_6$-$C_{10}$ linear or branched alkane solvents, one or more methylated cyclic alkane solvents, and/or one or more methyl siloxane solvents of less than or equal to 800 g/mol molecular weight.

In some embodiments, a microemulsion suitable for treating a gas well and comprising an aqueous phase, a surfactant, and a non-aqueous phase comprising a solvent or combination of solvents has a surface tension of less than or equal to 24 mN/m and greater than or equal to 15 mN/m as measured by a capillary rise technique or a rising bubble technique.

Other advantages and novel features of the present invention will become apparent from the following detailed description of various non-limiting embodiments of the invention when considered in conjunction with the accompanying figures.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
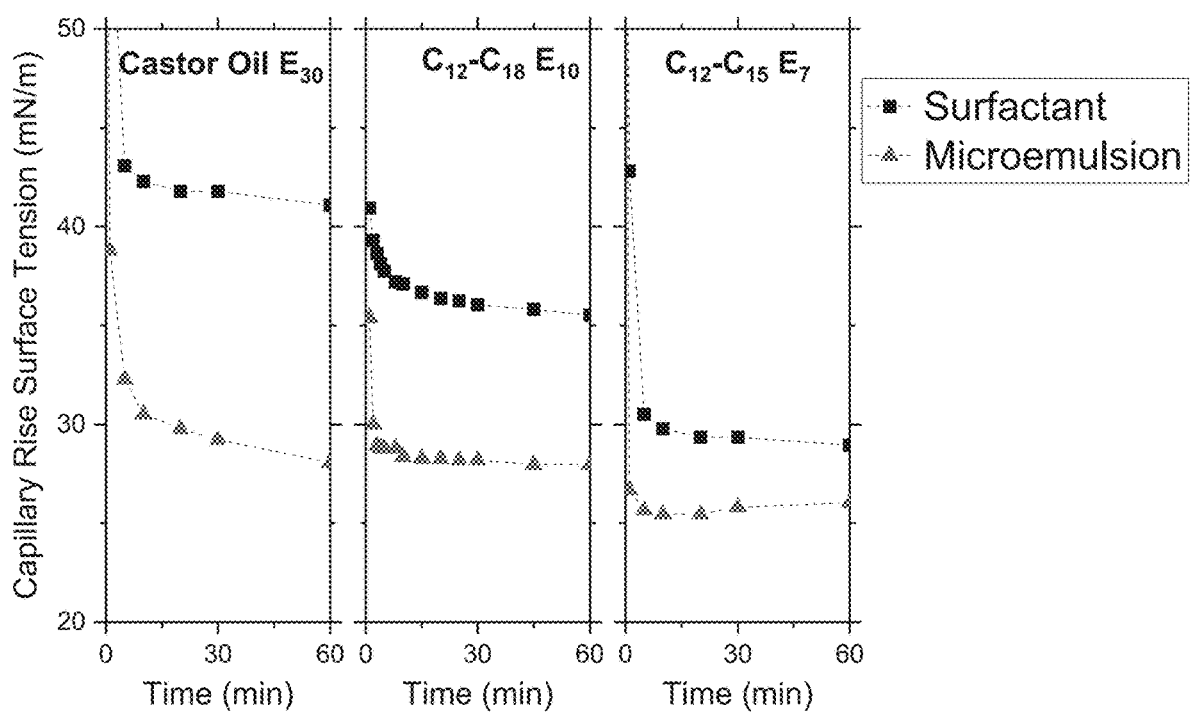
FIG. 1 (FIG. 1) shows three plots showing surface tensions measured using the capillary rise technique for diluted microemulsions comprising d-limonene and diluted surfactant solutions lacking d-limonene, according to some embodiments.

Methods related to making, manufacturing, and/or formulating microemulsions and/or diluted microemulsions with especially low surface tensions in gas wells and methods for treating gas wells with such diluted microemulsions are generally provided. During well completion or well stimulation for gas wells, water may be injected into the gas-bearing rock formation. In addition, water or brine is typically present in the rock formation prior to drilling a well into the rock formation. Such water may form a water block, which may prevent flow of hydrocarbon gas out of the porous rock formation into the well.

Capillary pressure is defined as:

$$P_{cap} = (2\gamma \cos \theta)/r$$

where $\gamma$ is the surface tension, $\theta$ is the contact angle and $r$ is the pore radius or capillary radius. For water in a rock formation, the relevant surface tension is that of water, the relevant contact angle is that of water on the rock formation, and the relevant pore or capillary radius is the pore or capillary radius of the pores in the rock formation. In a rock formation, capillary pressure is equivalent to the pressure required for a gas to force water out of the pores of the rock formation. Water that remains in the pores near the wellbore forms a water block that may prevent the flow of hydrocarbon gas into the well. Surfactants having lower surface tension than water may lower the surface tension of the water in the pores of a rock formation if added thereto. This may lower the capillary pressure of the water in the pores of the rock formation, which may in turn decrease the formation of undesirable water blocks therein. It is believed that larger reductions in the surface tension of water result in the formation of fewer water blocks, which it is believed allows more hydrocarbon gas to flow freely out of the rock formation and into the gas well, which may then be produced and recovered.

It is believed that the surface activity of surfactants is caused by their molecular structure, which is typically an amphiphilic structure including separated hydrophilic and hydrophobic portions. It is believed that this amphiphilic structure results in a propensity for the surfactant to adsorb at interfaces and lower surface tension (or surface energy). When a surfactant is adsorbed at the gas/water interface, it is believed that both the hydrophilic and the hydrophobic portions thereof are energetically satisfied. It is believed that hydrocarbon and silicone solvents include only one or more hydrophobic portion(s)—there are no separated hydrophilic and hydrophobic portions, and that therefore such molecules are not surface active and would not be expected to adsorb at the gas/water interface and lower surface tension.

The inventors have unexpectedly found that microemulsions comprising certain solvents result in even lower surface tension than surfactants alone. This is unexpected because such solvents were not known to be surface active agents—they are not known to be surfactants. As would be known to one of ordinary skill in the art, surfactants are surface active agents—they spontaneously go to or accumulate at interfaces and lower surface tension. However, solvents are not known to spontaneously go to interfaces and lower surface tension. The inventors have also found that this effect can be used to lower capillary pressure and increase flow back in the gas well, which may result in an increase in gas production and recovery from the gas well.

Surface tension may be measured in many different ways. One common measurement is the Wilhelmy plate technique, in which a thin rectangular piece of material, often platinum, is immersed in the gas-water interface and the force exerted on the plate is measured. Another method, called the capillary rise technique, measures the height of rise of the liquid phase in a small diameter capillary. A 100 micron diameter capillary is suitable for measurements on surfactant solutions. Another technique to measure surface tension is called the pendant drop technique, which involves forming a pendant drop of the liquid on the tip of a small diameter (e.g., 1-5 mm) tube immersed in the gas phase and determining the surface tension from the shape of the drop. Another technique, called the rising bubble technique, involves forming a bubble of gas phase on the tip of a small diameter (e.g., 1-5 mm) tube immersed in the liquid and determining the surface tension from the shape of the bubble.

When the surface tension of a microemulsion containing a volatile solvent is measured in an open container using the Wilhelmy plate technique, it is believed that the influence of the solvent on the surface tension is not detected because the solvent rapidly evaporates from the surface. When the surface tension is measured using the pendant drop technique, it is believed that the influence of the solvent on the surface tension is not detected because there is a large ratio of the volume of the gas phase to the volume of the pendant drop which allows the solvent to rapidly evaporate from the surface. It is believed that this effect may be partially offset by pre-saturating the volume of the gas phase with the volatile solvent. When the surface tension of a microemulsion containing a volatile solvent is measured using a 50-250 micron diameter capillary, the inventors have found that the influence of the solvent on the surface tension is detected. It is believed that this is because the rate of evaporation of the solvent from the surface is limited by the small vapor space of the capillary. When the surface tension of a microemulsion containing a volatile solvent is measured using the rising bubble technique, the inventors have found that influence of the solvent on the surface tension is detected. It is believed that this is because evaporation of the solvent from the surface is limited by the small volume of the bubble.

All liquids, including liquid hydrocarbon solvents and silicone solvents, possess a surface tension. It is believed that the surface tension of small molecule hydrocarbon solvents depends strongly on molecular weight, with pentane having a surface tension of 15.8 mN/m at 20° C. and ambient pressure of 1 atm, and tetradecane having a surface tension of 26.6 mN/m at 20° C. and ambient pressure of 1 atm. Hexamethyl disiloxane has a surface tension of 15.9 mN/m at 20° C. and ambient pressure of 1 atm. Some of these liquid hydrocarbon solvents and silicone solvents possess surface tension values significantly lower than most common surfactants. For example, a solution of the nonionic alcohol ethoxylate surfactant $C_{12}$-$C_{15}$ $E_7$, when well above its Critical Micelle Concentration or CMC, has a surface tension of 29 mN/m at ambient temperature and pressure. As used herein, the letter "E" followed by an integer represents the number of moles of ethoxylation (i.e., number of ethylene oxide units) contained within a given surfactant.

A microemulsion is a single phase comprising water, solvent (e.g. oil), and surfactant. The inventors have unexpectedly found that even though hydrocarbon solvents and silicone solvents are not known to be surface active agents (they are not known to be surfactants) in aqueous solutions and would not be expected to lower aqueous surface tension, when certain such solvents are incorporated into a microemulsion, the surface tension of the microemulsion is lowered significantly below the value of the microemulsion in the absence of the solvent(s). Since many of the most useful hydrocarbon solvents and silicone solvents, giving the lowest surface tension values, are highly volatile, it may be beneficial to measure the surface tension of the microemulsion using a technique, such as capillary rise technique or the rising bubble technique, that limit evaporation of the solvent from the surface of the microemulsion. This is particularly relevant to the situation in porous rock formations containing recoverable hydrocarbon gas, in which the space containing the gas is present in the form of small pores, usually having diameters much smaller than 100 microns.

The hydrocarbon solvents and silicone solvents described herein have not previously been disclosed, and their use in microemulsions for gas and oil well treatment would not have been obvious because one of ordinary skill in the art would have believed that they would not have been useful solvents for some species commonly found in petroleum, such as asphaltenes and paraffins. In fact, some of these solvents (e.g., heptane) are known for their ability to precipitate asphaltenes from crude oil.

Bottom hole temperatures and pressures in gas wells are usually much higher than ambient conditions at the surface. In addition to disclosing solvents giving large surface tension reductions, the inventors have also discovered a method for selecting solvents that enhance the amount of surface tension lowering at the bottom hole temperature and pressure in a particular gas containing rock formation or reservoir.

Diluted microemulsions with low surface tensions in gas wells may be capable of penetrating into small pores in rock formations present in gas wells, enhancing the recovery of gas present in these pores. In some embodiments, the diluted microemulsion has a relatively low surface tension in the gas well, and the microemulsion comprises a non-aqueous phase comprising a solvent or combination of solvents with a relatively low surface tension in the gas well. In some embodiments, a solvent or combination of solvents may be selected based on the bottom hole temperature and pressure of the gas well. For example, the solvent or combination of solvents may be selected to have a low surface tension at the bottom hole temperature and pressure of the gas well, such as a surface tension lower than that of a surfactant present in the diluted microemulsion. The solvent or combination of solvents may adsorb into a layer of surfactant present on the surface of the diluted microemulsion, and, if it has or they have a lower surface tension than the surfactant, may lower the surface tension of the layer of surfactant and the surface tension of the diluted microemulsion as a whole.

In some embodiments, a solvent or combination of solvents (e.g., for use in a well treatment microemulsion) may be selected to have both a low surface tension at the bottom hole temperature and pressure of the gas well and a vapor pressure at the bottom hole temperature and pressure of the gas well such that there is not appreciable evaporation of the solvent or solvents from the diluted microemulsion. In such embodiments, the solvent or solvents may remain at the surface of the diluted microemulsion throughout its use in the gas well, reducing the surface tension of the diluted microemulsion throughout its use therein.

The diluted microemulsions described herein are generally formulated to have advantageous properties in gas wells (e.g., in gas wells in which the diluted microemulsions are used). Some diluted microemulsion components (e.g., solvents, combinations of solvents) may be selected based on gas well conditions, such as the bottom hole temperature of the gas well, the bottom hole pressure of the gas well, the type of gas present in the gas well, the hydrocarbon bearing rock formation in the gas well, the depth of the hydrocarbon bearing rock formation in the gas well, and the like. As an example, a solvent or combination of solvents may be selected to have a relatively low surface tension at the bottom hole temperature and pressure of the gas well. The solvent or combination of solvents may also be selected to have a relatively low vapor pressure at the bottom hole temperature and pressure of the gas well. In some embodiments, the values of certain properties (e.g., surface tension, vapor pressure) of diluted microemulsions and/or solvents therein may be particularly advantageous under conditions similar to those of gas wells in which the diluted microemulsions are used. These values of these properties may be different than the values of these properties under other conditions (e.g., in laboratory environments, at 20° C. and atmospheric pressure, at 60° C. and atmospheric pressure). Some diluted microemulsions described herein have beneficial properties both in gas wells and in other environments.

Unless otherwise specified, references to conditions of a gas well (e.g., gas well temperature, gas well pressure, and/or both gas well temperature and pressure) should be understood to refer to the bottom hole temperature and pressure of the gas well or the conditions of the gas well at the depth of the hydrocarbon bearing rock formation therein.

Gas wells typically have temperatures and pressures that are elevated in comparison to room temperature and pressure. In some embodiments, a gas well has a temperature of greater than or equal to 60° C., greater than or equal to 75° C., greater than or equal to 100° C., greater than or equal to 125° C., greater than or equal to 150° C., greater than or equal to 175° C., greater than or equal to 200° C., greater than or equal to 225° C., greater than or equal to 250° C., greater than or equal to 275° C., greater than or equal to 300° C., greater than or equal to 325° C., greater than or equal to 350° C., greater than or equal to 375° C., or greater than or equal to 400° C. The gas well may have a temperature of less than or equal to 400° C., less than or equal to 375° C., less than or equal to 350° C., less than or equal to 325° C., less than or equal to 300° C., less than or equal to 275° C., less than or equal to 250° C., less than or equal to 225° C., less than or equal to 200° C., less than or equal to 175° C., less than or equal to 150° C., less than or equal to 125° C., less than or equal to 100° C., less than or equal to 75° C., or less than or equal to 60° C. Combinations of the above-referenced ranges are also possible (e.g., greater than or equal to 60° C. and less than or equal to 400° C., greater than or equal to 100° C. and less than or equal to 350° C., or greater than or equal to 300° C. and less than or equal to 400° C.). Other ranges are also possible.

A gas well may have a pressure of greater than or equal to 1,000 psi, greater than or equal to 2,000 psi, greater than or equal to 5,000 psi, greater than or equal to 8,000 psi, or greater than or equal to 10,000 psi. The gas well may have a pressure of less than or equal to 10,000 psi, less than or equal to 8,000 psi, less than or equal to 5,000 psi, less than or equal to 2,000 psi, or less than or equal to 1,000 psi. Combinations of the above-referenced ranges are also possible (e.g., greater than or equal to 1,000 psi and less than or equal to 10,000 psi). Other ranges are also possible.

In some embodiments, one or more components of a microemulsion (e.g., a microemulsion to be diluted) may be selected based on a measurement technique that provides information about the properties of that component (and/or of the resultant diluted microemulsion as a whole) in a gas well. The measurement technique may be a measurement technique that closely approximates one or more conditions of a gas well, and/or may be a measurement technique that provides information from which the expected properties of the component and/or the diluted microemulsion in the gas well can be calculated. For instance, a property may be measured at 20° C. and atmospheric pressure, and a known relationship between the value of the property at 20° C. and atmospheric pressure and the value of that property (and/or another related property) at the gas well temperature and pressure may be employed to determine the value of that property (and/or another related property) at the gas well temperature and pressure. By way of example, the following procedure may be employed to determine a predicted surface tension of a diluted microemulsion at a temperature and pressure of a gas well: (1) the predicted vapor pressure of the solvents in the non-aqueous phase at the temperature and pressure of the gas well may be determined based upon a vapor pressure of the solvents at 20° C. and the Clausius-Clapeyron equation; (2) the predicted surface tension of the solvents in the non-aqueous phase at the temperature and pressure of the gas well may be determined based upon a surface tension of the solvents at 20° C. and the relationship described in Grigoryev, B. A., Nemzer, B. V., Kurumov, D. S. & Sengers, J. V. Surface tension of normal pentane, hexane, heptane, and octane. Int. J. Thermophys. (1992); and (3) an empirical relationship for the difference between the surface tension of a diluted microemulsion and the surface tension of the solvent(s) in a non-aqueous phase therein as a function of the vapor pressure of the solvent(s) in the non-aqueous phase therein may be employed to predict the diluted microemulsion surface tension (see Example 11).

As an example, in some embodiments, a surface tension of a diluted microemulsion described herein may refer to surface tension that is measured by a capillary rise technique. Without wishing to be bound by any particular theory, and as described in more detail below, it is believed that the value of surface tension measured for a diluted microemulsion may depend on the measurement technique employed to determine that value, and that the capillary rise technique is particularly accurate for measuring a value of surface tension that provides relevant information about the behavior that the diluted microemulsion would exhibit in a gas well.

When a diluted microemulsion comprises a volatile solvent (e.g., in a non-aqueous phase), its surface tension may change as the volatile solvent evaporates therefrom. Accordingly, it is believed that measurement techniques performed in environments where evaporation of volatile solvents from the diluted microemulsion is substantially different than evaporation of volatile solvents from diluted microemulsions in gas wells may yield values of surface tension that differ from the actual surface tension of the diluted microemulsion in the gas well. Gas wells typically include rock formations comprising interconnected pores that have small diameters (e.g., in the range of 1-5 microns or less). Together, the interconnected pores occupy a relatively large volume. For diluted microemulsions in these rock formations, there is typically a relatively limited interface between the diluted microemulsion and air through which volatile solvents may evaporate. After evaporation, the evaporated volatile solvents may diffuse away from this limited interface through the large volume of the interconnected pores. Therefore, measurement techniques performed in environments in which the interface between the diluted microemulsion and the air has a relatively small area but is fluidically connected to a relatively large volume of air through which evaporated volatile solvents can diffuse are believed to be particularly accurate at measuring microemulsion properties in gas well conditions.

It is believed that the capillary rise technique is one example of a measurement technique that occurs in an environment mimicking that of a gas well. The capillary rise technique is performed by: (1) positioning a capillary with a diameter of 150 microns in the fluid to be measured (e.g., a diluted microemulsion); (2) positioning a capillary with a diameter of 200 microns in the fluid to be measured; (3) allowing the fluid to be measured to rise along the two capillaries until it reaches a stable height in each capillary; and (4) solving Jurin's law for both capillaries determine the surface tension of the fluid. The capillary rise equation is the following:

$$h = \frac{2\gamma \cos\theta}{\rho g r},$$

where h is the height of the microemulsion in the capillary, $\gamma$ is the surface tension of the microemulsion, $\theta$ is the angle between the microemulsion and the capillary at the air-capillary-microemulsion interface, $\rho$ is the density of the microemulsion, g is the gravitational constant, and r is the radius of the capillary or the radius of the pore. It is believed that the diluted microemulsions in capillaries fluidically connected to an open ambient environment experience volatile organic solvent evaporation at similar rates to diluted microemulsions in rock formations in gas wells. For this reason, it is believed that employing the capillary rise technique to measure the surface tension of a diluted microemulsion yields a value of the surface tension of the diluted microemulsion that closely approximates its surface tension in a gas well. It is also believed that employing the capillary rise technique to measure the surface tension of a diluted microemulsion provides relevant information about the behavior of the microemulsion in the gas well (e.g., its tendency to penetrate a network of narrow-diameter interconnected pores therein).

Certain diluted microemulsions described herein may have beneficial properties at the bottom hole temperature and pressure in a gas well. As described in fuller detail elsewhere herein, microemulsions typically comprise one phase dispersed in another phase. One of the phases may be an aqueous phase, and/or one of the phases may be a non-aqueous phase. In some embodiments, emulsions or microemulsion are provided. The terms should be understood to include emulsions or microemulsions that have a water continuous phase, or that have an oil continuous phase, or microemulsions that are bicontinuous. The microemulsion may further comprise a surfactant. Diluted microemulsions are microemulsions that have been added to a dilution phase. The microemulsion may be added to the dilution phase prior to and/or during injection into a wellbore. In some embodiments, the dilution phase is an aqueous phase. For instance, it may comprise an aqueous fluid (e.g., an aqueous carrier fluid), such as water, water comprising one or more dissolved salts (e.g., KCl), brine, sea water, fresh water, and/or a well-treatment fluid. Non-limiting examples of suitable well-treatment fluids include acids, fracturing fluids comprising polymers, produced water, sand or proppant, and slick water. In some embodiments, a composition for injecting into a wellbore is provided comprising a microemulsion as described herein and a dilution phase.

In some embodiments, a diluted microemulsion comprises a dilution phase that comprises water and KCl. The KCl may be present in the dilution phase in an amount of greater than or equal to 0.5 wt %/vol, greater than or equal to 1 wt %/vol, greater than or equal to 2 wt %/vol, or greater than or equal to 5 wt %/vol. The KCl may be present in the dilution phase in an amount of less than or equal to 10 wt %/vol, less than or equal to 5 wt %/vol, or less than or equal to 1 wt %/vol. Combinations of the above-referenced ranges are also possible (e.g., greater than or equal to 0.5 wt %/vol and less than or equal to 10 wt %/vol). Other ranges are also possible. In some embodiments, the KCl is present in the dilution phase in an amount of 2 wt %/vol.

A diluted microemulsion may comprise a microemulsion in a variety of suitable amounts. The diluted microemulsion may comprise the microemulsion in an amount of less than or equal to 100 gpt, less than or equal to 50 gpt, less than or equal to 20 gpt, less than or equal to 10 gpt, less than or equal to 5 gpt, less than or equal to 2 gpt, less than or equal to 1 gpt, less than or equal to 0.5 gpt, less than or equal to 0.2 gpt, or less than or equal to 0.1 gpt. The diluted microemulsion may comprise the microemulsion in an amount of greater than or equal to 0.1 gpt, greater than or equal to 0.2 gpt, greater than or equal to 0.5 gpt, greater than or equal to 1 gpt, greater than or equal to 2 gpt, greater than or equal to 5 gpt, greater than or equal to 10 gpt, greater than or equal to 20 gpt, greater than or equal to 50 gpt, or greater than or equal to 100 gpt. Combinations of the above-referenced ranges are also possible (e.g., greater than or equal to 0.1 gpt and less than or equal to 100 gpt, greater than or equal to 0.2 gpt and less than or equal to 5 gpt, or greater than or equal to 0.2 gpt and less than or equal to 2 gpt). Other ranges are also possible. As would be known to one of ordinary skill in the art, the unit gpt refers to gallons per thousand and is equivalent to one tenth of a volume percent.

In some embodiments, a diluted microemulsion has an advantageously low surface tension. The surface tension of the diluted microemulsion may be less than or equal to 34 nM/m, less than or equal to 28 mN/m, less than or equal to 25 mN/m, less than or equal to 24 mN/m, less than or equal to 23 mN/m, less than or equal to 21 mN/m, less than or equal to 20 mN/m, less than or equal to 19 mN/m, less than or equal to 18 mN/m, less than or equal to 17 mN/m, or less than or equal to 15 mN/m. The surface tension of the diluted microemulsion may be greater than or equal to 15 mN/m, greater than or equal to 17 mN/m, greater than or equal to 18 mN/m, greater than or equal to 19 mN/m, greater than or equal to 20 mN/m, greater than or equal to 21 mN/m, greater than or equal to 23 mN/m, greater than or equal to 24 nM/m, greater than or equal to 25 mN/m, greater than or equal to 28 mN/m, or greater than or equal to 34 mN/m. Combinations of the above-referenced ranges are also possible (e.g., less than or equal to 23 mN/m and greater than or equal to 15 mN/m; less than or equal to 24 mN/m and greater than or equal to 15 mN/m; less than or equal to 21 mN/m and greater than or equal to 15 mN/m; less than or equal to 19 mN/m and greater than or equal to 15 mN/m; less than or equal to 17 mN/m and greater than or equal to 15 mN/m). Other ranges are also possible. The surface tension of the diluted microemulsion may be determined by the capillary rise technique or the rising bubble technique. It should be understood that the ranges above may refer to a range of surface tensions at a variety of suitable temperatures and pressures. In some embodiments, the diluted microemulsion may have a surface tension in one or more of the ranges listed above at a gas well temperature and pressure. In some embodiments, the diluted microemulsion may have a surface tension in one or more of the ranges listed above at 60° C. and atmospheric pressure. In some embodiments, the diluted microemulsion may have a surface tension in one or more of the ranges listed above at 20° C. and atmospheric pressure.

In some embodiments, a diluted microemulsion has a surface tension that is lower than it would be if it lacked one or more of its components. For instance, some diluted microemulsions described herein may have a surface tension that is lower than an otherwise equivalent composition lacking one or more solvents present in a non-aqueous phase therein. The diluted microemulsion may have a surface tension that is greater than or equal to 5% lower, greater than or equal to 10% lower, greater than or equal to 15% lower, greater than or equal to 20% lower, or greater than or equal to 25% lower, or greater than or equal to 30% lower than a surface tension of an otherwise equivalent composition lacking a solvent or combination of solvents included in an aqueous phase of the diluted microemulsion. The diluted microemulsion may have a surface tension that is less than or equal to 30% lower, less than or equal to 25% lower, less than or equal to 20% lower, less than or equal to 15% lower, less than or equal to 10% lower, or less than or equal to 5% lower than a surface tension of an otherwise equivalent composition lacking a solvent or combination of solvents included in an aqueous phase of the diluted microemulsion. Combinations of the above-referenced ranges are also possible (e.g., greater than or equal to 5% lower and less than or equal to 30% lower, greater than or equal to 10% lower and less than or equal to 30% lower). Other ranges are also possible. The surface tension of the diluted microemulsion may be determined by the capillary rise technique. It should be understood that the ranges above may refer to a range of surface tensions at a variety of suitable temperatures and pressures. In some embodiments, the diluted microemulsion may have a surface tension in one or more of the ranges listed above at a gas well temperature and pressure. In some embodiments, the diluted microemulsion may have a surface tension in one or more of the ranges listed above at 60° C. and atmospheric pressure. In some embodiments, the diluted microemulsion may have a surface tension in one or more of the ranges listed above at 20° C. and atmospheric pressure.

In some embodiments, a diluted microemulsion has a surface tension that is relatively close to a surface tension of one or more of its components. The component may be one with a lower surface tension than some or all of the other components of the diluted microemulsion. For example, in some embodiments, a diluted microemulsion comprises an aqueous phase comprising a solvent or combination of solvents, and the diluted microemulsion has a surface tension that is relatively close to a surface tension of the solvent or combination of solvents. The surface tension of the diluted microemulsion may be greater than or equal to 10% lower than the surface tension of the solvent or combination of solvents, greater than or equal to 5% lower than the surface tension of the solvent or combination of solvents, greater than or equal to 2% lower than the surface tension of the solvent or combination of solvents, greater than or equal to the surface tension of the solvent or combination of solvents, greater than or equal to 2% higher than the surface tension of the solvent or combination of solvents, greater than or equal to 5% higher than the surface tension of the solvent or combination of solvents, greater than or equal to 10% higher than the surface tension of the solvent or combination of solvents, greater than or equal to 15% higher than the surface tension of the solvent or combination of solvents, greater than or equal to 20% higher than the surface tension of the solvent or combination of solvents, or greater than or equal to 25% higher than the surface tension of the solvent or combination of solvents.

The surface tension of the diluted microemulsion may be less than or equal to 30% higher than the surface tension of the solvent or combination of solvents, less than or equal to 25% higher than the surface tension of the solvent or combination of solvents, less than or equal to 20% higher than the surface tension of the solvent or combination of solvents, less than or equal to 15% higher than the surface tension of the solvent or combination of solvents, less than or equal to 10% higher than the surface tension of the solvent or combination of solvents, less than or equal to 5% higher than the surface tension of the solvent or combination of solvents, less than or equal to 2% higher than the surface tension of the solvent or combination of solvents, less than or equal to the surface tension of the solvent or combination of solvents, less than or equal to 2% lower than the surface tension of the solvent or combination of solvents, or less than or equal to 5% lower than the surface tension of the solvent or combination of solvents of an otherwise equivalent composition lacking a solvent or combination of solvents included in an aqueous phase of the diluted microemulsion. Combinations of the above-referenced ranges are also possible (e.g., greater than or equal to 10% lower than the surface tension of the solvent or combination of solvents and less than or equal to 30% higher than the surface tension of the solvent or combination of solvents). Other ranges are also possible. The surface tension of the diluted microemulsion may be determined by the capillary rise technique. It should be understood that the ranges above may refer to a range of surface tensions at a variety of suitable temperatures and pressures. In some embodiments, the diluted microemulsion may have a surface tension in one or more of the ranges listed above at a gas well temperature and pressure. In some embodiments, the diluted microemulsion may have a surface tension in one or more of the ranges listed above at 60° C. and atmospheric pressure. In some embodiments, the diluted microemulsion may have a surface tension in one or more of the ranges listed above at 20° C. and atmospheric pressure.

As described herein, some microemulsions may comprise a non-aqueous phase, and some diluted microemulsions may comprise a non-aqueous phase. The non-aqueous phase may comprise a solvent and/or a combination of solvents (e.g., in the form of a solvent blend), examples of which are provided in further detail below. The non-aqueous phase may make up any suitable amount of the microemulsion (e.g., of the components of the diluted microemulsion other than the dilution phase). The non-aqueous phase may make up greater than or equal to 1 wt %, greater than or equal to 2 wt %, greater than or equal to 5 wt %, greater than or equal to 10 wt %, greater than or equal to 15 wt %, greater than or equal to 20 wt %, greater than or equal to 25 wt %, or greater than or equal to 30 wt % of the microemulsion. The non-aqueous phase may make up less than or equal to 30 wt % of the microemulsion, less than or equal to 25 wt % of the microemulsion, less than or equal to 20 wt % of the microemulsion, less than or equal to 15 wt % of the microemulsion, less than or equal to 10 wt % of the microemulsion, less than or equal to 5 wt % of the microemulsion, less than or equal to 2 wt %, or less than or equal to 1 wt % of the microemulsion. Combinations of the above-referenced ranges are also possible (e.g., greater than or equal to 1 wt % and less than or equal to 30 wt % of the microemulsion, greater than or equal to 15 wt % and less than or equal to 30 wt % of the microemulsion, or greater than or equal to 20 wt % and less than or equal to 25 wt % of the microemulsion). Other ranges are also possible.

A solvent in a non-aqueous phase of a microemulsion and/or diluted microemulsion, a combination of solvents in a non-aqueous phase of a microemulsion and/or diluted microemulsion, and/or a non-aqueous phase as a whole in a microemulsion and/or diluted microemulsion may have one or more advantageous properties. For example, the solvent, combination of solvents (e.g. solvent blend), and/or non-aqueous phase as a whole may have a relatively low surface tension (e.g., at a gas well temperature and pressure, at 60° C. and atmospheric pressure, at 20° C. and atmospheric pressure). In some embodiments, a solvent, combination of solvents (e.g. solvent blend), and/or non-aqueous phase has a lower surface tension than a surfactant also present in the microemulsion and/or diluted microemulsion. In some embodiments, the non-aqueous phase comprises a solvent or a combination of solvents (e.g. solvent blend) with a relatively low surface tension (e.g., a surface tension lower than a surface tension of a surfactant also present in the microemulsion and/or diluted microemulsion) and also comprises a solvent or a combination of solvents (e.g. solvent blend) with a surface tension that is not relatively low (e.g., a surface tension higher than a surface tension of a surfactant also present in the diluted microemulsion).

The surface tension of any solvent in the non-aqueous phase, a combination of solvents (e.g. solvent blend) in the non-aqueous phase, and/or the non-aqueous phase as a whole may each independently be less than or equal to 34 mN/m, less than or equal to 30 mN/m, less than or equal to 28 mN/m, less than or equal to 25 mN/m, less than or equal to 24 mN/m, less than or equal to 23 mN/m, less than or equal to 20 mN/m, less than or equal to 18 mN/m, or less than or equal to 15 mN/m. The surface tension of any solvent in the non-aqueous phase, a combination of solvents in the non-aqueous phase, and/or the non-aqueous phase as a whole may each independently be greater than or equal to 15 mN/m, greater than or equal to 18 mN/m, greater than or equal to 20 mN/m, greater than or equal to 23 mN/m, greater than or equal to 24 mN/m, greater than or equal to 25 mN/m, greater than or equal to 28 mN/m, greater than or equal to 30 mN/m, or greater than or equal to 34 mN/m. Combinations of the above-referenced ranges are also possible (e.g., less than or equal to 34 mN/m and greater than or equal to 15 mN/m; less than or equal to 24 mN/m and greater than or equal to 15 mN/m). Other ranges are also possible.

The surface tension of the solvent, combination of solvents, and/or non-aqueous phase as a whole may be determined by the capillary rise technique. It should be understood that the ranges above may refer to a range of surface tensions at a variety of suitable temperatures and pressures. In some embodiments, the solvent, combination of solvents, and/or non-aqueous phase may have a surface tension in one or more of the ranges listed above at a gas well temperature and pressure. In some embodiments, the solvent, combination of solvents, and/or non-aqueous phase may have a surface tension in one or more of the ranges listed above at 60° C. and atmospheric pressure. In some embodiments, the solvent, combination of solvents, and/or non-aqueous phase may have a surface tension in one or more of the ranges listed above at 20° C. and atmospheric pressure.

In some embodiments, a non-aqueous phase comprises a solvent with an advantageous vapor pressure and/or moderate volatility. As used herein, a solvent with moderate volatility has a vapor pressure in the range from 1 mm Hg to 150 mm Hg. As represented here, a solvent may have moderate volatility at ambient temperature and pressure, and/or at gas well temperature and pressure. The vapor pressure of any solvent in the non-aqueous phase may be less than or equal to 150 mm Hg, less than or equal to 130 mm Hg, less than or equal to 100 mm Hg, less than or equal to 75 mm Hg, less than or equal to 60 g, less than or equal to 50 mm Hg, less than or equal to 40 mm Hg, less than or equal to 30 mm Hg, or less than or equal to 20 mm Hg, or less than or equal to 10 mm Hg, or less than or equal to 5 mm Hg, or less than or equal to 2 mm Hg, or less than or equal to 1 mm Hg. The vapor pressure of any solvent in the non-aqueous phase may be greater than or equal to 1 mm Hg, greater than or equal to 2 mm Hg, greater than or equal to 5 mm Hg, greater than or equal to 10 mm Hg, greater than or equal to 20 mm Hg, greater than or equal to 30 mm Hg, greater than or equal to 40 mm Hg, greater than or equal to 50 mm Hg, greater than or equal to 60 mm Hg, greater than or equal to 75 mm Hg, greater than or equal to 100 mm Hg, or greater than or equal to 130 mm Hg. Combinations of the above-referenced ranges are also possible (e.g., less than or equal to 150 mm Hg and greater than or equal to 1 mm Hg). Other ranges are also possible. In some embodiments, the solvent may have a vapor pressure in one or more of the ranges described above and have an advantageous surface tension (e.g., a surface tension lower than a surface tension of a surfactant also present in the diluted microemulsion; a surface tension in one or more of the ranges described above, such as less than or equal to 34 mN/m and greater than or equal to 15 mN/m). It should be understood that the ranges above may refer to a range of vapor pressures at a variety of suitable temperatures and pressures. In some embodiments, the solvent may have a vapor pressure in one or more of the ranges listed above at a gas well temperature and pressure. In some embodiments, the diluted microemulsion may have a surface tension in one or more of the ranges listed above at 60° C. and atmospheric pressure. In some embodiments, the solvent may have a vapor pressure in one or more of the ranges listed above at 20° C. and atmospheric pressure.

In some embodiments, a non-aqueous phase comprises a solvent with a moderate volatility at a gas well temperature and pressure (e.g., a solvent with a volatility in one or more of the ranges described above) and comprises a solvent that is essentially nonvolatile at a gas well temperature and pressure (e.g., a solvent with a vapor pressure of less than or equal to 10 mm Hg, less than or equal to 5 mm Hg, less than or equal to 2 mm Hg, less than or equal to 1 mm Hg, less than or equal to 0.5 mm Hg, less than or equal to 0.2 mm Hg, less than or equal to 0.1 mm Hg, or less than or equal to 0.05 mm Hg).

Below, non-limiting examples of different solvents that may be present in a non-aqueous phase of a microemulsion and/or a non-aqueous phase of a diluted microemulsion are provided.

In some embodiments, a combination of two or more of the solvents (e.g. a solvent blend) listed below may be present in a non-aqueous phase of a microemulsion and/or a non-aqueous phase of a diluted microemulsion (e.g., a blend of d-limonene and octamethylcyclotetrasiloxane, a blend of d-limonene and heptane). It should be understood that, unless otherwise indicated, the solvents listed below may or may not: (1) have a surface tension in one or more of the ranges described herein, (3) be a solvent in a combination of solvents having a surface tension in one or more of the ranges described herein, (3) have a surface tension lower than a surface tension of a surfactant also present in the microemulsion and/or diluted microemulsion, (4) be a solvent in a combination of solvents having a surface tension lower than a surface tension of a surfactant also present in the microemulsion and/or diluted microemulsion, and/or (5) have a vapor pressure in one or more of the ranges described herein.

Terpenes

In some embodiments, a non-aqueous phase of a microemulsion and/or a diluted microemulsion comprises at least one terpene solvent. In some embodiments, the non-aqueous phase comprises a terpene and another solvent (e.g., an alcohol, a siloxane solvent). In some embodiments, the non-aqueous phase comprises a first terpene and a second, different terpene.

Terpenes are generally derived biosynthetically from units of isoprene. Terpenes may be generally classified as monoterpenes (e.g., having two isoprene units), sesquiterpenes (e.g., having three isoprene units), diterpenes, or the like. The term "terpenoid" includes natural degradation products, such as ionones, and natural and synthetic derivatives, e.g., terpene alcohols, ethers, aldehydes, ketones, acids, esters, epoxides, and hydrogenation products (e.g., see Ullmann's Encyclopedia of Industrial Chemistry, 2012, pages 29-45, herein incorporated by reference). In some embodiments, the terpene is a naturally occurring terpene. In some embodiments, the terpene is a non-naturally occurring terpene and/or a chemically modified terpene (e.g., saturated terpene, terpene amine, fluorinated terpene, or silylated terpene). Terpenes that are modified chemically, such as by oxidation or rearrangement of the carbon skeleton, may be referred to as terpenoids. Many references use "terpene" and "terpenoid" interchangeably, and this disclosure will adhere to that usage.

In some embodiments, the terpene is a non-oxygenated terpene. In some embodiments, the terpene is a citrus terpene. In some embodiments, the terpene is d-limonene. In some embodiments, the terpene is dipentene. In some embodiments, the terpene is selected from the group consisting of d-limonene, nopol, alpha terpineol, eucalyptol, dipentene, linalool, alpha-pinene, beta-pinene, alpha-terpinene, geraniol, alpha-terpinyl acetate, menthol, menthone, cineole, citranellol, and combinations thereof. As used herein, "terpene" refers to a single terpene compound or a blend of terpene compounds.

In some embodiments, the terpene is an oxygenated terpene. Non-limiting examples of oxygenated terpenes include terpenes containing alcohol, aldehyde, ether, or ketone groups. In some embodiments, the terpene comprises an ether-oxygen, for example, eucalyptol, or a carbonyl oxygen, for example, menthone. In some embodiments the terpene is a terpene alcohol. Non-limiting examples of terpene alcohols include linalool, geraniol, nopol, α-terpineol, and menthol. Non-limiting examples of oxygenated terpenes include eucalyptol, 1,8-cineol, menthone, and carvone.

In some embodiments, the non-aqueous phase (e.g., the solvent) of the microemulsion and/or the diluted microemulsion does not comprise a terpene. It is believed that terpene solvents generally have surface tension values, and provide surface tension values when incorporated into microemulsions and/or diluted microemulsions, that are comparable to conventional hydrocarbon surfactants, and are therefore not especially useful for their surface tension lowering ability when incorporated into a microemulsion or a diluted microemulsion.

Alkyl Aliphatic Carboxylic Acid Esters

In some embodiments, a non-aqueous phase of a microemulsion and/or a non-aqueous phase of a diluted microemulsion comprises an alkyl aliphatic carboxylic acid ester solvent. As used herein "alkyl aliphatic carboxylic acid ester" refers to a compound or a blend of compounds having the general formula:

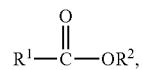

wherein $R^1$ is a $C_6$ to $C_{16}$ optionally substituted aliphatic group, including those bearing heteroatom-containing substituent groups, and $R^2$ is a $C_1$ to $C_6$ alkyl group. In some embodiments, $R^1$ is $C_6$ to $C_{16}$ alkyl. In some embodiments, $R^1$ is substituted with at least one heteroatom-containing substituent group. For example, wherein a blend of compounds is provided and each $R^2$ is —$CH_3$ and each $R^1$ is independently a $C_6$ to $C_{16}$ aliphatic group, the blend of compounds is referred to as methyl aliphatic carboxylic acid esters, or methyl esters. In some embodiments, such alkyl aliphatic carboxylic acid esters may be derived from a fully synthetic process or from natural products, and thus comprise a blend of more than one ester. In some embodiments, the alkyl aliphatic carboxylic acid ester comprises butyl 3-hydroxybutyrate, isopropyl 3-hydroxybutyrate, hexyl 3-hydroxylbutyrate, and combinations thereof. Non-limiting examples of alkyl aliphatic carboxylic acid esters include methyl octanoate, methyl decanoate, a blend of methyl octanoate and methyl decanoate, and butyl 3-hydroxybutyrate.

Alkanes

In some embodiments, a non-aqueous phase of a microemulsion and/or a non-aqueous phase of a diluted microemulsion comprises an unsubstituted cyclic or acyclic, branched or unbranched alkane solvent. In some embodiments, the cyclic or acyclic, branched or unbranched alkane has from 6 to 12 carbon atoms (e.g., from 6 to 10 carbon atoms). When the cyclic or acyclic alkane solvent is branched, the branches may include 1 carbon atom (e.g., in the case of methylated cyclic or acyclic alkane solvents), 2 carbon atoms (e.g., in the case of ethylated cyclic or acyclic alkane solvents), 3 carbon atoms (e.g., in the case of propylated cyclic or acyclic alkane solvents), or more carbon atoms. Non-limiting examples of unsubstituted, acyclic, unbranched alkanes include hexane, heptane, octane, nonane, decane, undecane, dodecane, and combinations thereof. Non-limiting examples of unsubstituted, acyclic, branched alkanes include isomers of methylpentane (e.g., 2-methylpentane, 3-methylpentane), isomers of dimethylbutane (e.g., 2,2-dimethylbutane, 2,3-dimethylbutane), isomers of methylhexane (e.g., 2-methylhexane, 3-methylhexane), isomers of ethylpentane (e.g., 3-ethylpentane), isomers of dimethylpentane (e.g., 2,2,-dimethylpentane, 2,3-dimethylpentane, 2,4-dimethylpentane, 3,3-dimethylpentane), isomers of trimethylbutane (e.g., 2,2,3-trimethylbutane), isomers of methylheptane (e.g., 2-methylheptane, 3-methylheptane, 4-methylheptane), isomers of dimethylhexane (e.g., 2,2-dimethylhexane, 2,3-dimethylhexane, 2,4-dimethylhexane, 2,5-dimethylhexane, 3,3-dimethylhexane, 3,4-dimethylhexane), isomers of ethylhexane (e.g., 3-ethylhexane), isomers of trimethylpentane (e.g., 2,2,3-trimethylpentane, 2,2,4-trimethylpentane, 2,3,3-trimethylpentane, 2,3,4-trimethylpentane), isomers of ethylmethylpentane (e.g., 3-ethyl-2-methylpentane, 3-ethyl-3-methylpentane), and combinations thereof. Non-limiting examples of unsubstituted cyclic branched or unbranched alkanes include cyclohexane, methylcyclopentane, ethylcyclobutane, propylcyclopropane, isopropylcyclopropane, dimethylcyclobutane, cycloheptane, methylcyclohexane, dimethylcyclopentane, ethylcyclopentane, trimethylcyclobutane, cyclooctane, methylcycloheptane, dimethylcyclohexane, ethylcyclohexane, isopropylcyclohexane, cyclononane, methylcyclooctane, dimethylcycloheptane, ethylcycloheptane, trimethylcyclohexane, ethylmethylcyclohexane, propylcyclohexane, cyclodecane, and combinations thereof. In some embodiments, the unsubstituted cyclic or acyclic, branched or unbranched alkane having from 6 to 12 carbon atoms is selected from the group consisting of heptane, octane, nonane, decane, 2,2,4-trimethylpentane (isooctane), and propylcyclohexane, and combinations thereof.

Unsaturated Hydrocarbon Solvents

In some embodiments, a non-aqueous phase of a microemulsion and/or a non-aqueous phase of a diluted microemulsion comprises a solvent that is an unsubstituted acyclic branched alkene or unsubstituted acyclic unbranched alkene having one or two double bonds and from 6 to 12 carbon atoms. In some embodiments, the non-aqueous phase comprises an unsubstituted acyclic branched alkene or unsubstituted acyclic unbranched alkene having one or two double bonds and from 6 to 10 carbon atoms. Non-limiting examples of unsubstituted acyclic unbranched alkenes having one or two double bonds and from 6 to 12 carbon atoms include isomers of hexene (e.g., 1-hexene, 2-hexene), isomers of hexadiene (e.g., 1,3-hexadiene, 1,4-hexadiene), isomers of heptene (e.g., 1-heptene, 2-heptene, 3-heptene), isomers of heptadiene (e.g., 1,5-heptadiene, 1-6, heptadiene), isomers of octene (e.g., 1-octene, 2-octene, 3-octene), isomers of octadiene (e.g., 1,7-octadiene), isomers of nonene, isomers of nonadiene, isomers of decene, isomers of decadiene, isomers of undecene, isomers of undecadiene, isomers of dodecene, isomers of dodecadiene, and combinations thereof. In some embodiments, the acyclic, unbranched alkene having one or two double bonds and from 6 to 12 carbon atoms is an alpha-olefin (e.g., 1-hexene, 1-heptene, 1-octene, 1-nonene, 1-decene, 1-undecene, 1-dodecene). Non-limiting examples of unsubstituted, acyclic, branched alkenes include isomers of methylpentene, isomers of dimethylpentene, isomers of ethylpentene, isomers of methylethylpentene, isomers of propylpentene, isomers of methylhexene, isomers of ethylhexene, isomers of dimethylhexene, isomers of methylethylhexene, isomers of methylheptene, isomers of ethylheptene, isomers of dimethylheptene, isomers of methylethylheptene, and combinations thereof. In a particular embodiment, the unsubstituted, acyclic, unbranched alkene having one or two double bonds and from 6 to 12 carbon atoms is 1-octene, 1,7-octadiene, or a combination thereof.

Aromatic Solvents

In some embodiments, a non-aqueous phase of a microemulsion and/or a non-aqueous phase of a diluted microemulsion comprises an aromatic solvent having a boiling point from 300 to 400° F. Non-limiting examples of aromatic solvents having a boiling point from 300 to 400° F. include butylbenzene, hexylbenzene, mesitylene, light aromatic naphtha, heavy aromatic naphtha, and combinations thereof.

In some embodiments, a non-aqueous phase of a microemulsion and/or a non-aqueous phase of a diluted microemulsion comprises an aromatic solvent having a boiling point from 175 to 300° F. Non-limiting examples of aromatic liquid solvents having a boiling point from 175 to 300° F. include benzene, xylenes, and toluene. In a particular embodiment, the non-aqueous phase does not comprise toluene or benzene.

Dialkyl Ethers

In some embodiments, a non-aqueous phase of a microemulsion and/or a non-aqueous phase of a diluted microemulsion comprises a solvent that is a branched or unbranched dialkylether having the formula $C_nH_{2n+1}OC_mH_{2m+1}$ wherein n+m is from 6 to 16. In some embodiments, n+m is from 6 to 12, or from 6 to 10, or from 6 to 8. Non-limiting examples of branched or unbranched dialkylether compounds having the formula $C_nH_{2n+1}OC_mH_{2m+1}$ include isomers of $C_3H_7OC_3H_7$, isomers of $C_4H_9OC_3H_7$, isomers of $C_5H_{11}OC_3H_7$, isomers of $C_6H_{13}OC_3H_7$, isomers of $C_4H_9OC_4H_9$, isomers of $C_4H_9OC_5H_{11}$, isomers of $C_4H_9OC_6H_{13}$, isomers of $C_5H_{11}OC_6H_{13}$, and isomers of $C_6H_{13}OC_6H_{13}$. In a particular embodiment, the branched or unbranched dialkylether is an isomer of $C_6H_{13}OC_6H_{13}$ (e.g., dihexylether).

Bicyclic Hydrocarbon Solvents

In some embodiments, a non-aqueous phase of a microemulsion and/or a non-aqueous phase of a diluted microemulsion comprises a bicyclic hydrocarbon solvent with varying degrees of unsaturation including fused, bridgehead, and spirocyclic compounds. Non-limiting examples of bicyclic solvents include isomers of decalin, tetrahydronaphthalene, norbornane, norbornene, bicyclo[4.2.0]octane, bicyclo[3.2.1]octane, spiro[5.5]dodecane, and combinations thereof.

Alcohols

In some embodiments, a non-aqueous phase of a microemulsion and/or a non-aqueous phase of a diluted microemulsion comprises a solvent that is a cyclic or acyclic, branched or unbranched alkane having from 6 to 12 carbon atoms or from 5 to 10 carbon atoms, and substituted with a hydroxyl group. Non-limiting examples of cyclic or acyclic, branched or unbranched alkanes having from 6 to 12 carbon atoms or from 5 to 10 carbon atoms, and substituted with a hydroxyl group include isomers of nonanol, isomers of decanol, isomers of undecanol, isomers of dodecanol, and combinations thereof. In a particular embodiment, the cyclic or acyclic, branched or unbranched alkane having from 9 to 12 carbon atoms and substituted with a hydroxyl group is 1-nonanol, 1-decanol, or a combination thereof.

Non-limiting examples of cyclic or acyclic, branched or unbranched alkanes having from 5 to 10 carbon atoms, and substituted with a hydroxyl group include isomers of pentanol, isomers of hexanol, and isomers of heptanol.

Non-limiting examples of cyclic or acyclic, branched or unbranched alkanes having 8 carbon atoms and substituted with a hydroxyl group include isomers of octanol (e.g., 1-octanol, 2-octanol, 3-octanol, 4-octanol), isomers of methyl heptanol, isomers of ethylhexanol (e.g., 2-ethyl-1-hexanol, 3-ethyl-1-hexanol, 4-ethyl-1-hexanol), isomers of dimethylhexanol, isomers of propylpentanol, isomers of methylethylpentanol, isomers of trimethylpentanol, and combinations thereof. In a particular embodiment, the cyclic or acyclic, branched or unbranched alkane having 8 carbon atoms and substituted with a hydroxyl group is 1-octanol, 2-ethyl-1-hexanol, or a combination thereof.

Amine Solvents

In some embodiments, a non-aqueous phase of a microemulsion and/or a non-aqueous phase of a diluted microemulsion comprises a solvent that is an amine of the formula $NR^1R^2R^3$, wherein $R^1$, $R^2$, and $R^3$ are the same or different and are $C_{1-16}$ alkyl groups that are (i) branched or unbranched; (ii) cyclic or acyclic; and (iii) substituted or unsubstituted. In some embodiments any two of $R^1$, $R^2$, and $R^3$ are joined together to form a ring. In some embodiments, each of $R^1$, $R^2$, and $R^3$ are the same or different and are hydrogen or alkyl groups that are (i) branched or unbranched; (ii) cyclic or acyclic; and (iii) substituted or unsubstituted. In some embodiments, any two of $R^1$, $R^2$, and $R^3$ are joined together to form a ring, provided at least one of $R^1$, $R^2$, and $R^3$ is a methyl or an ethyl group. In some embodiments, $R^1$ is $C_1$-$C_6$ alkyl group that is (i) branched or unbranched; (ii) cyclic or acyclic; and (iii) substituted or unsubstituted and $R^2$ and $R^3$ are hydrogen or a $C_{8-16}$ alkyl group that is (i) branched or unbranched; (ii) cyclic or acyclic; and (iii) substituted or unsubstituted. In some embodiments, $R^2$ and $R^3$ may be joined together to form a ring. In some embodiments, $R^1$ is a methyl or an ethyl group and $R^2$ and $R^3$ are the same or different and are $C_{8-16}$ alkyl groups that are (i) branched or unbranched; (ii) cyclic or acyclic; and (iii) substituted or unsubstituted. In some embodiments $R^2$ and $R^3$ may be joined together to form a ring. In some embodiments, $R^1$ is a methyl group and $R^2$ and $R^3$ are the same or different and are hydrogen or $C_{8-16}$ alkyl groups that are (i) branched or unbranched; (ii) cyclic or acyclic; and (iii) substituted or unsubstituted. In some embodiments $R^2$ and $R^3$ may be joined together to form a ring. In some embodiments, $R^1$ and $R^2$ are the same or different and are hydrogen or $C_1$-$C_6$ alkyl groups that are (i) branched or unbranched; (ii) cyclic or acyclic; and (iii) substituted or unsubstituted and $R^3$ is a $C_{8-16}$ alkyl group that is (i) branched or unbranched; (ii) cyclic or acyclic; and (iii) substituted or unsubstituted. In some embodiments, $R^1$ and $R^2$ are the same or different and are a methyl or an ethyl group and $R^3$ is hydrogen or a $C_{8-16}$ alkyl group that is (i) branched or unbranched; (ii) cyclic or acyclic; and (iii) substituted or unsubstituted. In some embodiments, $R^1$ and $R^2$ are methyl groups and $R^3$ is hydrogen or a $C_{8-16}$ alkyl group that is (i) branched or unbranched; (ii) cyclic or acyclic; and (iii) substituted or unsubstituted.

In some embodiments, the amine is of the formula $NR^1R^2R^3$, wherein $R^1$ is methyl and $R^2$ and $R^3$ are $C_{8-16}$ alkyl groups that are (i) branched or unbranched; (ii) cyclic or acyclic; and (iii) substituted or unsubstituted. In some embodiments $R^2$ and $R^3$ are joined together to form a ring. Non-limiting examples of amines include isomers of N-methyl-octylamine, isomers of N-methyl-nonylamine, isomers of N-methyl-decylamine, isomers of N-methylundecylamine, isomers of N-methyldodecylamine, isomers of N-methyl teradecylamine, isomers of N-methyl-hexadecylamine, and combinations thereof. In some embodiments, the amine is N-methyl-decylamine, N-methyl-hexadecylamine, or a combination thereof.

In some embodiments, the amine is of the formula $NR^1R^2R^3$, wherein $R^1$ is a methyl group and $R^2$ and $R^3$ are the same or different and are $C_{8-16}$ alkyl groups that are (i) branched or unbranched; (ii) cyclic or acyclic; and (iii) substituted or unsubstituted. In some embodiments $R^2$ and $R^3$ are joined together to form a ring. Non-limiting examples of amines include isomers of N-methyl-N-octyloctylamine, isomers of N-methyl-N-nonylnonylamine, isomers of N-methyl-N-decyldecylamine, isomers of N-methyl-N-undecylundecylamine, isomers of N-methyl-N-dodecyldodecylamine, isomers of N-methyl-N-tetradecylteradecylamine, isomers of N-methyl-N-hexadecylhexadecylamine, isomers of N-methyl-N-octylnonylamine, isomers of N-methyl-N-octyldecylamine, isomers of N-methyl-N-octyldodecylamine, isomers of N-methyl-N-octylundecylamine, isomers of N-methyl-N-octyltetradecylamine, isomers of N-methyl-N-octylhexadecylamine, N-methyl-N-nonyldecylamine, isomers of N-methyl-N-nonyldodecylamine, isomers of N-methyl-N-nonyltetradecylamine, isomers of N-methyl-N-nonylhexadecylamine, isomers of N-methyl-N-decylundecylamine, isomers of N-methyl-N-decyldodecylamine, isomers of N-methyl-N-decyltetradecylamine, isomers of N-methyl-N-decylhexadecylamine, isomers of N-methyl-N-dodecylundecylamine, isomers of N-methyl-N-dodecyltetradecylamine, isomers of N-methyl-N-dodecylhexadecylamine, isomers of N-methyl-N-tetradecylhexadecylamine, and combinations thereof. In some embodiments, the amine is selected from the group consisting of N-methyl-N-octyloctylamine, isomers of N-methyl-N-nonylnonylamine, isomers of N-methyl N-decyldecylamine, isomers of N-methyl-N-undecylundecylamine, isomers of N-methyl-N-dodecyldodecylamine, isomers of N-methyl-N-tetradecylteradecylamine, and isomers of N-methyl-N-hexadecylhexadecylamine, and combinations thereof. In some embodiments, the amine is N-methyl-N-dodecyldodecylamine, one or more isomers of N-methyl-N-hexadecylhexadecylamine, or combinations thereof. In some embodiments, the amine is selected from the group consisting of isomers of N-methyl-N-octylnonylamine, isomers of N-methyl-N-octyldecylamine, isomers of N-methyl-N-octyldodecylamine, isomers of N-methyl-N-octylundecylamine, isomers of N-methyl-N-octyltetradecylamine, isomers of N-methyl-N-octylhexadecylamine, N-methyl-N-nonyldecylamine, isomers of N-methyl-N-nonyldodecylamine, isomers of N-methyl-N-nonyltetradecylamine, isomers of N-methyl-N-nonylhexadecylamine, isomers of N-methyl-N-decyldodecylamine, isomers of N-methyl-N-decylundecylamine, isomers of N-methyl-N-decyldodecylamine, isomers of N-methyl-N-decyltetradecylamine, isomers of N-methyl-N-decylhexadecylamine, isomers of N-methyl-N-dodecylundecylamine, isomers of N-methyl-N-dodecyltetradecylamine, isomers of N-methyl-N-dodecylhexadecylamine, isomers of N-methyl-N-tetradecylhexadecylamine, and combinations thereof. In some embodiments, the cyclic or acyclic, branched or unbranched tri-substituted amine is selected from the group consisting of N-methyl-N-octyldodecylamine, N-methyl-N-octylhexadecylamine, and N-methyl-N-dodecylhexadecylamine, and combinations thereof.

In some embodiments, the amine is of the formula $NR^1R^2R^3$, wherein $R^1$ and $R^2$ are methyl and $R^3$ is a $C_{8-16}$ alkyl that is (i) branched or unbranched; (ii) cyclic or acyclic; and (iii) substituted or unsubstituted. Non-limiting examples of amines include isomers of N,N-dimethylnonylamine, isomers of N,N-dimethyldecylamine, isomers of N,N-dimethylundecylamine, isomers of N,N-dimethyldodecylamine, isomers of N,N-dimethyltetradecylamine, and isomers of N,N-dimethylhexadecylamine. In some embodiments, the amine is selected from the group consisting of N,N-dimethyldecylamine, isomers of N,N-dodecylamine, and isomers of N,N-dimethylhexadecylamine.

Amide Solvents

In some embodiments, a non-aqueous phase of a microemulsion and/or a non-aqueous phase of a diluted microemulsion comprises an amide solvent. In some embodiments, the amide is of the formula $N(C=OR^4)R^5R^6$, wherein $R^4$, $R^5$, and $R^6$ are the same or different and are hydrogen or $C_{4-6}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. In some embodiments, each of $R^4$, $R^5$, and $R^6$ are the same or different and are hydrogen or $C_{4-6}$ alkyl groups wherein the alkyl groups are (i) branched or unbranched; (ii) cyclic or acyclic; and (iii) substituted or unsubstituted, provided at least one of $R^4$, $R^5$, and $R^6$ is a methyl or an ethyl group. In some embodiments $R^5$ and $R^6$ are joined together to form a ring. In some embodiments, $R^4$ is hydrogen, $C_1$-$C_6$ alkyl, wherein the alkyl group is (i) branched or unbranched; (ii) cyclic or acyclic; and (iii) substituted or unsubstituted, and $R^5$ and $R^6$ are the same or different and are hydrogen or $C_{8-16}$ alkyl groups wherein the alkyl groups are (i) branched or unbranched; (ii) cyclic or acyclic; and (iii) substituted or unsubstituted. In some embodiments, $R^5$ and $R^6$ are joined together to form a ring. In some embodiments, $R^4$ is hydrogen, methyl, or ethyl and $R^5$ and $R^6$ are $C_{8-16}$ alkyl groups wherein the alkyl groups are (i) branched or unbranched; (ii) cyclic or acyclic; and (iii) substituted or unsubstituted. In some embodiments, $R^5$ and $R^6$ are joined together to form a ring. In some embodiments, $R^4$ is hydrogen and $R^5$ and $R^6$ are the same or different and are $C_{8-16}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. In some embodiments, $R^4$ and $R^5$ are the same or different and are hydrogen or $C_1$-$C_6$ alkyl groups wherein the alkyl groups are (i) branched or unbranched; (ii) cyclic or acyclic; and (iii) substituted or unsubstituted and $R^6$ is a $C_{8-16}$ alkyl group that is (i) branched or unbranched; (ii) cyclic or acyclic; and (iii) substituted or unsubstituted. In some embodiments, $R^4$ and $R^5$ are the same or different and are independently hydrogen, methyl, or ethyl and $R^6$ is a $C_{8-16}$ alkyl group that is (i) branched or unbranched; (ii) cyclic or acyclic; and (iii) substituted or unsubstituted. In some embodiments, $R^4$ and $R^5$ are hydrogen and $R^6$ is a $C_{8-16}$ alkyl group that is (i) branched or unbranched; (ii) cyclic or acyclic; and (iii) substituted or unsubstituted. In some embodiments, $R^6$ is hydrogen or $R^6$ is a $C_{1-6}$ alkyl group that is (i) branched or unbranched; (ii) cyclic or acyclic; and (iii) substituted or unsubstituted and $R^4$ and $R^5$ are the same or different and are $C_{8-16}$ alkyl groups wherein the alkyl groups are (i) branched or unbranched; (ii) cyclic or acyclic; and (iii) substituted or unsubstituted. In some embodiments, $R^6$ is hydrogen, methyl, or ethyl and $R^4$ and $R^5$ are the same or different and are $C_{8-16}$ alkyl groups wherein the alkyl groups are (i) branched or unbranched; (ii) cyclic or acyclic; and (iii) substituted or unsubstituted. In some embodiments, $R^6$ is hydrogen and $R^4$ and $R^5$ are the same or different and are $C_{8-16}$ alkyl groups wherein the alkyl groups are (i) branched or unbranched; (ii) cyclic or acyclic; and (iii) substituted or unsubstituted. In some embodiments, $R^5$ and $R^6$ are the same or different and are hydrogen or $C_{1-6}$ alkyl groups wherein the alkyl groups are (i) branched or unbranched; (ii) cyclic or acyclic; and (iii) substituted or unsubstituted, and $R^4$ is a $C_{8-16}$ alkyl group that is (i) branched or unbranched; (ii) cyclic or acyclic; and (iii) substituted or unsubstituted. In some embodiments, $R^5$ and $R^6$ are the same or different and are independently hydrogen, methyl, or ethyl and $R^4$ is a $C_{8-16}$ alkyl group that is (i) branched or unbranched; (ii) cyclic or acyclic; and (iii) substituted or unsubstituted. In some embodiments, $R^5$ and $R^6$ are hydrogen and $R^4$ is a $C_{8-16}$ alkyl group that is (i) branched or unbranched; (ii) cyclic or acyclic; and (iii) substituted or unsubstituted.

In some embodiments, the amide is of the formula $N(C=OR^4)R^5R^6$, wherein each of $R^4$, $R^5$, and $R^6$ are the same or different and are $C_{4-16}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. In some embodiments, the amide is of the formula $N(C=O R^4)R^5R^6$, wherein each of $R^4$, $R^5$, and $R^6$ are the same or different and are $C_{8-16}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. Non-limiting examples of amides include N,N-dioctyloctamide, N,N-dinonylnonamide, N,N-didecyldecamide, N,N-didodecyldodecamide, N,N-diundecylundecamide, N,N-ditetradecyltetradecamide, N,N-dihexadecylhexadecamide, N,N- didecyloctamide, N,N-didodecyloctamide, N,N-dioctyldodecamide, N,N-didecyldodecamide, N,N-dioctylhexadecamide, N,N-didecylhexadecamide, N,N-didodecylhexadecamide, and combinations thereof. In some embodiments, the amide is N,N-dioctyldodecamide, N,N-didodecyloctamide, or a combination thereof.

In some embodiments, the amide is of the formula N(C=OR$^4$)R$^5$R$^6$, wherein R$^6$ is selected from the group consisting of hydrogen, methyl, ethyl, propyl and isopropyl, and R$^4$ and R$^5$ are the same or different and are C$_{4-16}$ alkyl groups wherein the alkyl groups are (i) branched or unbranched; (ii) cyclic or acyclic; and (iii) substituted or unsubstituted. In some embodiments, R$^6$ is selected from the group consisting of hydrogen, methyl, ethyl, propyl and isopropyl, and R$^4$ and R$^5$ are the same or different and are C$_{4-8}$ alkyl groups wherein the alkyl groups are (i) branched or unbranched; (ii) cyclic or acyclic; and (iii) substituted or unsubstituted. In some embodiments, at least one of R$^4$ and R$^5$ is substituted with a hydroxyl group. In some embodiments, at least one of R$^4$ and R$^5$ is C$_{1-16}$ alkyl substituted with a hydroxyl group.

In some embodiments, the amide is of the formula N(C=OR$^4$)R$^5$R$^6$, wherein R$^6$ is C$_1$-C$_3$ alkyl and R$^4$ and R$^5$ are the same or different and are C$_{4-16}$ alkyl groups that are (i) branched or unbranched; (ii) cyclic or acyclic; and (iii) substituted or unsubstituted. In some embodiments, R$^6$ is selected from the group consisting of methyl, ethyl, propyl, and isopropyl, and R$^4$ and R$^5$ are the same or different and are C$_{4-16}$ alkyl groups that are (i) branched or unbranched; (ii) cyclic or acyclic; and (iii) substituted or unsubstituted. In some embodiments, R$^6$ is selected from the group consisting of methyl, ethyl, propyl, and isopropyl, and R$^4$ and R$^5$ are the same or different and are C$_{8-16}$ alkyl groups that are (i) branched or unbranched; (ii) cyclic or acyclic; and (iii) substituted or unsubstituted. In some embodiments, at least one of R$^4$ and R$^5$ is substituted with a hydroxyl group. In some embodiments, R$^6$ is selected from the group consisting of methyl, ethyl, propyl, and isopropyl, and R$^4$ and R$^5$ are the same or different and are C$_{4-16}$ alkyl groups that are (i) branched or unbranched; (ii) cyclic or acyclic; and (iii) substituted or unsubstituted. In some embodiments at least one of R$^4$ and R$^5$ is C$_{1-16}$ alkyl substituted with a hydroxyl group.

Non-limiting examples of amides include N,N-di-tert-butylformamide, N,N-dipentylformamide, N,N-dihexylformamide, N,N-diheptylformamide, N,N-dioctylformamide, N,N-dinonylformamide, N,N-didecylformamide, N,N-diundecylformamide, N,N-didodecylformamide, N,N-dihydroxymethylformamide, N,N-di-tert-butylacetamide, N,N-dipentylacetamide, N,N-dihexylacetamide, N,N-diheptylacetamide, N,N-dioctylacetamide, N,N-dinonylacetamide, N,N-didecylacetamide, N,N-diundecylacetamide, N,N-didodecylacetamide, N,N-dihydroxymethylacetamide, N,N-dimethylpropionamide, N,N-diethylpropionamide, N,N-dipropylpropionamide, N,N-di-n-propylpropionamide N,N-diisopropylpropionamide, N,N-dibutylpropionamide, N,N-di-n-butylpropionamide, N,N-di-sec-butylpropionamide, N,N-diisobutylpropionamide or N,N-di-tert-butylpropionamide, N,N-dipentylpropionamide, N,N-dihexylpropionamide, N,N-diheptylpropionamide, N,N-dioctylpropionamide, N,N-dinonylpropionamide, N,N-didecylpropionamide, N,N-diundecylpropionamide, N,N-didodecylpropionamide, N,N-dimethyl-n-butyramide, N,N-dipropyl-n-butyramide, N,N-di-n-propyl-n-butyramide or N,N-diisopropyl-n-butyramide, N,N-dibutyl-n-butyramide, N,N-di-n-butyl-n-butyramide, N,N-di-sec-butyl-n-butyramide, N,N-diisobutyl-n-butyramide, N,N-di-tert-butyl-n-butyramide, N,N-dipentyl-n-butyramide, N,N-dihexyl-n-butyramide, N,N-diheptyl-n-butyramide, N,N-dioctyl-n-butyramide, N,N-dinonyl-n-butyramide, N,N-didecyl-n-butyramide, N,N-diundecyl-n-butyramide, N,N-didodecyl-n-butyramide, N,N-dipentylisobutyramide, N,N-dihexylisobutyramide, N,N-diheptylisobutyramide, N,N-dioctylisobutyramide, N,N-dinonylisobutyramide, N,N-didecylisobutyramide, N,N-diundecylisobutyramide, N,N-didodecylisobutyramide, N,N-pentylhexylformamide, N,N-pentylhexylacetamide, N,N-pentylhexylpropionamide, N,N-pentylhexyl-n-butyramide, N,N-pentylhexylisobutyramide, N,N-methylethylpropionamide, N,N-methyl-n-propylpropionamide, N,N-methylisopropylpropionamide, N,N-methyl-n-butylpropionamide, N,N-methylethyl-n-butyramide, N,N-methyl-n-butyramide, N,N-methylisopropyl-n-butyramide, N,N-methyl-n-butyl-n-butyramide, N,N-methylethylisobutyramide, N,N-methyl-n-propylisobutyramide, N,N-methylisopropylisobutyramide, and N,N-methyl-n-butylisobutyramide. In some embodiments, the amide is selected from the group consisting of N,N-dioctyldodecacetamide, N,N-methyl-N-octylhexadecyldidodecylacetamide, N-methyl-N-hexadecyldodecylhexadecacetamide, and combinations thereof.

In some embodiments, the amide is of the formula N(C=OR$^4$)R$^5$R$^6$, wherein R$^6$ is hydrogen or a methyl group and R$^4$ and R$^5$ are C$_{8-16}$ alkyl groups that are (i) branched or unbranched; (ii) cyclic or acyclic; and (iii) substituted or unsubstituted. Non-limiting amides include isomers of N-methyloctamide, isomers of N-methylnonamide, isomers of N-methyldecamide, isomers of N-methylundecamide, isomers of N methyldodecamide, isomers of N methylteradecamide, and isomers of N-methyl-hexadecamide. In some embodiments, the amides are selected from the group consisting of N-methyloctamide, N-methyldodecamide, N-methylhexadecamide, and combinations thereof.

Non-limiting amides include isomers of N-methyl-N-octyloctamide, isomers of N-methyl-N-nonylnonamide, isomers of N-methyl-N-decyldecamide, isomers of N methyl-N undecylundecamide, isomers of N methyl-N-dodecyldodecamide, isomers of N methyl N-tetradecylteradecamide, isomers of N-methyl-N-hexadecylhdexadecamide, isomers of N-methyl-N-octylnonamide, isomers of N-methyl-N-octyldecamide, isomers of N-methyl-N-octyldodecamide, isomers of N-methyl-N-octylundecamide, isomers of N-methyl-N-octyltetradecamide, isomers of N-methyl-N-octylhexadecamide, N-methyl-N-nonyldecamide, isomers of N-methyl-N-nonyldodecamide, isomers of N-methyl-N-nonyltetradecamide, isomers of N-methyl-N-nonylhexadecamide, isomers of N-methyl-N-decyldodecamide, isomers of N methyl-N-decylundecamide, isomers of N-methyl-N-decyldodecamide, isomers of N-methyl-N-decyltetradecamide, isomers of N-methyl-N-decylhexadecamide, isomers of N methyl-N-dodecylundecamide, isomers of N methyl-N-dodecyltetradecamide, isomers of N-methyl-N-dodecylhexadecamide, isomers of N methyl-N-tetradecylhexadecamide, and combinations thereof. In some embodiments, the amide is selected from the group consisting of isomers of N-methyl-N-octyloctamide, isomers of N-methyl-N-nonylnonamide, isomers of N-methyl-N-decyldecamide, isomers of N methyl-N undecylundecamide, isomers of N methyl-N-dodecyldodecamide, isomers of N methyl N-tetradecylteradecamide, isomers of N-methyl-N-hexadecylhdexadecamide, and combinations thereof. In some embodiments, amide is selected from the group consisting of N-methyl-N-octyloctamide, N methyl-N-dodecyldodecamide, and N-methyl-N-hexadecylhexadecamide. In some embodiments, the amide is selected from the group consisting of isomers of N-methyl-N-octylnonamide, isomers of N-methyl-N-octyldecamide, isomers of N-methyl-N-octyldodecamide, isomers of N-methyl-N-octylundecamide, isomers of N-methyl-N-octyltetradecamide, isomers of N-methyl-N-octylhexadecamide, N-methyl-N-nonyldecamide, isomers of N-methyl-N-nonyldodecamide, isomers of N-methyl-N-nonyltetradecamide, isomers of N-methyl-N-nonylhexadecamide, isomers of N-methyl-N-decyldodecamide, isomers of N methyl-N-decylundecamide, isomers of N-methyl-N-decyldodecamide, isomers of N-methyl-N-decyltetradecamide, isomers of N-methyl-N-decylhexadecamide, isomers of N methyl-N-dodecylundecamide, isomers of N methyl-N-dodecyltetradecamide, isomers of N-methyl-N-dodecylhexadecamide, and isomers of N methyl-N-tetradecylhexadecamide. In some embodiments, the amide is selected from the group consisting of N-methyl-N-octyldodecamide, N-methyl-N-octylhexadecamide, and N-methyl-N-dodecylhexadecamide. In some embodiments, the amide is of the formula $N(C=OR^4)R^5R^6$, wherein $R^5$ and $R^6$ are the same or different and are hydrogen or $C_1$-$C_3$ alkyl groups and $R^4$ is a $C_{4-16}$ alkyl group that is (i) branched or unbranched; (ii) cyclic or acyclic; and (iii) substituted or unsubstituted. In some embodiments, $R^5$ and $R^6$ are the same or different and are selected from the group consisting of hydrogen, methyl, ethyl, propyl and isopropyl, and $R^4$ is a $C_{4-16}$ alkyl group that is (i) branched or unbranched; (ii) cyclic or acyclic; and (iii) substituted or unsubstituted. In some embodiments, $R^5$ and $R^6$ are the same or different and are selected from the group consisting of hydrogen, methyl, ethyl, propyl and isopropyl and $R^4$ is a $C_{8-16}$ alkyl group that is (i) branched or unbranched; (ii) cyclic or acyclic; and (iii) substituted or unsubstituted. In some embodiments, $R^4$ is substituted with a hydroxyl group. In some embodiments, $R^5$ and $R^6$ are the same or different and are selected from the group consisting of hydrogen, methyl, ethyl, propyl, and isopropyl, and $R^4$ is selected from the group consisting of tert-butyl and $C_{5-16}$ alkyl groups that are (i) branched or unbranched; (ii) cyclic or acyclic; and (iii) substituted or unsubstituted, and $C_{1-16}$ alkyl groups that are (i) branched or unbranched; (ii) cyclic or acyclic; and (iii) substituted with a hydroxyl group.

In some embodiments, the amide is of the formula $N(C=OR^4)R^5R^6$, wherein $R^5$ and $R^6$ are methyl groups and $R^4$ is a $C_{8-16}$ alkyl group that is (i) branched or unbranched; (ii) cyclic or acyclic; and (iii) substituted or unsubstituted. Non-limiting examples of amides include isomers of N,N-dimethyloctamide, isomers of N,N-dimethylnonamide, isomers of N,N-dimethyldecamide, isomers of N,N-dimethylundecamide, isomers of N,N-dimethyldodecamide, isomers of N,N-dimethyltetradecamide, isomers of N,N-dimethylhexadecamide, and combinations thereof. In some embodiments, the cyclic or acyclic, branched or unbranched trisubstituted amines is selected from the group consisting of N,N-dimethyloctamide, N,N-dodecamide, and N,N-dimethylhexadecamide.

Silicone/Siloxane Solvents

In some embodiments, a non-aqueous phase of a microemulsion and/or a non-aqueous phase of a diluted microemulsion comprises a methyl siloxane solvent, also known as a silicone solvent. The microemulsion and/or diluted microemulsion may comprise a single methyl siloxane solvent or a combination of two or more methyl siloxane solvents. Methyl siloxane solvents may be classified as linear, cyclic, or branched. Methyl siloxane solvents are a class of oligomeric liquid silicones that possess the characteristics of low viscosity and high volatility. Non-limiting examples of linear siloxane solvents include hexamethyldisiloxane, octamethyltrisiloxane, decamethyltetrasiloxane, and dodecamethylpentasiloxane. Non-limiting examples of cyclic siloxane solvents include octamethylcyclotetrasiloxane, decamethylcyclopentasiloxane, and dodecamethylcyclohexasiloxane.

In some embodiments a non-aqueous phase of a microemulsion and/or a non-aqueous phase of a diluted microemulsion comprises a first type of siloxane solvent and a second type of siloxane solvent.

The siloxanes used in this embodiment can be linear methyl siloxanes, cyclic methyl siloxanes, branched methyl siloxanes, and combinations thereof. The linear methyl siloxanes have the formula

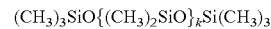
$(CH_3)_3SiO\{(CH_3)_2SiO\}_kSi(CH_3)_3$ wherein the value of k is 0-5. The cyclic methyl siloxanes have the formula

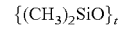
$\{(CH_3)_2SiO\}_t$ wherein the value of t is 3-6. Preferably, these methyl siloxanes have a boiling point less than 250° C. and viscosity of 0.65 to 5.0 cSt.

In some embodiments, the silicone solvent is 0.65 cSt polydimethylsiloxane, trimethylsiloxy terminated. In some embodiments, the silicone solvent is 1.0 cSt polydimethylsiloxane, trimethylsiloxy terminated. In some embodiments, the silicone solvent is 1.5 cSt polydimethylsiloxane, trimethylsiloxy terminated. In some embodiments, the silicone solvent is 2 cSt polydimethylsiloxane, trimethylsiloxy terminated. In some embodiments, the silicone solvent is 3 cSt polydimethylsiloxane, trimethylsiloxy terminated.

In some embodiments, the silicone solvent has a low molecular weight. In certain embodiments, the molecular weight of the silicone solvent ranges between 150 g/mol and 800 g/mol. In some embodiments, the molecular weight of the silicone solvent is greater than or equal to 150 g/mol, greater than or equal to 200 g/mol, greater than or equal to 300 g/mol, greater than or equal to 370 g/mol, greater than or equal to 500 g/mol, greater than or equal to 550 g/mol, or greater than or equal to 770 g/mol. In certain embodiments, the molecular weight of the silicone solvent is less than or equal to 800 g/mol, less than or equal to 770 g/mol, less than or equal to 550 g/mol, less than or equal to 500 g/mol, less than or equal to 370 g/mol, less than or equal to 300 g/mol, or less than or equal to 200 g/mol. Combinations of the above-referenced ranges are also possible (e.g., between 162 g/mol and 770 g/mol; between 162 g/mol and 550 g/mol; between 162 g/mol and 370 g/mol). Other ranges and molecular weights are also possible.

Some representative linear methyl siloxanes are hexamethyldisiloxane with a boiling point of 100° C., viscosity of 0.65 cSt, and structure

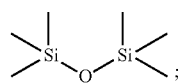

octamethyltrisiloxane with a boiling point of 152° C., viscosity of 1.04 cSt, and structure

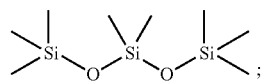

decamethyltetrasiloxane with a boiling point of 194° C., viscosity of 1.53 cSt, and structure

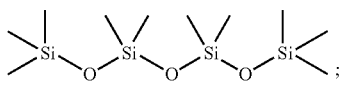

dodecamethylpentasiloxane with a boiling point of 229° C., viscosity of 2.06 cSt, and structure

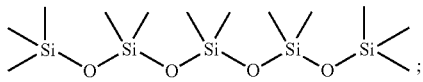

tetradecamethylhexasiloxane with a boiling point of 245° C., viscosity of 2.63 cSt, and structure

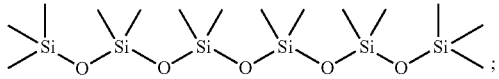

and hexadecamethylheptasiloxane with a boiling point of 270° C., viscosity of 3.24 cSt, and structure

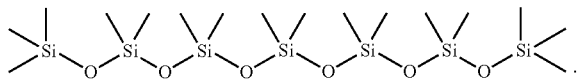

Some representative cyclic methyl siloxanes are hexamethylcyclotrisiloxane with a boiling point of 134° C. and structure

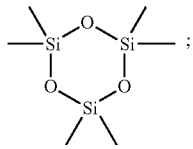

octamethylcyclotetrasiloxane with a boiling point of 176° C., viscosity of 2.3 cSt, and structure

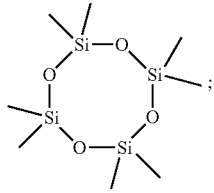

decamethylcyclopentasiloxane with a boiling point of 210° C., viscosity of 3.87 cSt, and structure

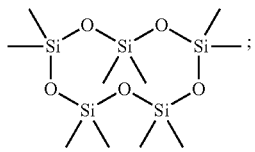

and dodecamethylcyclohexasiloxane with a boiling point of 245° C., viscosity of 6.62 cSt, and structure

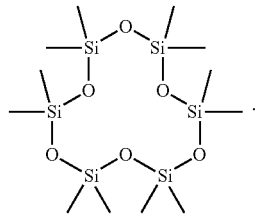

In some embodiments, a solvent (e.g., a terpene) may be extracted from a natural source (e.g., citrus, pine), and may comprise one or more impurities present from the extraction process. In some embodiments, the solvent comprises a crude cut (e.g., uncut crude oil, e.g., made by settling, separation, heating, etc.). In some embodiments, the solvent is a crude oil (e.g., naturally occurring crude oil, uncut crude oil, crude oil extracted from the wellbore, synthetic crude oil, crude citrus oil, crude pine oil, eucalyptus, etc.). In some embodiments, the solvent comprises a citrus extract (e.g., crude orange oil, orange oil, etc.). In some embodiments, the solvent is a citrus extract (e.g., crude orange oil, orange oil, etc.).

In some embodiments, a non-aqueous phase of a microemulsion and/or a non-aqueous phase of a diluted microemulsion may comprise a plant-based methyl ester (e.g. soy methyl ester, canola methyl ester). In some embodiments, the non-aqueous phase of a diluted microemulsion may comprise an alkyl aliphatic ester solvent. In some embodiments, the alkyl aliphatic ester solvent is a methyl ester. In some embodiments, the non-aqueous phase of a diluted microemulsion may comprise a solvent selected from the group consisting of soy methyl ester, canola methyl ester, octanoic acid methyl ester, decanoic acid methyl ester, dodecanoic acid methyl ester, palm methyl ester, coconut methyl ester, undecanoic acid methyl ester, tridecanoic acid methyl ester, tetradecanoic acid methyl ester, pentadecanoic acid methyl ester, hexadecanoic acid methyl ester, 9-decenoic acid methyl ester, 10-undecenoic acid methyl ester, 11-dodecenoic acid methyl ester, 12-tridecenoic acid methyl ester, 13-tetradecenoic acid methyl ester, 14-pentadecenoic acid methyl ester, 15-hexadecenoic acid methyl ester, or combinations thereof. In some embodiments, the third type of solvent is butyl 3-hydroxybutanoate. In some embodiments, a non-aqueous phase of a microemulsion and/or a non-aqueous phase of a diluted microemulsion may comprise an alcohol. In some embodiments, the alcohol is selected from the group consisting of primary, secondary, and tertiary alcohols having from 1 to 20 carbon atoms. Non-limiting examples of alcohols include methanol, ethanol, isopropanol, n-propanol, n-butanol, i-butanol, sec-butanol, iso-butanol, t-butanol, ethylene glycol, propylene glycol, dipropylene glycol monomethyl ether, triethylene glycol, and ethylene glycol monobutyl ether.

In some embodiments, a non-aqueous phase of a microemulsion and/or a non-aqueous phase of a diluted microemulsion comprises a solvent that serves as a coupling agent between the other components of the non-aqueous phase (e.g., a solvent or combination of solvents therein) and the one or more surfactant. Without wishing to be bound by any theory, it is believed that alkyl aliphatic ester solvents may have this property.

Surfactants

A wide variety of suitable surfactants may be employed in the microemulsions and diluted microemulsions described herein, examples of which are provided in further detail below. The surfactant may make up any suitable amount of the microemulsion (e.g., of the components of the diluted microemulsion other than the dilution phase). The surfactant may make up greater than or equal to 0.1 wt %, greater than or equal to 0.2 wt %, greater than or equal to 0.5 wt %, greater than or equal to 1 wt %, greater than or equal to 2 wt %, greater than or equal to 5 wt %, greater than or equal to 10 wt %, greater than or equal to 20 wt %, greater than or equal to 30 wt %, greater than or equal to 40 wt %, greater than or equal to 50 wt %, greater than or equal to 60 wt % of the microemulsion, or greater than or equal to 65 wt % of the micromeulsion. The surfactant may make up less than or equal to 65 wt %, less than or equal to 60 wt %, less than or equal to 50 wt %, less than or equal to 40 wt %, less than or equal to 30 wt %, less than or equal to 20 wt %, less than or equal to 10 wt %, less than or equal to 5 wt %, less than or equal to 2 wt %, less than or equal to 1 wt %, less than or equal to 0.5 wt %, less than or equal to 0.2 wt %, or less than or equal to 0.1 wt % of the microemulsion. Combinations of the above-referenced ranges are also possible (e.g., greater than or equal to 0.1 wt % and less than or equal to 65 wt % of the microemulsion, greater than or equal to 10 wt % and less than or equal to 30 wt % of the microemulsion, or greater than or equal to 20 wt % and less than or equal to 30 wt % of the microemulsion). Other ranges are also possible.

Non-limiting examples of suitable surfactants include nonionic surfactants with linear or branched structure, including, but not limited to, alkoxylated alcohols, alkoxylated fatty alcohols, alkoxylated castor oils, alkoxylated fatty acids, and alkoxylated fatty amides with a hydrocarbon chain of at least 8 carbon atoms and 5 units or more of alkoxylation. The term alkoxylation includes ethoxylation and propoxylation. Other nonionic surfactants include alkyl glycosides and alkyl glucamides.

Surfactants described herein may have a variety of surface tensions. A microemulsion and/or a diluted microemulsion may comprise a surfactant with a surface tension of less than or equal to 45 mN/m, less than or equal to 43 mN/m, less than or equal to 40 mN/m, less than or equal to 38 mN/m, less than or equal to 35 mN/m, less than or equal to 33 mN/m, less than or equal to 30 mN/m, less than or equal to 28 mN/m, less than or equal to 25 mN/m, less than or equal to 23 mN/m, or less than or equal to 20 mN/m. A microemulsion and/or a diluted microemulsion may comprise a surfactant with a surface tension of greater than or equal to 20 mN/m, greater than or equal to 23 mN/m, greater than or equal to 25 mN/m, greater than or equal to 28 mN/m, greater than or equal to 30 mN/m, greater than or equal to 33 mN/m, greater than or equal to 35 mN/m, greater than or equal to 38 mN/m, greater than or equal to 40 mN/m, greater than or equal to 43 mN/m, or greater than or equal to 45 mN/m. Combinations of the above-referenced ranges are also possible (e.g., less than or equal to 45 mN/m and greater than or equal to 20 mN/m). Other ranges are also possible. It should be understood that the ranges above may refer to a range of surface tensions at a variety of suitable temperatures and pressures. In some embodiments, the surfactant may have a surface tension in one or more of the ranges listed above at a gas well temperature and pressure. In some embodiments, the surfactant may have a surface tension in one or more of the ranges listed above at 60° C. and atmospheric pressure. In some embodiments, the surfactant may have a surface tension in one or more of the ranges listed above at 20° C. and atmospheric pressure.

Below, non-limiting examples of different surfactants that may be present in a microemulsion and/or a diluted microemulsion are provided.

It should be understood that a microemulsion or diluted microemulsion may comprise one surfactant, or may comprise two or more surfactants. In some embodiments, a microemulsion or diluted microemulsion may comprise a co-surfactant in addition to one or more surfactants. The term surfactant is given its ordinary meaning in the art and generally refers to compounds having an amphiphilic structure which gives them a specific affinity for oil/water-type and water/oil-type interfaces. In some embodiments, the affinity helps the surfactants to reduce the free energy of these interfaces and to stabilize the dispersed phase of a microemulsion.

The term surfactant includes but is not limited to nonionic surfactants, anionic surfactants, cationic surfactants, amphoteric surfactants, zwitterionic surfactants, switchable surfactants, cleavable surfactants, dimeric or gemini surfactants, glucamide surfactants, alkyl polyglycoside surfactants, extended surfactants containing a nonionic spacer arm central extension and an ionic or nonionic polar group, and combinations thereof. Nonionic surfactants generally do not contain any charges. Anionic surfactants generally possess a net negative charge. Cationic surfactants generally possess a net positive charge. Amphoteric surfactants generally have both positive and negative charges, however, the net charge of the surfactant can be positive, negative, or neutral, depending on the pH of the solution. Zwitterionic surfactants are generally not pH dependent. A zwitterion is a neutral molecule with a positive and a negative electrical charge, though multiple positive and negative charges can be present.

"Extended surfactants" are defined herein to be surfactants having propoxylated/ethoxylated spacer arms. The extended chain surfactants are intramolecular mixtures having at least one hydrophilic portion and at least one lipophilic portion with an intermediate polarity portion in between the hydrophilic portion and the lipophilic portion; the intermediate polarity portion may be referred to as a spacer. They attain high solubilization in the single phase emulsion or microemulsion, and are in some instances, insensitive to temperature and are useful for a wide variety of oil types, such as natural or synthetic polar oil types in a non-limiting embodiment. More information related to extended chain surfactants may be found in U.S. Pat. No. 8,235,120, which is incorporated herein by reference in its entirety.

The term co-surfactant as used herein is given its ordinary meaning in the art and refers to compounds (e.g., pentanol) that act in conjunction with surfactants to form an emulsion or microemulsion.

In some embodiments, the one or more surfactants is a surfactant described in U.S. patent application Ser. No. 14/212,731, filed Mar. 14, 2014, entitled "METHODS AND COMPOSITIONS FOR USE IN OIL AND/OR GAS WELLS," now published as US/2014/0284053 on Sep. 25, 2014, herein incorporated by reference. In some embodiments, the surfactant is a surfactant described in U.S. patent application Ser. No. 14/212,763, filed Mar. 14, 2014, entitled "METHODS AND COMPOSITIONS FOR USE IN OIL AND/OR GAS WELLS," now published as US/2014/0338911 on Nov. 20, 2014 and issued as U.S. Pat. No. 9,884,988 on Feb. 6, 2018, herein incorporated by reference.

In some embodiments, the surfactants described herein in conjunction with solvents, generally form emulsions or microemulsions that may be diluted to a use concentration to form an oil-in-water nanodroplet dispersion and/or a diluted microemulsion. In some embodiments, the surfactants generally have hydrophile-lipophile balance (HLB) values from 8 to 18, or from 8 to 14.

Hydrocarbon Surfactants

Suitable surfactants for use with the compositions and methods are generally described herein. In some embodiments, a microemulsion and/or a diluted microemulsion comprises a hydrophilic hydrocarbon surfactant. The hydrophilic hydrocarbon surfactant may comprise an alcohol ethoxylate, wherein the alcohol ethoxylate contains a hydrocarbon group of 10 to 18 carbon atoms (e.g., from 12 to 15 carbon atoms) and contains an ethoxylate group of 5 to 12 ethylene oxide units (e.g., 7 ethylene oxide units, 10 ethylene oxide units). Non-limiting examples of suitable alcohol ethoxylates include $C_{12}$-$C_{15}$ $E_7$, $C_{12}$-$C_{15}$ $E_9$, $C_{12}$-$C_{15}$ $E_{12}$, $C_{12}$-$C_{18}$ $E_{10}$, and $C_{12}$ $E_7$.

Nonionic Surfactants

In some embodiments, a microemulsion and/or a diluted microemulsion comprises a nonionic surfactant. In some embodiments, the surfactant is an alkoxylated aliphatic alcohol having from 3 to 40 ethylene oxide (EO) units and from 0 to 20 propylene oxide (PO) units. The term aliphatic alcohol generally refers to a branched or linear, saturated or unsaturated aliphatic moiety having from 6 to 18 carbon atoms.

In some embodiments, a microemulsion and/or a diluted microemulsion comprises a surfactant is selected from the group consisting of ethoxylated fatty acids, ethoxylated fatty amines, and ethoxylated fatty amides wherein the fatty portion is a branched or linear, saturated or unsaturated aliphatic hydrocarbon moiety having from 6 to 18 carbon atoms.

In some embodiments, a microemulsion and/or a diluted microemulsion comprises a surfactant that is an alkoxylated castor oil. In some embodiments, the surfactant is a sorbitan ester derivative. In some embodiments the surfactant is an ethylene oxide—propylene oxide copolymer wherein the total number of ethylene oxide (EO) and propylene oxide (PO) units is from 8 to 40 units. In some embodiments, the surfactant is an alkoxylated tristyryl phenol containing from 6 to 100 total ethylene oxide (EO) and propylene oxide (PO) units (e.g., tristyrylphenol $E_{16}$).

Nonionic Tristyryl Phenol Surfactants

In some embodiments, the surfactant has a structure as in Formula I:

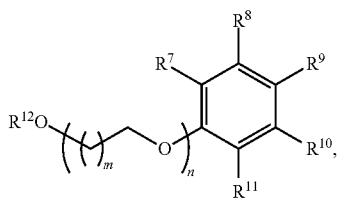

(I)

wherein each of $R^7$, $R^8$, $R^9$, $R^{10}$, and $R^{11}$ are the same or different and are selected from the group consisting of hydrogen, optionally substituted alkyl, and —CH═CHAr, wherein Ar is an aryl group, provided at least one of $R^7$, $R^8$, $R^9$, $R^{10}$, and $R^{11}$ is —CH═CHAr, $R^{12}$ is hydrogen or alkyl, n is 1-100, and each m is independently 1 or 2. In some embodiments, Ar is phenyl. In some embodiments, for a compound of Formula (I), $R^{12}$ is hydrogen or $C_{1-6}$ alkyl. In some embodiments, for a compound of Formula (I), $R^{12}$ is H, methyl, or ethyl. In some embodiments, for a compound of Formula (I), $R^{12}$ is H.

In some embodiments the surfactant of Formula I is a nonionic tristyryl phenol ethoxylate surfactant. In some embodiments, the nonionic tristyryl phenol surfactant comprises a tristyryl phenol ethoxylate containing 10 to 30 ethylene oxide (EO) units. In some embodiments, the nonionic tristyryl phenol surfactant comprises a tristyryl phenol ethoxylate containing 16 ethylene oxide (EO) units.

Amine Surfactants

In some embodiments, a microemulsion and/or a diluted microemulsion comprises an amine-based surfactant selected from the group consisting of ethoxylated alkylene amines, ethoxylated alkyl amines, propoxylated alkylene amines, propoxylated alkyl amines, ethoxylated-propoxylated alkylene amines and ethoxylated propoxylated alkyl amines. The ethoxylated/propoxylated alkylene or alkyl amine surfactant component preferably includes more than one nitrogen atom per molecule. Suitable amines include ethylenediaminealkoxylate and diethylenetriaminealkoxylate.

Polyimine Surfactants

In some embodiments a microemulsion and/or a diluted microemulsion comprises a surfactant that is an alkoxylated polyimine with a relative solubility number (RSN) in the range of 5-20. As will be known to those of ordinary skill in the art, RSN values are generally determined by titrating water into a solution of surfactant in 1,4 dioxane. The RSN values is generally defined as the amount of distilled water necessary to be added to produce persistent turbidity. In some embodiments the surfactant is an alkoxylated novolac resin (also known as a phenolic resin) with a relative solubility number in the range of 5-20. In some embodiments the surfactant is a block copolymer surfactant with a total molecular weight greater than 5000 g/mol.

The block copolymer may have a hydrophobic block that is comprised of a polymer chain that is linear, branched, hyperbranched, dendritic or cyclic.

Glycoside and Glycamide Surfactants

In some embodiments, microemulsion and/or a diluted microemulsion comprises a surfactant that is an aliphatic polyglycoside having the following formula:

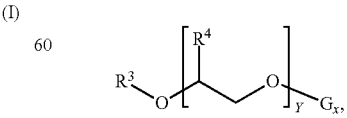

wherein $R^3$ is an aliphatic group having from 6 to 18 carbon atoms; each $R^4$ is independently selected from H, —$CH_3$, or —$CH_2CH_3$; Y is an average number of from 0 to 5; and X is an average degree of polymerization (DP) of from 1 to 4;

G is the residue of a reducing saccharide, for example, a glucose residue. In some embodiments, Y is zero.

In some embodiments, a microemulsion and/or a diluted microemulsion comprises a surfactant that is an aliphatic glycamide having the following formula:

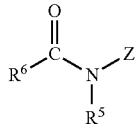

wherein $R^6$ is an aliphatic group having from 6 to 18 carbon atoms; $R^5$ is an alkyl group having from 1 to 6 carbon atoms; and Z is —$CH_2(CH_2OH)_bCH_2OH$, wherein b is from 3 to 5. In some embodiments, $R^5$ is —$CH_3$. In some embodiments, $R^6$ is an alkyl group having from 6 to 18 carbon atoms. In some embodiments, b is 3. In some embodiments, b is 4. In some embodiments, b is 5.

Anionic Surfactants

Suitable anionic surfactants include, but are not necessarily limited to, alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates, fatty carboxylates, alkyl sarcosinates, alkyl phosphates and combinations thereof.

In some embodiments, a microemulsion and/or a diluted microemulsion comprises a surfactant that is an aliphatic sulfate wherein the aliphatic moiety is a branched or linear, saturated or unsaturated aliphatic hydrocarbon moiety having from 6 to 18 carbon atoms. In some embodiments, the surfactant is an aliphatic sulfonate wherein the aliphatic moiety is a branched or linear, saturated or unsaturated aliphatic hydrocarbon moiety having from 6 to 18 carbon atoms.

In some embodiments, a microemulsion and/or a diluted microemulsion comprises a surfactant that is an aliphatic alkoxy sulfate wherein the aliphatic moiety is a branched or linear, saturated or unsaturated aliphatic hydrocarbon moiety having from 6 to 18 carbon atoms and from 4 to 40 total ethylene oxide (EO) and propylene oxide (PO) units.

In some embodiments, a microemulsion and/or a diluted microemulsion comprises a surfactant that is an aliphatic-aromatic sulfate wherein the aliphatic moiety is a branched or linear, saturated or unsaturated aliphatic hydrocarbon moiety having from 6 to 18 carbon atoms. In some embodiments, the surfactant is an aliphatic-aromatic sulfonate wherein the aliphatic moiety is a branched or linear, saturated or unsaturated aliphatic hydrocarbon moiety having from 6 to 18 carbon atoms.

In some embodiments, a microemulsion and/or a diluted microemulsion comprises a surfactant that is an ester or half ester of sulfosuccinic acid with monohydric alcohols.

Anionic Tristyryl Phenol Surfactants

In some embodiments, the surfactant has a structure as in Formula II:

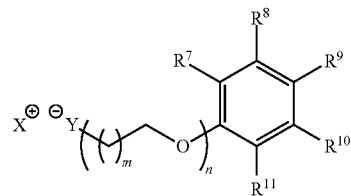

wherein each of $R^7$, $R^8$, $R^9$, $R^{10}$, and $R^{11}$ are the same or different and are selected from the group consisting of hydrogen, optionally substituted alkyl, and —CH=CHAr, wherein Ar is an aryl group, provided at least one of $R^7$, $R^8$, $R^9$, $R^{10}$, and $R^{11}$ is —CH=CHAr, $Y^-$ is an anionic group, $X^+$ is a cationic group, n is 1-100, and each m is independently 1 or 2. In some embodiments, Ar is phenyl. In some embodiments, for a compound of Formula (II), $X^+$ is a metal cation or $N(R^{13})_4$, wherein each $R^{13}$ is independently selected from the group consisting of hydrogen, optionally substituted alkyl, or optionally substituted aryl. In some embodiments, $X^+$ is $NH_4$. Non-limiting examples of metal cations are $Na^+$, $K^+$, $Mg^{+2}$, and $Ca^{+2}$. In some embodiments, for a compound of Formula (II), $Y^-$ is —$O^-$, —$SO_2O^-$, or —$OSO_2O^-$.

Cationic Surfactants

In some embodiments, a microemulsion and/or a diluted microemulsion comprises a cationic surfactant. In some embodiments, a microemulsion and/or a diluted microemulsion comprises a cationic surfactant that is a quaternary alkylammonium salt or a quaternary alkylbenzylammonium salt, whose alkyl groups have 1 to 24 carbon atoms (e.g., a halide, sulfate, phosphate, acetate, or hydroxide salt). In some embodiments, the surfactant is a quaternary alkylbenzylammonium salt, whose alkyl groups have 1-24 carbon atoms (e.g., a halide, sulfate, phosphate, acetate, or hydroxide salt). In In some embodiments, the surfactant is an alkylpyridinium, an alkylimidazolinium, or an alkyloxazolinium salt whose alkyl chain has up to 18 carbons atoms (e.g., a halide, sulfate, phosphate, acetate, or hydroxide salt).

In some embodiments, a microemulsion and/or a diluted microemulsion comprises a surfactant that is a cationic surfactant such as, monoalkyl quaternary amines, such as cocotrimethylammonium chloride, cetyltrimethylammonium chloride, stearyltrimethylammonium chloride, soyatrimethylammonium chloride, behentrimethylammonium chloride, and the like and mixtures thereof. Other suitable cationic surfactants that may be useful include, but are not necessarily limited to, dialkylquaternary amines such as dicetyldimethylammonium chloride, dicocodimethylammonium chloride, distearyldimethylammonium chloride, and the like and mixtures thereof.

Cationic Tristyryl Phenol Surfactants

In some embodiments, the surfactant has a structure as in Formula III:

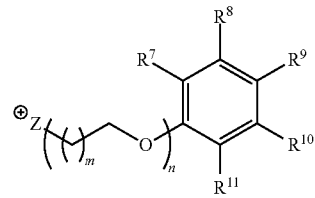

wherein each of $R^7$, $R^8$, $R^9$, $R^{10}$, and $R^{11}$ are the same or different and are selected from the group consisting of hydrogen, optionally substituted alkyl, and —CH=CHAr, wherein Ar is an aryl group, provided at least one of $R^7$, $R^8$, $R^9$, $R^{10}$, and $R^{11}$ is —CH=CHAr, $Z^+$ is a cationic group, n is 1-100, and each m is independently 1 or 2. In some embodiments, Ar is phenyl. In some embodiments, for a compound of Formula (III), $Z^+$ is $N(R^{13})_3$, wherein each $R^{13}$ is independent selected from the group consisting of hydrogen, optionally substituted alkyl, or optionally substituted aryl.

In some embodiments, for a compound of Formula (I), (II), or (III), two of $R^7$, $R^8$, $R^9$, $R^{10}$, and $R^{11}$ are —CH=CHAr. In some embodiments, for a compound of Formula (I), (II), or (III), one of $R^7$, $R^8$, $R^9$, $R^{10}$, and $R^{11}$ is —CH=CHAr and each of the other groups is hydrogen. In some embodiments, for a compound of Formula (I), (II), or (III), two of $R^7$, $R^8$, $R^9$, $R^{10}$, and $R^{11}$ are —CH=CHAr and each of the other groups is hydrogen. In some embodiments, for a compound of Formula (I), (II), or (III), $R^7$ and $R^8$ are —CH=CHAr and $R^9$, $R^{10}$, and $R^{11}$ are each hydrogen. In some embodiments, for a compound of Formula (I), (II), or (III), three of $R^7$, $R^8$, $R^9$, $R^{10}$, and $R^{11}$ are —CH=CHAr and each of the other groups is hydrogen. In some embodiments, for a compound of Formula (I), (II), or (III), $R^7$, $R^8$, and $R^9$ are —CH=CHAr and $R^{1o}$ and $R^{11}$ are each hydrogen. In embodiments, for a compound of Formula (I), (II), or (III), Ar is phenyl. In some embodiments, for a compound of Formula (I), (II), or (III), each m is 1. In some embodiments, for a compound of Formula (I), (II), or (III), each m is 2. In some embodiments, for a compound of Formula (I), (II), or (III), n is 6-100, or 1-50, or 6-50, or 6-25, or 1-25, or 5-50, or 5-25, or 5-20.

Zwitterionic and Amphoteric Surfactants

In some embodiments, a microemulsion and/or a diluted microemulsion comprises a zwitterionic or amphoteric surfactant. In some embodiments, a microemulsion and/or a diluted microemulsion comprises a surfactant that is an amine oxide (e.g., dodecyldimethylamine oxide). In some embodiments, the surfactant is amphoteric or zwitterionic, including sultaines (e.g., cocamidopropyl hydroxysultaine), betaines (e.g., cocamidopropyl betaine), or phosphates (e.g., lecithin).

Organosilicone Surfactants

In some embodiments, a microemulsion and/or a diluted microemulsion comprises an organosilicone surfactant. In some embodiments a microemulsion and/or a diluted microemulsion comprises a mixture of a hydrophilic hydrocarbon surfactant and a hydrophilic organosilicone surfactant. Although the hydrophilic-lipophilic balance (HLB) system cannot strictly be applied to organosilicone surfactants, approximate HLB values for a hydrophilic organosilicone surfactant are from 8 to 18. In some embodiments, the hydrophilic organosilicone surfactant comprises one or more polyalkylene oxide groups containing from 4 to 40 total ethylene oxide (EO) and propylene oxide (PO) units. In some embodiments, the hydrophilic organosilicone surfactant comprises one or more polyethylene oxide groups containing from 4 to 12 ethylene oxide (EO) groups.

In some embodiments, a microemulsion and/or a diluted microemulsion may comprise a single hydrophilic organosilicone surfactant or a combination of two or more hydrophilic organosilicone surfactants. For example, in some embodiments the hydrophilic organosilicone surfactant comprises a first type of hydrophilic organosilicone surfactant and a second type of hydrophilic organosilicone surfactant.

Non-limiting examples of hydrophilic organosilicone surfactants include polyalkyleneoxide-modified pentamethyldisiloxane, polyalkyleneoxide-modified heptamethyltrisiloxane, polyalkyleneoxide-modified nonamethyltetrasiloxane, polyalkyleneoxide-modified undecamethylpentasiloxane, polyalkyleneoxide-modified tridecamethylhexasiloxane and combinations thereof. The polyalkyleneoxide moiety may be end capped with —H, —CH$_3$, an acetoxy group, or an ethoxy group. The polyalkylene oxide group comprises polyethylene oxide, polypropyleneoxide, polybutyleneoxide, and combinations thereof.

In some embodiments, a microemulsion and/or a diluted microemulsion comprise an ethoxylated nonionic organosilicone surfactant. For example, the ethoxylated nonionic organosilicone surfactant may be a trisiloxane with an ethoxylate group having 4 to 12 ethylene oxide (EO) units. Non-limiting examples of such surfactants include trisiloxane surfactants having from 7 to 8 EO units, Momentive® Silwet L-77®, Momentive Silwet 408®, Dow Corning® Q2-5211 superwetting agent, and Dow Corning® Q2-5212 wetting agent.

In some embodiments, a microemulsion and/or a diluted microemulsion comprises a hydrophilic organosilicone surfactant. The microemulsion and/or diluted microemulsion may comprise a single hydrophilic organosilicone surfactant or a combination of two or more hydrophilic organosilicone surfactants. For example, in some embodiments the hydrophilic organosilicone surfactant comprises a first type of hydrophilic organosilicone surfactant and a second type of hydrophilic organosilicone surfactant. Non-limiting examples of hydrophilic organosilicone surfactants include but are not limited to polyalkyleneoxide-modified pentamethyldisiloxane, polyalkyleneoxide-modified heptamethyltrisiloxane, polyalkyleneoxide-modified nonamethyltetrasiloxane, polyalkyleneoxide-modified undecamethylpentasiloxane, polyalkyleneoxide-modified tridecamethylhexasiloxane, polyalkyleneoxide-modified polydimethylsiloxane and combinations thereof.

In some embodiments, the hydrophilic organosilicone surfactant comprises methoxy-modified polyalkylene pentamethyldisiloxane, methoxy-modified polyalkylene heptamethyltrisiloxane, methoxy-modified polyalkylene nonamethyltetrasiloxane, methoxy-modified polyalkylene undecamethylpentasiloxane, polyalkylene methoxy-modified tridecamethylhexasiloxane, methoxy-modified polyalkyleneoxide-modified polydimethylsiloxane, ethoxy-modified polyalkylene pentamethyldisiloxane, ethoxy-modified polyalkylene heptamethyltrisiloxane, ethoxy-modified polyalkylene nonamethyltetrasiloxane, ethoxy-modified polyalkylene undecamethylpentasiloxane, ethoxy-modified polyalkylene tridecamethylhexasiloxane, ethoxy-modified polyalkyleneoxide-modified polydimethylsiloxane and combinations thereof.

The polyalkyleneoxide moiety may be end capped with —H, —CH$_3$, an acetoxy group, or an ethoxy group. The polyalkylene oxide group comprises polyethylene oxide, polypropyleneoxide, polybutyleneoxide, and combinations thereof.

In some embodiments, the hydrophilic organosilicone surfactant comprises an ethoxylated nonionic organosilicone surfactant. In some embodiments, the ethoxylated nonionic organosilicone surfactant is a trisiloxane with an ethoxylate group having 4 to 12 ethylene oxide units.

Additional surfactants are described herein. Other non-limiting examples of surfactants include adsorption modifiers, foamers, surface tension lowering enhancers, and emulsion breaking additives. Specific examples of such surfactants include cationic surfactants with a medium chain length, linear or branched anionic surfactants, alkyl benzene anionic surfactants, amine oxides, amphoteric surfactants, silicone based surfactants, alkoxylated novolac resins (e.g. alkoxylated phenolic resins), alkoxylated polyimines, alkoxylated polyamines, and fluorosurfactants. In some embodiments, a microemulsion and/or a diluted microemulsion comprises a nonionic surfactant. In certain embodiments, the nonionic surfactant may be one or more of an ethoxylated castor oil (e.g., castor oil $E_{30}$), an ethoxylated alcohol, an ethoxylated tristyrylphenol, or an ethoxylated sorbitan ester, or combinations thereof.

Aqueous Phase

As described above, microemulsions and/or diluted microemulsions may comprise an aqueous phase. The aqueous phase may make up any suitable amount of the microemulsion and/or diluted micromeulsion (e.g., of the components of the diluted microemulsion other than the dilution phase). The aqueous phase may make up greater than or equal to 1 wt %, greater than or equal to 2 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, greater than or equal to 45 wt %, greater than or equal to 50 wt %, greater than or equal to 55 wt % of the microemulsion, or greater than or equal to 60 wt %. The aqueous phase may make up less than or equal to 60 wt %, less than or equal to 55 wt %, less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, less than or equal to 5 wt %, less than or equal to 2 wt %, or less than or equal to 1 wt % of the microemulsion. Combinations of the above-referenced ranges are also possible (e.g., greater than or equal to 1 wt % and less than or equal to 60 wt % of the microemulsion, greater than or equal to 15 wt % and less than or equal to 30 wt % of the microemulsion, or greater than or equal to 20 wt % and less than or equal to 25 wt % of the microemulsion). Other ranges are also possible.

When present, the aqueous phase generally comprises water or is water. The water may be provided from any suitable source (e.g., sea water, fresh water, deionized water, reverse osmosis water, water from field production). The aqueous phase may also comprise dissolved salts. Non-limiting examples of dissolved salts include salts comprising K, Na, Br, Cr, Cs, or Bi, for example, halides of these metals, including NaCl, KCl, $CaCl_2$, and MgCl and combinations thereof.

Co-Solvent

In some embodiments, a microemulsion and/or a diluted microemulsion further comprises a co-solvent. In some embodiments, the co-solvent is an alcohol. The co-solvent (e.g., alcohol) may serve as a coupling agent between the solvent and the surfactant and/or may aid in the stabilization of the emulsion or microemulsion. The alcohol may also be a freezing point depression agent for the emulsion or microemulsion. That is, the alcohol may lower the freezing point of the emulsion or microemulsion. In some embodiments, the alcohol is selected from primary, secondary, and tertiary alcohols having from 1 to 20 carbon atoms.

In some embodiments, the alcohol is selected from primary, secondary, and tertiary alcohols having from 1 to 5 carbon atoms. In some embodiments, the co-solvent is selected from the group consisting of methanol, ethanol, isopropanol, n-propanol, n-butanol, i-butanol, sec-butanol, iso-butanol, t-butanol, ethylene glycol, propylene glycol, dipropylene glycol monomethyl ether, triethylene glycol, and ethylene glycol monobutyl ether.

In some embodiments, a microemulsion and/or a diluted microemulsion comprises from 1 wt % to 50 wt %, or from 1 wt % to 40 wt %, from 1 wt % to 35 wt %, or from 1 wt % to 30 wt %. In some embodiments, a micromeulsion and/or a diluted microemulsion comprises from 5 wt % to 40 wt %, from 5 wt % to 35 wt %, or from 10 wt % to 30 wt % of the co-solvent (e.g., alcohol), versus the total weight of the microemulsion and/or diluted microemulsion composition.

Additives

In some embodiments, a microemulsion and/or a diluted microemulsion may comprise one or more additives in addition to the components discussed elsewhere herein. In some embodiments, the one or more additional additives are present in an amount from 0 wt % to 70 wt %, from 1 wt % to 40 wt %, from 0 wt % to 30 wt %, from 0.5 wt % to 30 wt %, from 1 wt % to 30 wt %, from 0 wt % to 25 wt %, from 1 wt % to 25 wt %, from 0 wt % to 20 wt %, from 1 wt % to 20 wt %, from 3 wt % to 20 wt %, or from 8 wt % to 16 wt % versus the total weight of the microemulsion and/or diluted microemulsion composition.

Non-limiting examples of additives include a demulsifier, a freezing point depression agent, a proppant, a scale inhibitor, a friction reducer, a biocide, a corrosion inhibitor, a buffer, a viscosifier, an oxygen scavenger, a clay control additive, a paraffin control additive, an asphaltene control additive, an acid, an acid precursor, or a salt.

In some embodiments, the additive is a demulsifier. The demulsifier may aid in preventing the formulation of an emulsion between a treatment fluid and crude oil. Non-limiting examples of demulsifiers include polyoxyethylene (50) sorbitol hexaoleate. In some embodiments, the demulsifier is present in the microemulsion in an amount from 4 wt % to 8 wt % versus the total weight of the microemulsion composition.

Freezing Point Depression Agent

In some embodiments, a microemulsion and/or a diluted microemulsion comprises a freezing point depression agent (e.g., propylene glycol). The microemulsion and/or diluted microemulsion may comprise a single freezing point depression agent or a combination of two or more freezing point depression agents. The term "freezing point depression agent" is given its ordinary meaning in the art and refers to a compound which is added to a solution to reduce the freezing point of the solution. That is, in some embodiments, a solution comprising the freezing point depression agent has a lower freezing point as compared to an essentially identical solution not comprising the freezing point depression agent. Those of ordinary skill in the art will be aware of suitable freezing point depression agents for use in the emulsions or the microemulsions described herein. Non-limiting examples of freezing point depression agents include primary, secondary, and tertiary alcohols with from 1 to 20 carbon atoms and alkylene glycols. In some embodiments, the alcohol comprises at least 2 carbon atoms. Non-limiting examples of alcohols include methanol, ethanol, i-propanol, n-propanol, t-butanol, n-butanol, n-pentanol, n-hexanol, and 2-ethyl hexanol. In some embodiments, the freezing point depression agent is not methanol (e.g., due to toxicity). Non-limiting examples of alkylene glycols include ethylene glycol (EG), polyethylene glycol (PEG), propylene glycol (PG), and triethylene glycol (TEG). In some embodiments, the freezing point depression agent is not ethylene oxide (e.g., due to toxicity). In some embodiments, the freezing point depression agent comprises an alcohol and an alkylene glycol. In some embodiments, the freezing point depression agent comprises a carboxycyclic acid salt and/or a di-carboxycyclic acid salt. Another non-limiting example of a freezing point depression agent is a combination of choline chloride and urea. In some embodiments, the emulsion or microemulsion comprising the freezing point depression agent is stable over a wide range of temperatures, e.g., from 50° F. to 200° F. In some embodiments a freezing point depression agent is present in the microemulsion in an amount from 10 wt % to 15 wt %.

Proppant

In some embodiments, a microemulsion and/or a diluted microemulsion comprises a proppant. In some embodiments, the proppant acts to hold induced hydraulic fractures open in an oil and/or gas well. Non-limiting examples of proppants (e.g., propping agents) include grains of sand, glass beads, crystalline silica (e.g., quartz), hexamethylenetetramine, ceramic proppants (e.g., calcined clays), resin coated sands, and resin coated ceramic proppants. Other proppants are also possible and will be known to those skilled in the art.

Scale Inhibitor

In some embodiments, a microemulsion and/or a diluted microemulsion comprises a scale inhibitor. The scale inhibitor may slow scaling in, e.g., the treatment of an oil and/or gas well, wherein scaling involves the unwanted deposition of solids (e.g., along a pipeline) that hinders fluid flow. Non-limiting examples of scale inhibitors include one or more of methyl alcohol, organic phosphonic acid salts (e.g., phosphonate salt, aminopolycarboxlic acid salts), polyacrylate, ethane-1,2-diol, calcium chloride, and sodium hydroxide. Other scale inhibitors are also possible and will be known to those skilled in the art.

Friction Reducer

In some embodiments, a microemulsion and/or a diluted microemulsion comprises a friction reducer. The friction reducer may reduce drag, which reduces energy input required in the context of e.g. delivering the diluted microemulsion and/or microemulsion into a wellbore. Non-limiting examples of friction reducers include oil-external emulsions of polymers with oil-based solvents and an emulsion-stabilizing surfactant. The emulsions may include natural-based polymers like guar, cellulose, xanthan, proteins, polypeptides or derivatives of same or synthetic polymers like polyacrylamide-co-acrylic acid (PAM-AA), polyethylene oxide, polyacrylic acid, and other copolymers of acrylamide and other vinyl monomers. For a list of non-limiting examples, see U.S. Pat. No. 8,865,632, filed Nov. 10, 2008, entitled "DRAG-REDUCING COPOLYMER COMPOSITION," herein incorporated by reference. Other common drag-reducing additives include dispersions of natural or synthetic polymers and copolymers in saline solution and dry natural or synthetic polymers and copolymers. These polymers or copolymers may be nonionic, zwitterionic, anionic, or cationic depending on the composition of polymer and pH of solution. Other non-limiting examples of friction reducers include petroleum distillates, ammonium salts, polyethoxylated alcohol surfactants, and anionic polyacrylamide copolymers. Other friction reducers are also possible and will be known to those skilled in the art.

Biocide

In some embodiments, a microemulsion and/or a diluted microemulsion comprises a biocide. The biocide may kill unwanted organisms (e.g., microorganisms) that come into contact with the emulsion or microemulsion. Non-limiting examples of biocides include didecyl dimethyl ammonium chloride, glutaral, Dazomet, bronopol, tributyl tetradecyl phosphonium chloride, tetrakis(hydroxymethyl) phosphonium sulfate, AQUCAR®, UCARCIDE®, glutaraldehyde, sodium hypochlorite, and sodium hydroxide. Other biocides are also possible and will be known to those skilled in the art.

Corrosion Inhibitor

In some embodiments, a microemulsion and/or a diluted microemulsion comprises a corrosion inhibitor. The corrosion inhibitor may reduce corrosion during e.g. treatment of an oil and/or gas well (e.g., in a metal pipeline). Non-limiting examples of corrosion inhibitors include isopropanol, quaternary ammonium compounds, thiourea/formaldehyde copolymers, propargyl alcohol, and methanol. Other corrosion inhibitors are also possible and will be known to those skilled in the art.

Buffer

In some embodiments, a microemulsion and/or a diluted microemulsion comprises a buffer. The buffer may maintain the pH and/or reduce changes in the pH of the aqueous phase of the microemulsion and/or the diluted microemulsion. Non-limiting examples of buffers include acetic acid, acetic anhydride, potassium hydroxide, sodium hydroxide, and sodium acetate. Other buffers are also possible and will be known to those skilled in the art.

Viscosifier

In some embodiments, a microemulsion and/or a diluted microemulsion comprises a viscosifier. The viscosifier may increase the viscosity of the microemulsion and/or the diluted microemulsion. Non-limiting examples of viscosifiers include polymers, e.g., guar, cellulose, xanthan, proteins, polypeptides or derivatives of same or synthetic polymers like polyacrylamide-co-acrylic acid (PAM-AA), polyethylene oxide, polyacrylic acid, and other copolymers of acrylamide and other vinyl monomers. Other viscosifiers are also possible and will be known to those skilled in the art.

Oxygen Scavenger

In some embodiments, a microemulsion and/or a diluted microemulsion comprises an oxygen scavenger. The oxygen scavenger may decrease the level of oxygen in the emulsion or the microemulsion. Non-limiting examples of oxygen scavengers include sulfites and bisulfites. Other oxygen scavengers are also possible and will be known to those skilled in the art.

Clay Control Additive

In some embodiments, a microemulsion and/or a diluted microemulsion comprises a clay control additive. The clay control additive may minimize damaging effects of clay (e.g., swelling, migration), e.g., during treatment of oil and/or gas wells. Non-limiting examples of clay control additives include quaternary ammonium chloride, tetramethylammonium chloride, polymers (e.g., polyanionic cellulose (PAC), partially hydrolyzed polyacrylamide (PHPA), etc.), glycols, sulfonated asphalt, lignite, sodium silicate, and choline chloride. Other clay control additives are also possible and will be known to those skilled in the art.

Paraffin Control Additive and/or Asphaltene Control Additive

In some embodiments, a microemulsion and/or a diluted microemulsion comprises a paraffin control additive and/or an asphaltene control additive. The paraffin control additive or the asphaltene control additive may minimize paraffin deposition or asphaltene precipitation respectively in crude oil, e.g., during treatment of oil and/or gas wells. Non-limiting examples of paraffin control additives and asphaltene control additives include active acidic copolymers, active alkylated polyester, active alkylated polyester amides, active alkylated polyester imides, aromatic naphthas, and active amine sulfonates. Other paraffin control additives and asphaltene control additives are also possible and will be known to those skilled in the art.

Acid and/or Acid Precursor

In some embodiments, a microemulsion and/or a diluted microemulsion comprises an acid and/or an acid precursor (e.g., an ester). For example, the microemulsion and/or the diluted microemulsion may comprise an acid when used during acidizing operations. In some embodiments, the surfactant is alkaline and an acid (e.g., hydrochloric acid) may be used to adjust the pH of the emulsion or the microemulsion towards neutral. Non-limiting examples of acids or di-acids include hydrochloric acid, acetic acid, formic acid, succinic acid, maleic acid, malic acid, lactic acid, and hydrochloric-hydrofluoric acids. In some embodiments, the microemulsion and/or the diluted microemulsion comprises an organic acid or organic di-acid in the ester (or di-ester) form, whereby the ester (or diester) is hydrolyzed in the wellbore and/or reservoir to form the parent organic acid and an alcohol in the wellbore and/or reservoir. Non-limiting examples of esters or di-esters include isomers of methyl formate, ethyl formate, ethylene glycol diformate, alpha,alpha-4-trimethyl-3-cyclohexene-1-methylformate, methyl lactate, ethyl lactate, alpha,alpha-4-trimethyl 3-cyclohexene-1-methyllactate, ethylene glycol dilactate, ethylene glycol diacetate, methyl acetate, ethyl acetate, alpha, alpha,-4-trimethyl-3-cyclohexene-1-methylacetate, dimethyl succinate, dimethyl maleate, di(alpha,alpha-4-trimethyl-3-cyclohexene-1-methyl)-succinate, 1-methyl-4-(1-methylethenyl)-cyclohexylformate, 1-methyl-4-(1-ethylethenyl)-cyclohexylacetate, 1-methyl-4-(1-methylethenyl)-cyclohexylacetate, and di(1-methy-4-(1-methylethenyl) cyclohexyl)-succinate. Other acids are also possible and will be known to those skilled in the art.

Salt

In some embodiments, a microemulsion and/or a diluted microemulsion comprises a salt. The salt may reduce the amount of water needed as a carrier fluid and/or may lower the freezing point of the microemulsion and/or diluted micromeulsion. Non limiting examples of salts include salts comprising K, Na, Br, Cr, Cs, or Li, e.g., halides of these metals, including but not limited to NaCl, KCl, $CaCl_2$, and $MgCl_2$. Other salts are also possible and will be known to those skilled in the art.

In some embodiments, a microemulsion and/or a diluted microemulsion comprises an additive as described in U.S. patent application Ser. No. 15/457,792, filed Mar. 13, 2017, entitled "METHODS AND COMPOSITIONS INCORPORATING ALKYL POLYGLYCOSIDE SURFACTANT FOR USE IN OIL AND/OR GAS WELLS," now published as US/2017/0275518 on Sep. 28, 2017, herein incorporated by reference.

The microemulsions and/or diluted microemulsions described herein may be formed using methods known to those of ordinary skill in the art. In some embodiments, the aqueous and non-aqueous phases may be combined (e.g., the water and the solvent(s)), followed by addition of a surfactant(s) and optionally a co-solvent(s) (e.g., alcohol(s)) and agitation). The strength, type, and length of the agitation may be varied as known in the art depending on various factors including the components of the microemulsion and/or diluted microemulsion, the quantity of the microemulsion and/or diluted microemulsion, and the resulting type of microemulsion and/or diluted microemulsion formed. For example, for small samples, a few seconds of gentle mixing can yield a microemulsion and/or diluted micromeulsion, whereas for larger samples, longer agitation times and/or stronger agitation may be required. Agitation may be provided by any suitable source, e.g., a vortex mixer, a stirrer (e.g., magnetic stirrer), etc.

Any suitable method for injecting the microemulsion and/or diluted microemulsion into a wellbore may be employed. For example, in some embodiments, the microemulsion and/or diluted microemulsion may be injected into a subterranean formation by injecting it into a well or wellbore in the zone of interest of the formation and thereafter pressurizing it into the formation for the selected distance in the well or wellbore. Methods for achieving the placement of a selected quantity of a mixture in a subterranean formation are known in the art. The well may be treated with the microemulsion and/or diluted microemulsion for a suitable period of time. The microemulsion, diluted microemulsion, and/or other fluids may be removed from the well using known techniques, including producing the well.

It should be understood, that in embodiments where a microemulsion is said to be injected into a wellbore, that the microemulsion may be diluted and/or combined with other liquid component(s) prior to and/or during injection (e.g., via straight tubing, via coiled tubing, etc.). In some embodiments, a composition for injecting into a wellbore is provided comprising a microemulsion as described herein and a dilution phase (e.g., an aqueous carrier fluid).

The microemulsions and/or diluted microemulsions described herein may be used in various aspects (e.g. steps) of the life cycle of a gas well, including, but not limited to, drilling, mud displacement, casing, cementing, perforating, stimulation, kill fluids, enhanced gas recovery, improved gas recovery, stored fluid, and offshore applications. Inclusion of a microemulsion and/or a diluted microemulsion into the fluids typically employed in these processes, e.g., drilling fluids, mud displacement fluids, casing fluids, cementing fluids, perforating fluid, stimulation fluids, kill fluids, etc., may result in many advantages as compared to use of the fluid alone.

Various aspects of the well life cycle are described in detail in U.S. patent application Ser. No. 14/212,731, filed Mar. 14, 2014, entitled "METHODS AND COMPOSITIONS FOR USE IN OIL AND/OR GAS WELLS," now published as US/2014/0284053 on Sep. 25, 2014 and in U.S. patent application Ser. No. 14/212,763, filed Mar. 14, 2014, entitled "METHODS AND COMPOSITIONS FOR USE IN OIL AND/OR GAS WELLS," now published as US/2014/0338911 on Nov. 20, 2014, and issued as U.S. Pat. No. 9,884,988 on Feb. 6, 2018, each herein incorporated by reference.

As will be understood by those of ordinary skill in the art, the steps of the life cycle of an oil and/or gas well may be carried out in a variety of orders. In addition, in some embodiments, each step may occur more than once in the life cycle of the well.

As used herein, the term emulsion is given its ordinary meaning in the art and refers to dispersions of one immiscible liquid in another, in the form of droplets, with diameters approximately in the range from 100 to 1,000 nanometers (nm). Emulsions may be thermodynamically unstable and/or require high shear forces to induce their formation.

As used herein, the term microemulsion is given its ordinary meaning in the art and refers to dispersions of one immiscible liquid in another, in the form of droplets, with diameters approximately in the range from 1 nm to 1000 nm, from 10 nm to 1000 nm, from 10 nm to 500 nm, from 10 nm to 300 nm, or from 10 nm to 100 nm.

In some embodiments, microemulsions are clear or transparent because they contain particles smaller than the wavelength of visible light. In addition, microemulsions are homogeneous thermodynamically stable single phases, and form spontaneously, and thus, differ markedly from thermodynamically unstable emulsions, which generally depend upon intense mixing energy for their formation. Microemulsions may be characterized by a variety of advantageous properties including, by not limited to, (i) clarity, (ii) very small particle size, (iii) ultra-low interfacial tensions, (iv) the ability to combine properties of water and oil in a single homogeneous fluid, (v) shelf life stability, and (vi) ease of preparation.

In some embodiments, the microemulsions described herein are formed by the combination of a solvent-surfactant blend with an appropriate oil-based or water-based carrier fluid. Generally, the microemulsion forms upon simple mixing of the components without the need for high shearing generally required in the formation of ordinary emulsions. In some embodiments, the microemulsion is a thermodynamically stable system, and the droplets remain finely dispersed over time. In some embodiments, the average droplet size ranges from 10 nm to 300 nm.

It should be understood that the description herein which focuses on microemulsions and/or diluted microemulsion is by no means limiting, and emulsions and/or diluted emulsions may be employed where appropriate.

The conventional terms water-in-oil and oil-in-water, whether referring to macroemulsions, emulsions, or microemulsions, simply describe systems that are water-discontinuous and water-continuous, respectively. They do not denote any additional restrictions on the range of substances denoted as "oil".

The terms "clear" or "transparent" as applied to a microemulsion are given its ordinary meaning in the art and generally refers to the microemulsion appearing as a single phase without any particulate or colloidal material or a second phase being present when viewed by the naked eye.

The terms "substantially insoluble" or "insoluble" is given its ordinary meaning in the art and generally refers to embodiments wherein the solubility of the compound in a liquid is zero or negligible. In connection with the compositions described herein, the solubility of the compound may be insufficient to make the compound practicably usable in an agricultural end use without some modification either to increase its solubility or dispersability in the liquid (e.g., water), so as to increase the compound's bioavailability or avoid the use of excessively large volumes of solvent.

Definitions of specific functional groups and chemical terms are described in more detail below. For purposes of this invention, the chemical elements are identified in accordance with the Periodic Table of the Elements, CAS version, *Handbook of Chemistry and Physics*, $75^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito: 1999, the entire contents of which are incorporated herein by reference.

Certain compounds of the present invention may exist in particular geometric or stereoisomeric forms. The present invention contemplates all such compounds, including cis- and trans-isomers, R- and S-enantiomers, diastereomers, (d)-isomers, (1)-isomers, the racemic mixtures thereof, and other mixtures thereof, as falling within the scope of the invention. Additional asymmetric carbon atoms may be present in a substituent such as an alkyl group. All such isomers, as well as mixtures thereof, are intended to be included in this invention.

Isomeric mixtures containing any of a variety of isomer ratios may be utilized in accordance with the present invention. For example, where only two isomers are combined, mixtures containing 50:50, 60:40, 70:30, 80:20, 90:10, 95:5, 96:4, 97:3, 98:2, 99:1, or 100:0 isomer ratios are all contemplated by the present invention. Those of ordinary skill in the art will readily appreciate that analogous ratios are contemplated for more complex isomer mixtures.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl", "alkynyl", and the like.

Furthermore, as used herein, the terms "alkyl", "alkenyl", "alkynyl", and the like encompass both substituted and unsubstituted groups. In certain embodiments, as used herein, "aliphatic" is used to indicate those aliphatic groups (cyclic, acyclic, substituted, unsubstituted, branched or unbranched) having 1 to 20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

As used herein, the term "alkyl" is given its ordinary meaning in the art and refers to the radical of saturated aliphatic groups, including straight chain alkyl groups, branched-chain alkyl groups, cycloalkyl(alicyclic) groups, alkyl substituted cycloalkyl groups, and cycloalkyl substituted alkyl groups. In some embodiments, the alkyl group may be a lower alkyl group, e.g., an alkyl group having 1 to 10 carbon atoms (e.g., methyl, ethyl, propyl, butyl, pentyl, hexyl, heptyl, octyl, nonyl, or decyl). In some embodiments, a straight chain or branched chain alkyl may have 30 or fewer carbon atoms in its backbone, and, in some embodiments, 20 or fewer. In some embodiments, a straight chain or branched chain alkyl may have 12 or fewer carbon atoms in its backbone (e.g., $C_1$-$C_{12}$ for straight chain, $C_3$-$C_{12}$ for branched chain), 6 or fewer, or 4 or fewer. Likewise, cycloalkyls may have from 3 to 10 carbon atoms in their ring structure, or 5, 6 or 7 carbon atoms in their ring structure. Examples of alkyl groups include, but are not limited to, methyl, ethyl, propyl, isopropyl, cyclopropyl, butyl, isobutyl, t-butyl, cyclobutyl, hexyl, and cyclochexyl.

The term "heteroalkyl" is given its ordinary meaning in the art and refers to an alkyl group as described herein in which one or more carbon atoms is replaced by a heteroatom. Suitable heteroatoms include oxygen, sulfur, nitrogen, phosphorus, and the like. Examples of heteroalkyl groups include, but are not limited to, alkoxy, alkoxyalkyl, amino, thioester, poly(ethylene glycol), and alkyl-substituted amino.

The terms "alkenyl" and "alkynyl" are given their ordinary meaning in the art and refer to unsaturated aliphatic groups analogous in length and possible substitution to the alkyls described above, but that contain at least one double or triple bond respectively.

In certain embodiments, the alkyl, alkenyl and alkynyl groups employed in the invention contain 1 to 20 aliphatic carbon atoms. In certain other embodiments, the alkyl, alkenyl, and alkynyl groups employed in the invention contain 1 to 10 aliphatic carbon atoms. In yet other embodiments, the alkyl, alkenyl, and alkynyl groups employed in the invention contain 1 to 8 aliphatic carbon atoms. In still other embodiments, the alkyl, alkenyl, and alkynyl groups employed in the invention contain 1 to 6 aliphatic carbon atoms. In yet other embodiments, the alkyl, alkenyl, and alkynyl groups employed in the invention contain 1 to 4 carbon atoms.

Illustrative aliphatic groups thus include, but are not limited to, for example, methyl, ethyl, n-propyl, isopropyl, allyl, n-butyl, sec-butyl, isobutyl, t-butyl, n-pentyl, sec-pentyl, isopentyl, t-pentyl, n-hexyl, sec-hexyl, moieties and the like, which again, may bear one or more substituents. Alkenyl groups include, but are not limited to, for example, ethenyl, propenyl, butenyl, 1-methyl-2-buten-1-yl, and the like. Representative alkynyl groups include, but are not limited to, ethynyl, 2-propynyl(propargyl), 1-propynyl and the like.

The term "cycloalkyl," as used herein, refers specifically to groups having three to ten, preferably three to seven carbon atoms. Suitable cycloalkyls include, but are not limited to cyclopropyl, cyclobutyl, cyclopentyl, cyclohexyl, cycloheptyl and the like, which, as in the case of other aliphatic, heteroaliphatic, or hetercyclic moieties, may optionally be substituted with substituents including, but not limited to aliphatic; heteroaliphatic; aryl; heteroaryl; arylalkyl;

heteroarylalkyl; alkoxy; aryloxy; heteroalkoxy; heteroaryloxy; alkylthio; arylthio; heteroalkylthio; heteroarylthio; —F; —Cl; —Br; —I; —OH; —$NO_2$; —CN; —$CF_3$; —$CH_2CF_3$; —$CHCl_2$; —$CH_2OH$; —$CH_2CH_2OH$; —$CH_2NH_2$; —$CH_2SO_2CH_3$; —$C(O)R^x$; —$CO_2(R^x)$; —$CON(R^x)_2$; —$OC(O)R^x$; —$OCO_2R^x$; —$OCON(R^x)_2$; —$N(R^x)_2$; —$S(O)_2R^x$; —$NR^x(CO)R^x$, wherein each occurrence of $R^x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the examples that are described herein.

The term "heteroaliphatic," as used herein, refers to an aliphatic moiety, as defined herein, which includes both saturated and unsaturated, nonaromatic, straight chain (i.e., unbranched), branched, acyclic, cyclic (i.e., heterocyclic), or polycyclic hydrocarbons, which are optionally substituted with one or more functional groups, and that contain one or more oxygen, sulfur, nitrogen, phosphorus, or silicon atoms, e.g., in place of carbon atoms. In certain embodiments, heteroaliphatic moieties are substituted by independent replacement of one or more of the hydrogen atoms thereon with one or more substituents. As will be appreciated by one of ordinary skill in the art, "heteroaliphatic" is intended herein to include, but is not limited to, heteroalkyl, heteroalkenyl, heteroalkynyl, heterocycloalkyl, heterocycloalkenyl, and heterocycloalkynyl moieties. Thus, the term "heteroaliphatic" includes the terms "heteroalkyl," "heteroalkenyl", "heteroalkynyl", and the like. Furthermore, as used herein, the terms "heteroalkyl", "heteroalkenyl", "heteroalkynyl", and the like encompass both substituted and unsubstituted groups. In certain embodiments, as used herein, "heteroaliphatic" is used to indicate those heteroaliphatic groups (cyclic, acyclic, substituted, unsubstituted, branched or unbranched) having 1 to 20 carbon atoms. Heteroaliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, sulfinyl, sulfonyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The terms "heteroalkenyl" and "heteroalkynyl" are given their ordinary meaning in the art and refer to unsaturated aliphatic groups analogous in length and possible substitution to the heteroalkyls described above, but that contain at least one double or triple bond respectively.

Some examples of substituents of the above-described aliphatic (and other) moieties of compounds of the invention include, but are not limited to aliphatic; heteroaliphatic; aryl; heteroaryl; alkylaryl; alkylheteroaryl; alkoxy; aryloxy; heteroalkoxy; heteroaryloxy; alkylthio; arylthio; heteroalkylthio; heteroarylthio; F; Cl; Br; I; —OH; —$NO_2$; —CN; —$CF_3$; —$CHF_2$; —$CH_2F$; —$CH_2CF_3$; —$CHCl_2$; —$CH_2OH$; —$CH_2CH_2OH$; —$CH_2NH_2$; —$CH_2SO_2CH_3$; —$C(O)R^x$; —$CO_2(R^x)$; —$CON(R^x)_2$; —$OC(O)R^x$; —$OCO_2R^x$; —$OCON(R^x)_2$; —$N(R^x)_2$; —$S(O)_2R^x$; —$NR^x(CO)R^x$ wherein each occurrence of $R^x$ independently includes, but is not limited to, aliphatic, alycyclic, heteroaliphatic, heterocyclic, aryl, heteroaryl, alkylaryl, or alkylheteroaryl, wherein any of the aliphatic, heteroaliphatic, alkylaryl, or alkylheteroaryl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

As used herein, the term "aromatic" is given its ordinary meaning in the art and refers to aromatic carbocyclic groups, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls.

As used herein, the term "aryl" is given its ordinary meaning in the art and refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls. The aryl group may be optionally substituted, as described herein. Substituents include, but are not limited to, any of the previously mentioned substituents, e.g., the substituents recited for aliphatic moieties, or for other moieties as disclosed herein, resulting in the formation of a stable compound. In some embodiments, an aryl group is a stable monocyclic or polycyclic unsaturated moiety having preferably 3 to 14 carbon atoms, each of which may be substituted or unsubstituted.

The term "heterocycle" is given its ordinary meaning in the art and refers to cyclic groups containing at least one heteroatom as a ring atom, in some embodiments, 1 to 3 heteroatoms as ring atoms, with the remainder of the ring atoms being carbon atoms. Suitable heteroatoms include oxygen, sulfur, nitrogen, phosphorus, and the like. In some embodiments, the heterocycle may be 3-membered to 10-membered ring structures or 3-membered to 7-membered rings, whose ring structures include one to four heteroatoms.

The term "heterocycle" may include heteroaryl groups, saturated heterocycles (e.g., cycloheteroalkyl) groups, or combinations thereof. The heterocycle may be a saturated molecule, or may comprise one or more double bonds. In some embodiments, the heterocycle is a nitrogen heterocycle, wherein at least one ring comprises at least one nitrogen ring atom. The heterocycles may be fused to other rings to form a polycylic heterocycle. The heterocycle may also be fused to a spirocyclic group. In some embodiments, the heterocycle may be attached to a compound via a nitrogen or a carbon atom in the ring.

Heterocycles include, e.g., thiophene, benzothiophene, thianthrene, furan, tetrahydrofuran, pyran, isobenzofuran, chromene, xanthene, phenoxathiin, pyrrole, dihydropyrrole, pyrrolidine, imidazole, pyrazole, pyrazine, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, triazole, tetrazole, oxazole, isoxazole, thiazole, isothiazole, phenanthridine, acridine, pyrimidine, phenanthroline, phenazine, phenarsazine, phenothiazine, furazan, phenoxazine, pyrrolidine, oxolane, thiolane, oxazole, oxazine, piperidine, homopiperidine (hexamethyleneimine), piperazine (e.g., N-methyl piperazine), morpholine, lactones, lactams such as azetidinones and pyrrolidinones, sultams, sultones, other saturated and/or unsaturated derivatives thereof, and the like. The heterocyclic ring can be optionally substituted at one or more positions with such substituents as described herein. In some embodiments, the heterocycle may be bonded to a compound via a heteroatom ring atom (e.g., nitrogen). In some embodiments, the heterocycle may be bonded to a compound via a carbon ring atom. In some embodiments, the heterocycle is pyridine, imidazole, pyrazine, pyrimidine, pyridazine, acridine, acridin-9-amine, bipyridine, naphthyridine, quinoline, benzoquinoline, benzoisoquinoline, phenanthridine-1,9-diamine, or the like.

The term "heteroaryl" is given its ordinary meaning in the art and refers to aryl groups comprising at least one heteroatom as a ring atom. A "heteroaryl" is a stable heterocyclic or polyheterocyclic unsaturated moiety having preferably 3 to 14 carbon atoms, each of which may be substituted or unsubstituted. Substituents include, but are not limited to, any of the previously mentioned substituents, e.g., the substituents recited for aliphatic moieties, or for other moieties as disclosed herein, resulting in the formation of a stable compound. In some embodiments, a heteroaryl is a cyclic aromatic radical having from five to ten ring atoms of which one ring atom is selected from S, O, and N; zero, one, or two ring atoms are additional heteroatoms independently selected from S, O, and N; and the remaining ring atoms are carbon, the radical being joined to the rest of the molecule via any of the ring atoms, such as, e.g., pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

It will be appreciated that the above groups and/or compounds, as described herein, may be optionally substituted with any number of substituents or functional moieties. That is, any of the above groups may be optionally substituted. As used herein, the term "substituted" is contemplated to include all permissible substituents of organic compounds, "permissible" being in the context of the chemical rules of valence known to those of ordinary skill in the art. In general, the term "substituted" whether preceded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. It will be understood that "substituted" also includes that the substitution results in a stable compound, e.g., which does not spontaneously undergo transformation such as by rearrangement, cyclization, elimination, etc. In some embodiments, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. Furthermore, this invention is not intended to be limited in any manner by the permissible substituents of organic compounds. Combinations of substituents and variables envisioned by this invention are preferably those that result in the formation of stable compounds useful for the formation of an imaging agent or an imaging agent precursor.

The term "stable," as used herein, preferably refers to compounds which possess stability sufficient to allow manufacture and which maintain the integrity of the compound for a sufficient period of time to be detected and preferably for a sufficient period of time to be useful for the purposes detailed herein.

Examples of optional substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN, aryl, aryloxy, perhaloalkoxy, aralkoxy, heteroaryl, heteroaryloxy, heteroarylalkyl, heteroaralkoxy, azido, amino, halide, alkylthio, oxo, acylalkyl, carboxy esters, carboxamido, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, cyano, alkoxyalkyl, perhaloalkyl, arylalkyloxyalkyl, and the like.

EXAMPLE 1

This Example compares the surface tensions of diluted microemulsions comprising d-limonene to those of otherwise identical compositions lacking d-limonene, and compares surface tension measurements made using the capillary rise technique to surface tension measurements made using the Wilhelmy plate technique.

Microemulsions comprising d-limonene, various surfactants, water, and isopropanol were prepared. For each microemulsion, d-limonene, one of the various surfactants, water, and isopropanol were combined to form a microemulsion comprising 25 wt % d-limonene, 25 wt % water, 25 wt % isopropanol, and 25 wt % of the surfactant. The microemulsion was then added to water comprising 2 wt %/vol KCl to form a diluted microemulsion comprising the microemulsion in an amount of 2 gallons per thousand (gpt). The water comprising the 2 wt %/vol KCl was stirred with a stir bar as the microemulsion was added. Otherwise equivalent compositions lacking the d-limonene and including 50 wt % water (diluted surfactant solutions) were also prepared. The surface tensions of each diluted microemulsion and each diluted surfactant solution at 20° C. were measured using the capillary rise technique and using the Wilhelmy plate technique. Table 1, below, shows the surface tension for each diluted microemulsion and each diluted surfactant solution measured using each technique. FIG. 1 shows the surface tension as a function of time for each diluted microemulsion and each diluted surfactant solution using the capillary rise technique.

The results summarized in Table 1 demonstrate that even though d-limonene is not a surface active agent (it is not a surfactant), and would therefore, not be expected to lower the surface tension of an aqueous solution, a microemulsion incorporating d-limonene has a somewhat lower surface tension than the otherwise equivalent compositions lacking the d-limonene. Table 1 also shows that the magnitude of surface tension lowering for a microemulsion containing d-limonene is most useful for relatively inefficient surfactants, such as castor oil $E_{30}$. As used herein, "E" followed by an integer represents the number of ethoxylate groups (i.e., ethylene oxide units) contained within the surfactant. In this example, castor oil $E_{30}$ represents a castor oil surfactant with 30 ethylene oxide units, which may not be very useful by itself for gas well treatment. For more efficient surfactants, such as $C_{12}$-$C_{15}$ $E_7$, that may be more useful than castor oil $E_{30}$ in gas well treatments, d-limonene has a much smaller effect on the surface tension than other solvents. For instance, for $C_{12}$-$C_{15}$ $E_7$ in particular, the magnitude of the effect, from 29 mN/m for the surfactant alone to 26 mN/m for the microemulsion, is much smaller than the effects obtained for other solvents shown in further examples below.

The results summarized in Table 1 also show that surface tension values measured using the Wilhelmy plate technique do not reveal the surface tension lowering effect of the solvent while values measured using the capillary rise technique reveal the effect. Surface tension values for the surfactant alone are essentially equal using the two techniques while values for the microemulsions are lower using the capillary rise technique which limits evaporation of the solvent from the aqueous surface. Stated another way, as can be seen from Table 1, surface tensions measured using the capillary rise technique showed a reduction upon addition of d-limonene to the surfactant solutions, while those measured using the Wilhelmy plate technique did not. The values of surface tension measured for the surfactant solutions were substantially similar for both the capillary rise technique and the Wilhelmy plate technique.

TABLE 1

| Composition | Surface tension measured using capillary rise technique (mN/m) | Surface tension measured using Wilhelmy plate technique (mN/m) |
|---|---|---|
| Diluted microemulsion comprising a castor oil $E_{30}$ surfactant | 28 | 41 |
| Diluted Castor oil $E_{30}$ surfactant solution | 41 | 41 |

TABLE 1-continued

| Composition | Surface tension measured using capillary rise technique (mN/m) | Surface tension measured using Wilhelmy plate technique (mN/m) |
|---|---|---|
| Diluted microemulsion comprising a mixture of alcohol ethoxylate surfactants with hydrocarbon groups of 12 to 18 carbon atoms and ethoxylate groups of 10 ethylene oxide units ($C_{12}$-$C_{18}$ $E_{10}$) | 28 | 34 |
| Diluted $C_{12}$-$C_{18}$ $E_{10}$ surfactant solution | 37 | 34 |
| Diluted microemulsion comprising a mixture of alcohol ethoxylates surfactant with hydrocarbon groups of 12 to 15 carbon atoms and ethoxylate groups of 7 ethylene oxide units ($C_{12}$-$C_{15}$ $E_7$) | 26 | 29 |
| $C_{12}$-$C_{15}$ $E_7$ surfactant solution | 29 | 29 |

EXAMPLE 2

This Example compares the surface tensions of diluted microemulsions comprising hexane diluted to varying degrees.

Figure 2:
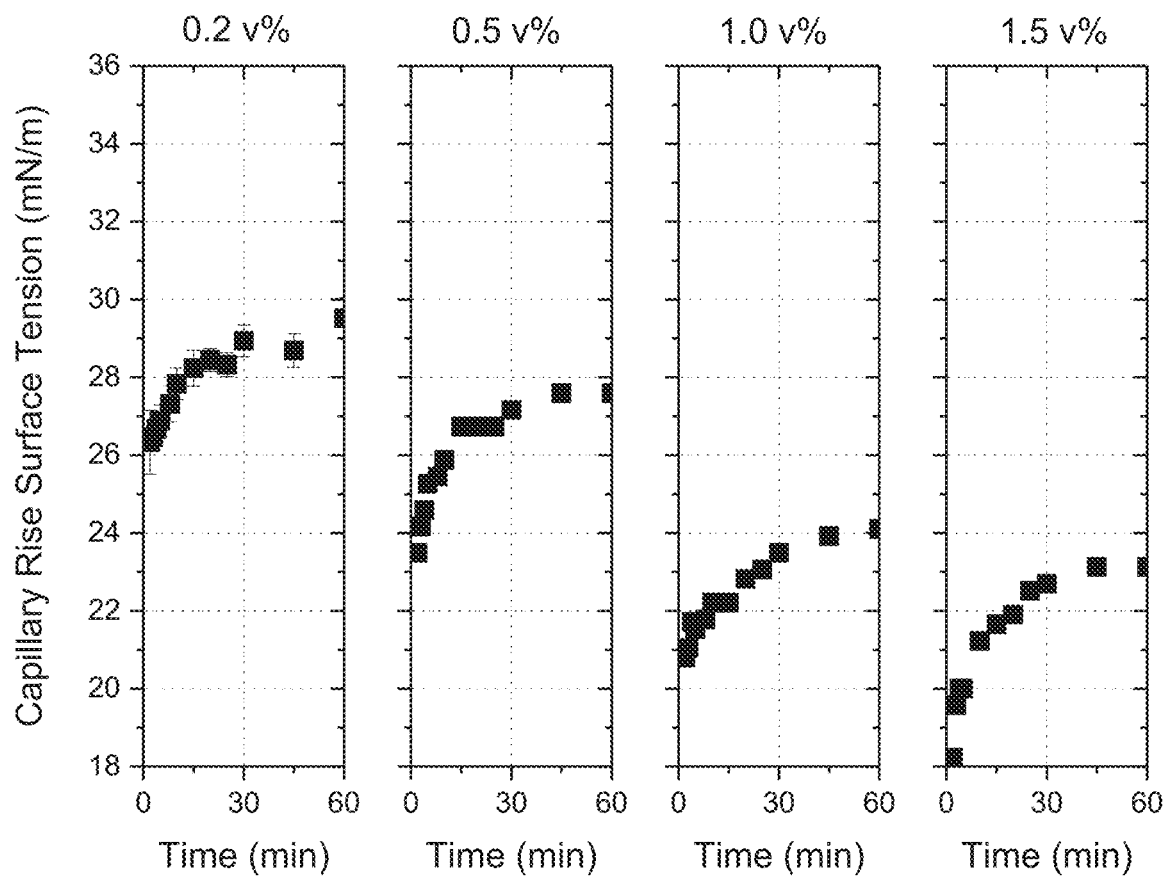
FIG. 2 (FIG. 2) shows four plots showing surface tensions measured using the capillary rise technique for diluted microemulsions comprising hexane, according to some embodiments.

Microemulsions comprising 25 wt % hexane, 25 wt % $C_{12}$-$C_{15}$ $E_7$, 25 wt % water, and 25 wt % isopropanol were prepared as described in Example 1. These microemulsions were diluted to varying degrees following the dilution procedure described in Example 1. The surface tension of each diluted microemulsion at 20° C. was measured using the capillary rise technique. FIG. 2 shows the surface tension as a function of time measured using the capillary rise technique. As can be seen from FIG. 2, the surface tension of the diluted microemulsions decreased with increasing microemulsion concentration. FIG. 2 shows that the surface tension of the diluted hexane microemulsion is lowest at the beginning of the measurement (0 minutes) and increases with time to a plateau value at about 60 minutes. It is believed that the difference between the beginning value and the plateau value reflects the time required for the very volatile hexane to reach equilibrium with the vapor space near the aqueous solution surface. The beginning value and the plateau value are both observed to decrease with increasing microemulsion concentration.

EXAMPLE 3

This Example compares the surface tensions of diluted microemulsions comprising alkane solvents to the surface tensions of these solvents, and compares surface tension measurements made using the capillary rise technique to surface tension measurements made using the Wilhelmy plate technique for microemulsions comprising alkane solvents.

Figure 3A:
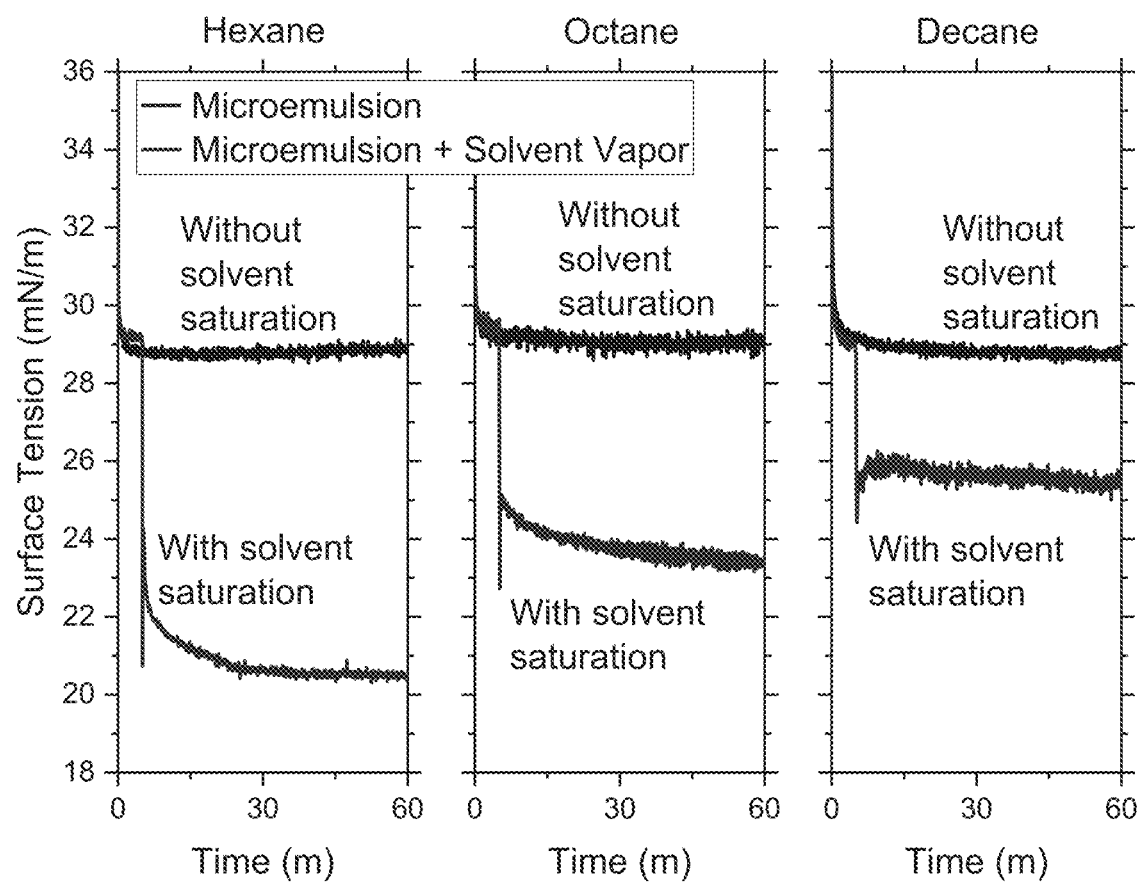
FIG. 3A (FIG. 3A) shows three plots showing surface tensions measured using the pendant drop technique for diluted microemulsions comprising alkane solvents, according to some embodiments.
Figure 3B:
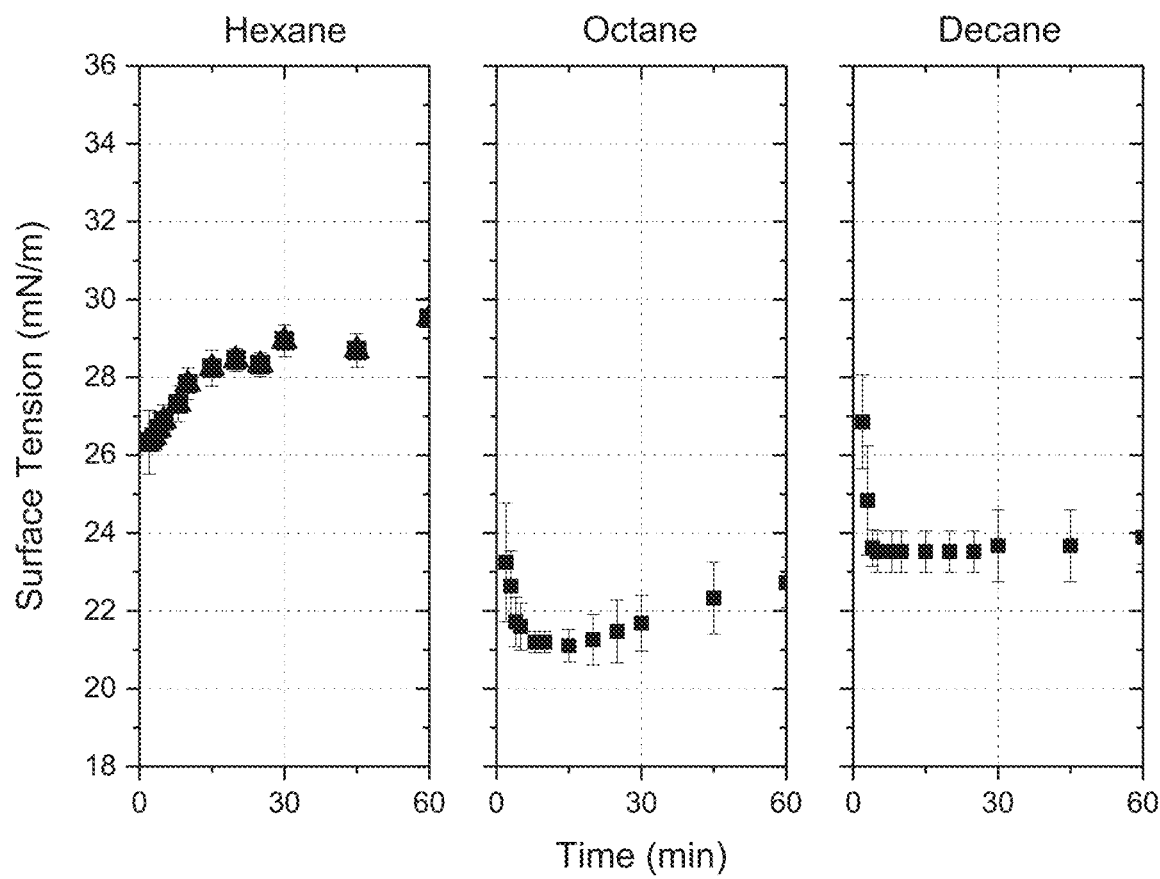
FIG. 3B (FIG. 3B) shows three plots showing surface tensions measured using the capillary rise technique for diluted microemulsions comprising alkane solvents, according to some embodiments.

Microemulsions comprising 25 wt % of an n-alkane, 25 wt % $C_{12}$-$C_{15}$ $E_7$, 25 wt % water, and 25 wt % isopropanol were prepared and diluted to 2 gpt concentration, as described in Example 1. The surface tensions of the diluted microemulsions at 20° C. were measured using the pendant drop technique (both with and without saturation of the vapor space by vapor of the n-alkane), the Wilhelmy plate technique, and the capillary rise technique. Table 2, below, shows the minimum surface tension for three diluted microemulsions measured using each technique. FIG. 3A shows the surface tension as a function of time for each diluted microemulsion using the pendant drop technique and FIG. 3B shows the surface tension as a function of time for each diluted microemulsion using the capillary rise technique. As can be seen from Table 2 and FIGS. 3A-3B, the surface tensions measured using the pendant drop technique without vapor saturation and the surface tensions measured using the Wilhelmy plate technique were insensitive to the presence or type of n-alkane present. The surface tensions measured using the capillary rise technique and the surface tensions measured using the pendant drop technique with vapor saturation depended on the type of n-alkane present and were lower than the surface tensions measured using either the pendant drop technique without vapor saturation or the Wilhelmy plate technique.

Thus, the results summarized in Table 2 demonstrate that hexane, octane, and decane, which are not known to be surface active agents (they are not known to be surfactants), unexpectedly lower the surface tension of a diluted aqueous microemulsion to values of 21-24 mN/m compared to 29 mN/m for the surfactant alone. It is believed that these values indicate that diluted microemulsions containing hexane, octane, and decane would lower capillary pressure in a gas well substantially below values achievable using surfactant alone and that this would lead to reduced water blocks and increased hydrocarbon gas production.

Column 5 of Table 2, which shows the surface tension measured using the Wilhelmy plate technique, represents the surface tension for the surfactant alone since the effect of the solvent for volatile solvents such as hexane, octane and decane is not observed using this measurement technique. Column 2 of Table 2, which shows the surface tension measured using the capillary rise technique, and Column 4 of Table 2, which shows the surface tension measured using the pendant drop technique with vapor saturation. The values measured using the capillary rise technique and the pendant drop technique with vapor saturation most accurately characterize the effect of the solvent on the microemulsion surface tension. Because of the extreme volatility of hexane, in this Example, the pendant drop technique with vapor saturation resulted in the most accurate (and lowest) value for a microemulsion comprising hexane.

TABLE 2

| Composition | Surface tension measured using capillary rise technique (mN/m) | Surface tension measured using pendant drop technique (mN/m) without vapor saturation | Surface tension measured using pendant drop technique (mN/m) with vapor saturation | Surface tension measured using Wilhelmy plate technique (mN/m) | Neat n-alkane surface tension (mN/m) |
|---|---|---|---|---|---|
| Microemulsion comprising hexane | 26 | 29 | 21 | 29 | 18 |
| Microemulsion comprising octane | 21 | 29 | 24 | 29 | 21 |

TABLE 2-continued

| Composition | Surface tension measured using capillary rise technique (mN/m) | Surface tension measured using pendant drop technique (mN/m) without vapor saturation | Surface tension measured using pendant drop technique (mN/m) with vapor saturation | Surface tension measured using Wilhelmy plate technique (mN/m) | Neat n-alkane surface tension (mN/m) |
|---|---|---|---|---|---|
| Microemulsion comprising decane | 24 | 29 | 26 | 29 | 24 |

Figure 4:
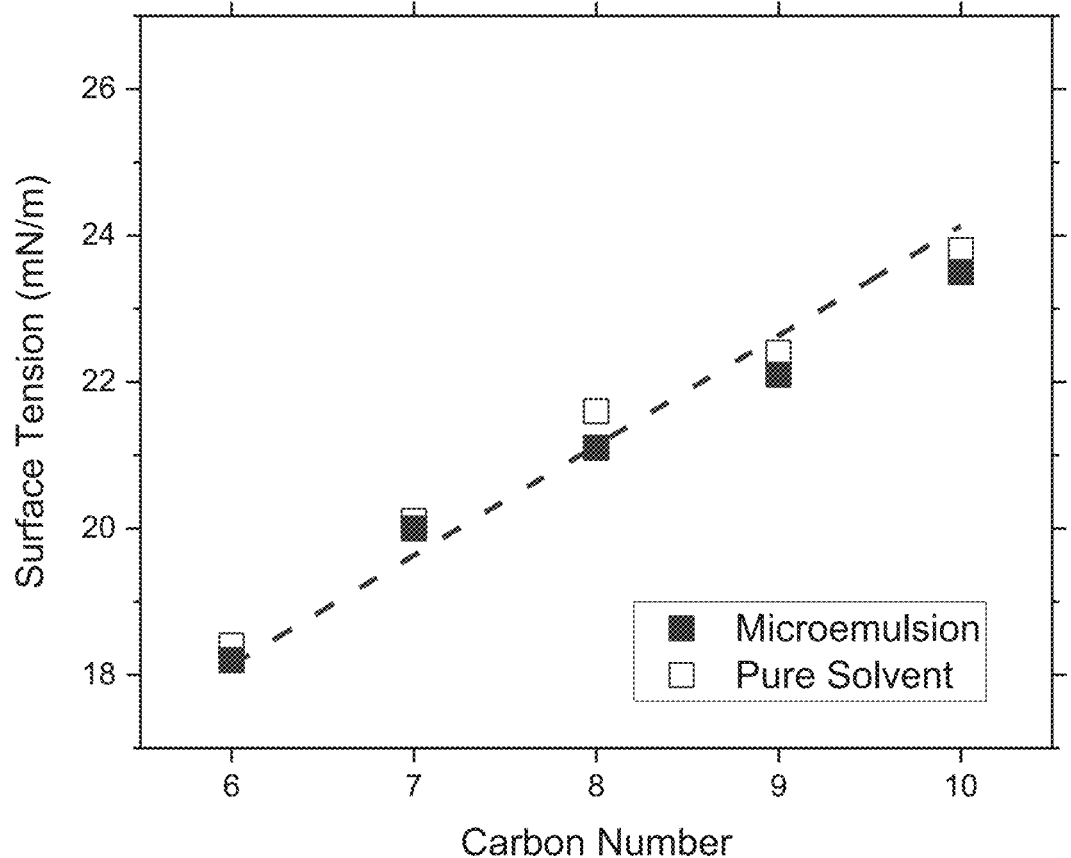
FIGS. 4-5 (FIGS. 4-5) show plots showing surface tensions measured using the capillary rise technique for a variety of diluted microemulsions and surface tensions measured using the Wilhelmy plate technique for a variety of pure solvents, according to some embodiments.
Figure 5:
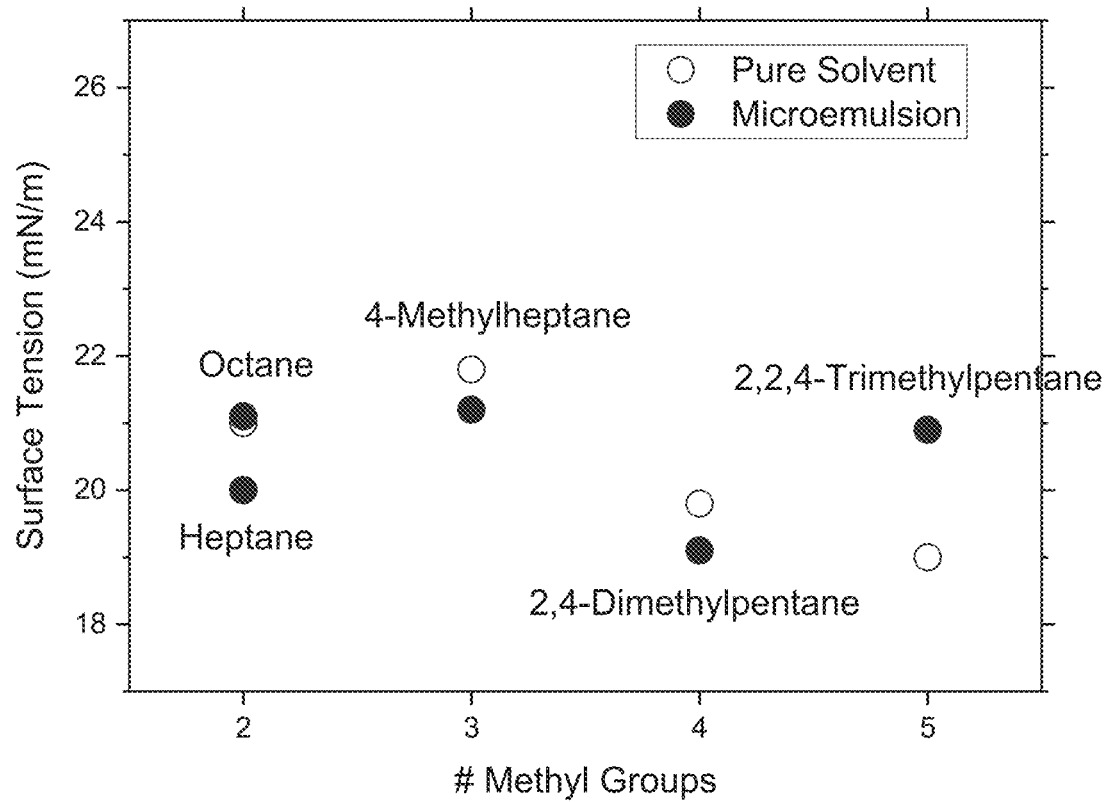

FIGS. 4-5 show the minimum value of surface tension at 20° C. measured using the capillary rise technique for diluted microemulsions comprising a wider variety of alkane solvents, prepared as described above. The value for hexane is the minimum value observed at 15 gpt. The values for the other alkanes were all measured at 2 gpt. These Figures also show the surface tension at 20° C. measured using the Wilhelmy plate technique for these alkane solvents. From these Figures, it is apparent that the minimum value of surface tension measured using the capillary rise technique for each diluted microemulsion comprising an alkane solvent is similar to that of the alkane solvent it comprises. FIG. 4 shows that the pure linear n-alkane solvents have surface tensions that vary from 18-24 mN/m, and that diluted microemulsions comprising these solvents are capable of achieving similarly low minimum values of surface tensions when measured using the capillary rise technique. The surface tension of the pure n-alkane solvents increase as molecular weight increases. The diluted microemulsions follows the same trend as the solvents. FIG. 5 shows that diluted microemulsions comprising branched alkane solvents have surface tensions of 19-21 mN/m, significantly below that of the pure surfactant. The surface tensions of the diluted microemulsions comprising linear and branched $C_6$-$C_{10}$ alkanes are significantly below the 29 mN/m of the surfactant solution and the 26 mN/m of the diluted d-limonene microemulsion in Example 1, making it reasonable to believe that diluted microemulsions comprising these hydrocarbon solvents will be more effective at lowering capillary pressure in a gas well than the surfactant solution or a diluted microemulsion comprising d-limonene. It is thus probable that diluted microemulsions comprising n-alkane and branched hydrocarbon solvents will reduce water blocks and increase hydrocarbon production in a gas well.

EXAMPLE 4

This Example compares the surface tensions of diluted microemulsions comprising linear n-alkane solvents, cyclic alkane solvents (also known as cycloalkane solvents), and methylated cyclic alkane solvents (also known as methylated cycloalkane solvents).

Figure 6:
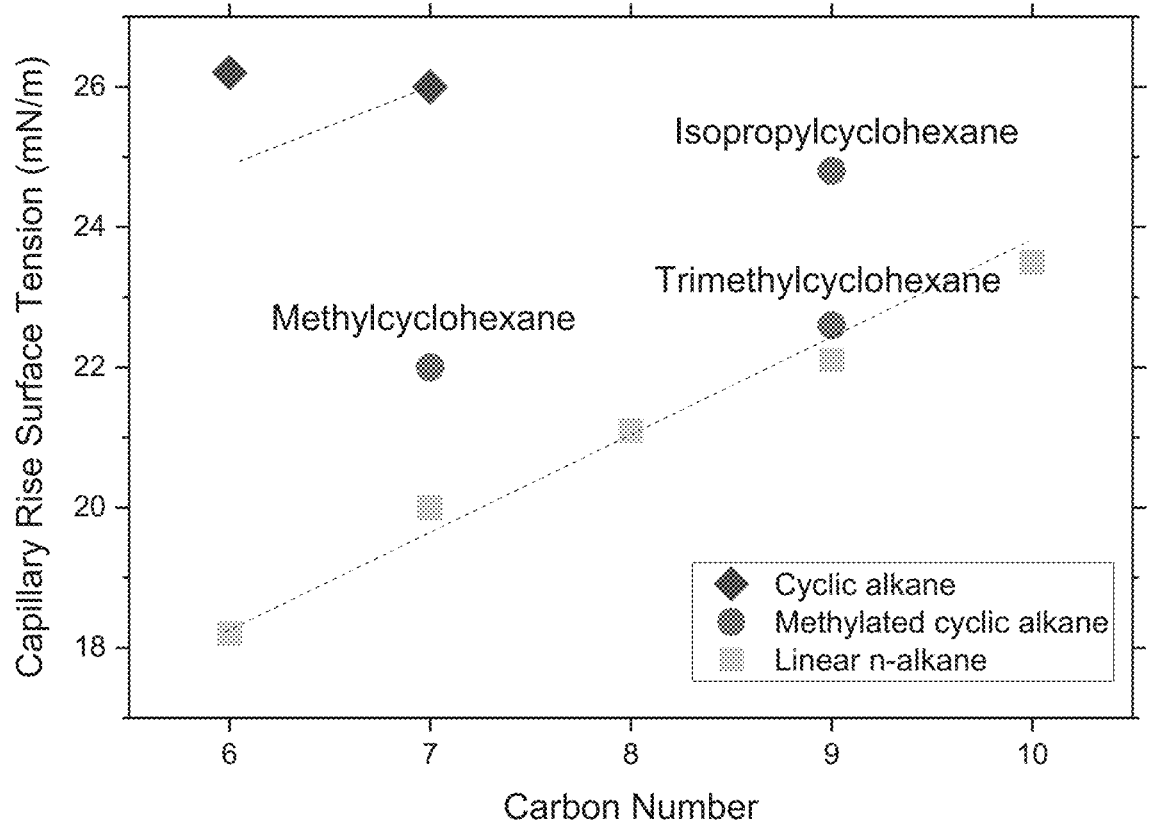
FIG. 6 (FIG. 6) shows a plot showing surface tensions measured using the capillary rise technique for a variety of diluted microemulsions, according to some embodiments.

Microemulsions comprising 25 wt % of an alkane solvent, 25 wt % $C_{12}$-$C_{15}$ $E_7$, 25 wt % water, and 25 wt % isopropanol were prepared and diluted to 2 gpt concentration as described in Example 1. The surface tensions at 20° C. of each diluted microemulsion were measured using the capillary rise technique. FIG. 6 shows the surface tensions of various diluted microemulsions. As can be seen in FIG. 6, the surface tension of the diluted microemulsions increases with the number of carbons in the alkane solvents and is higher for cyclic alkane solvents (also known as cycloalkane solvents) than for n-alkane solvents with an equivalent number of carbon atoms. FIG. 6 also shows that diluted microemulsions comprising methylated cyclic alkane solvents (also known as methylated cycloalkane solvents) have lower surface tensions than diluted microemulsions comprising unmethylated cyclic alkane solvents (also known as unmethylated cycloalkane solvents). The diluted microemulsions comprising cyclic alkane solvents (also known as cycloalkane solvents) have surface tensions of 26 mN/m and so are believed to be less effective at lowering capillary pressure in a gas well. The diluted microemulsions comprising methylated cyclic alkane solvents (also known as methylated cycloalkane solvents) have surface tensions of 22-25 mN/m, representing a substantial and useful reduction in surface tension compared to the pure surfactant solution. These results strongly suggest that diluted microemulsions comprising methylated cyclic alkane solvents (also known as methylated cycloalkane solvents) would be effective at reducing water blocks and enhancing hydrocarbon production in a gas well.

EXAMPLE 5

This Example compares the surface tensions of diluted microemulsions comprising siloxane solvent blends to the surface tensions of the pure siloxane solvents and to the surface tensions of the siloxane solvent blends.

Figure 7:
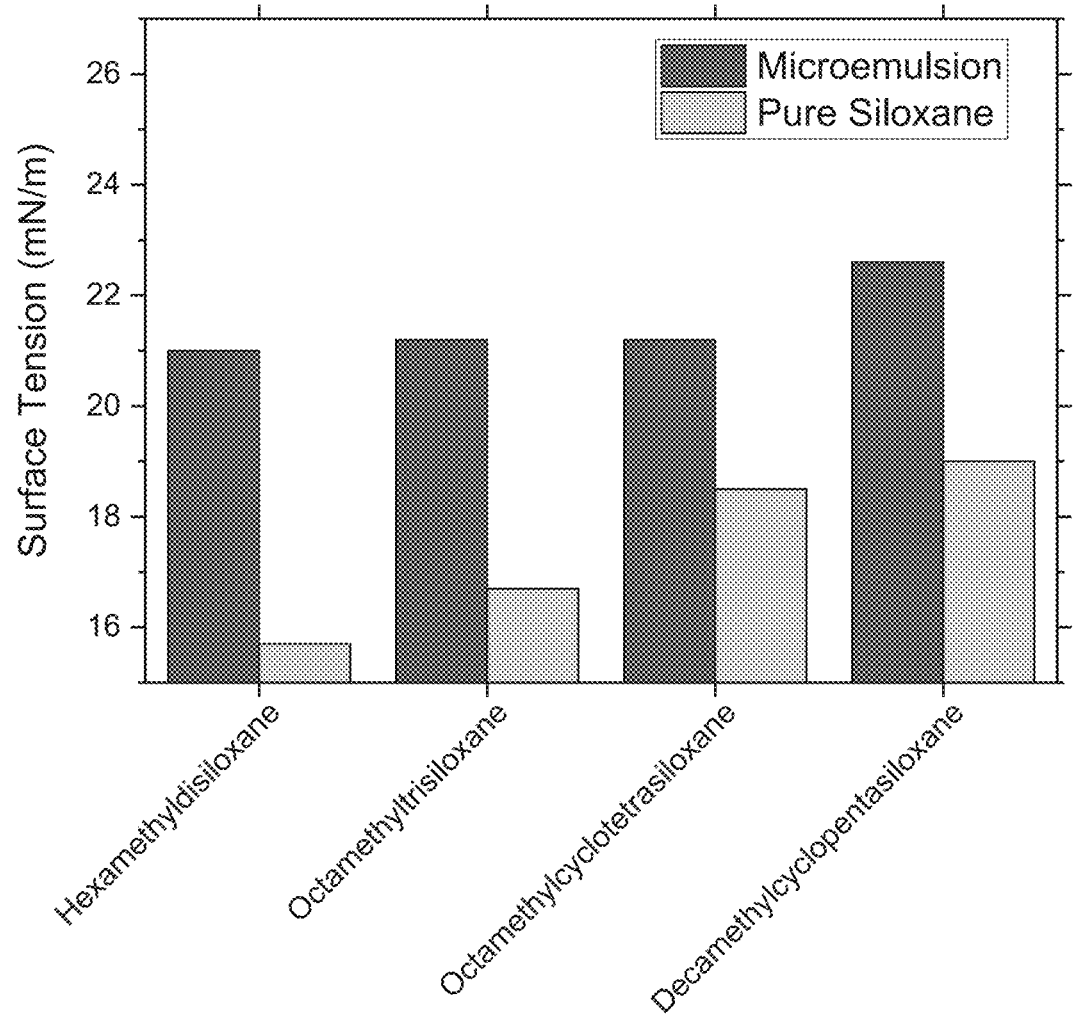
FIGS. 7-9 (FIGS. 7-9) show plots showing surface tensions measured using the capillary rise technique for a variety of diluted microemulsions and surface tensions measured using the Wilhelmy plate technique for a variety of pure solvents, according to some embodiments.

Microemulsions comprising a 1:1 blend of siloxane solvent and d-limonene (specifically 12.5 wt % of a siloxane solvent and 12.5 wt % d-limonene), 25 wt % $C_{12}$-$C_{15}$ $E_7$, 25 wt % water, and 25 wt % isopropanol were prepared and diluted as described in Example 1. The surface tensions of these diluted microemulsions at 20° C. were measured using the capillary rise technique, and the surface tensions of the pure siloxane solvents at 20° C. were measured using the Wilhelmy plate technique. FIG. 7 shows the measured surface tensions of the diluted microemulsions comprising the siloxane solvents and the measured surface tensions of the pure siloxane solvents. As can be seen in FIG. 7, each diluted microemulsion had a higher surface tension than the pure siloxane solvent.

Figure 8:
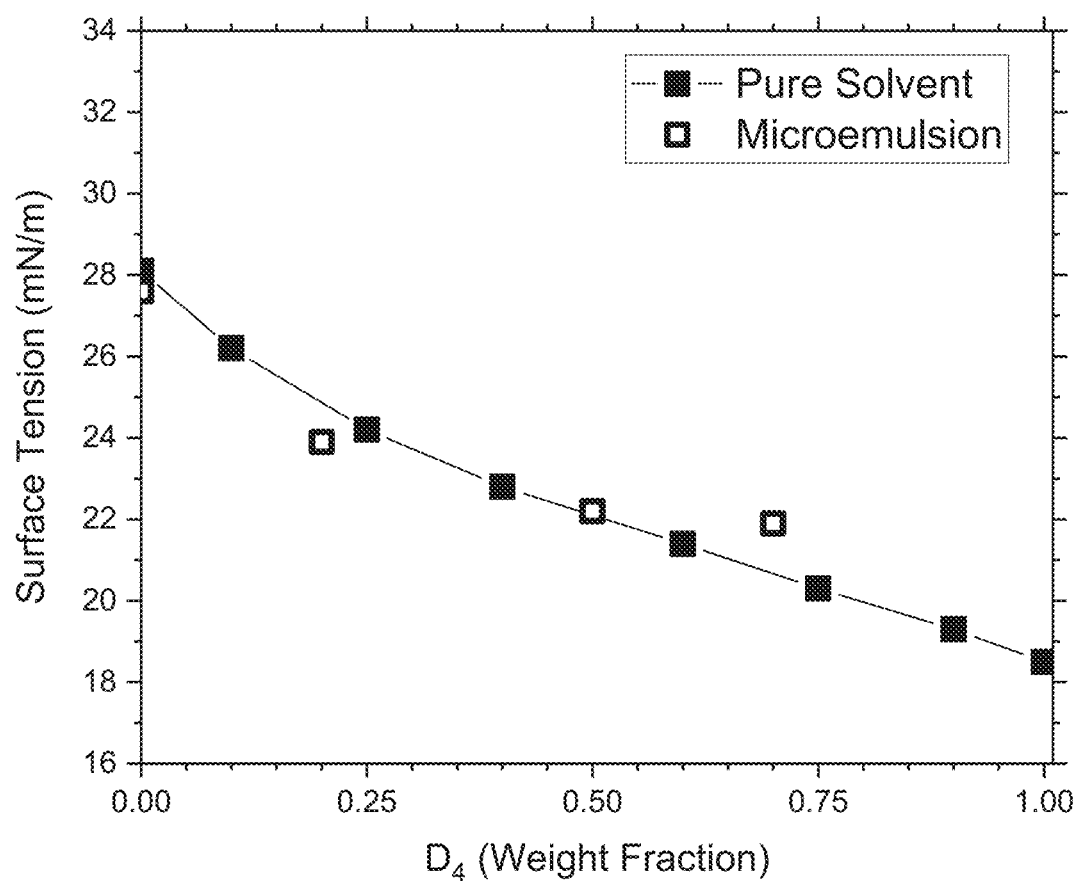

Further diluted microemulsions comprising blends of octamethylcyclotetrasiloxane ($D_4$) and d-limonene in different relative amounts (together totaling 10 wt %) were also prepared and diluted as described in Example 1. FIG. 8 shows the measured surface tensions of these diluted microemulsions at 20° C. as measured by the capillary rise technique and the surface tensions of the solvent blends as measured using the Wilhelmy plate technique. FIG. 8 shows that the measured surface tensions of the diluted microemulsions comprising $D_4$ and d-limonene solvent blends are substantially similar to those of the pure solvent blends for solvent blends comprising a ratio of d-limonene to $D_4$ from 0 to 50 wt % $D_4$. The measured surface tension of the diluted microemulsion comprising a blend of 50 wt % d-limonene and 50 wt % $D_4$ was 22 mN/m. The measured surface tensions of the diluted microemulsions comprising d-limonene and $D_4$ solvent blends at a ratio of 50 to 100 wt % $D_4$ were also 22 mN/m. This shows that diluted microemulsions comprising d-limonene and $D_4$ blends with at least 50 wt % $D_4$ in the solvent blend will lower capillary rise surface tension to 22 mN/m, but a higher ratio of $D_4$ within the solvent blend does not lower the surface tension of the diluted microemulsion below 22 mN/m. Although this represents a substantial reduction in capillary pressure compared to a diluted microemulsion comprising d-limonene, the reduction in surface tension is less than that for compositions of diluted microemulsions comprising siloxane solvents described in Example 12.

EXAMPLE 6

This Example compares the surface tensions of diluted microemulsions comprising heptane and d-limonene solvent blends to the surface tensions of the heptane and d-limonene solvent blends.

Figure 9:
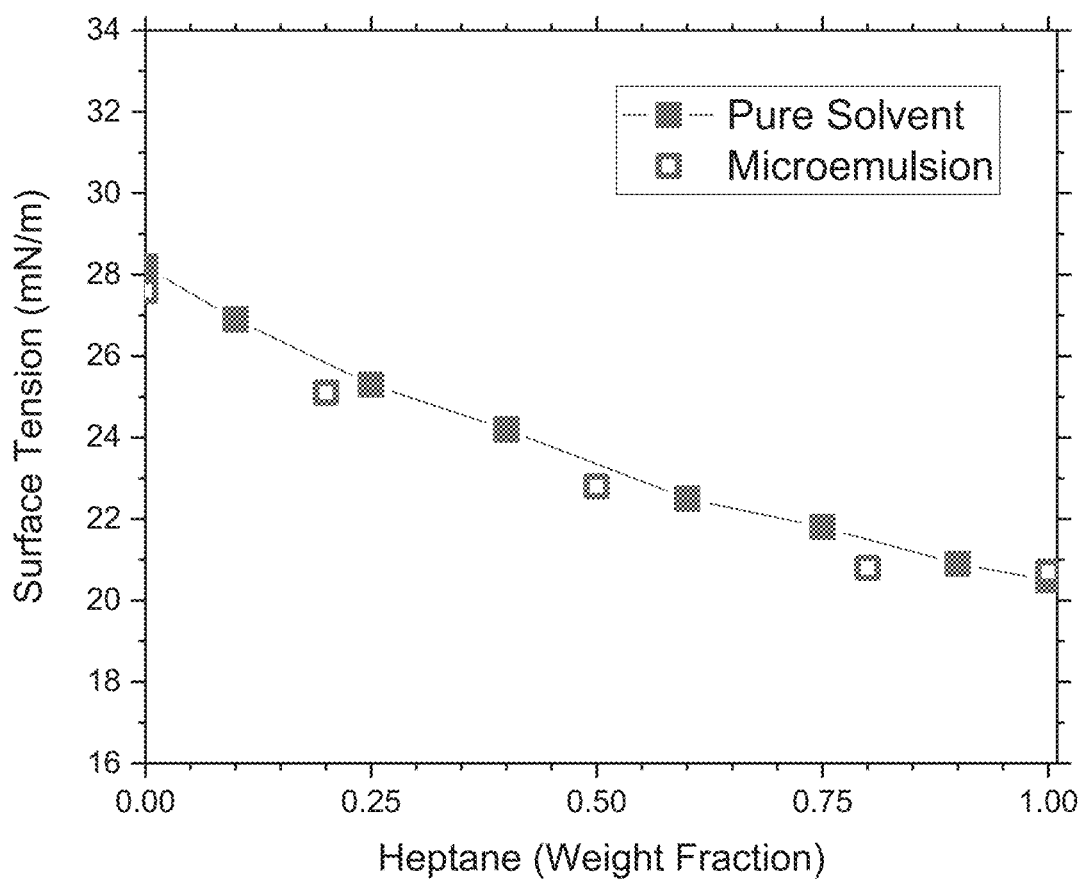

Microemulsions comprising 25 wt % of blends of heptane and d-limonene in various relative amounts, 25 wt % $C_{12}$-$C_{15}$ $E_7$, 25 wt % water, and 25 wt % isopropanol were prepared and diluted as described in Example 1. FIG. 9 shows the measured surface tensions of these microemulsions at 20° C. as measured by the capillary rise technique, and the surface tensions of the solvent blends as measured at 20° C. using the Wilhelmy plate technique. FIG. 9 shows the measured surface tensions of the microemulsions comprising heptane and d-limonene solvent blends have surface tensions substantially similar to those of the solvent blends. Increasing the relative amount of heptane within the solvent blend is observed to cause a decrease in the surface tension of the diluted microemulsion. However, the diluted microemulsions comprising blends of d-limonene with heptane are not observed to have surface tensions below the diluted microemulsion comprising heptane. A diluted microemulsion comprising heptane has a surface tension of 21 mN/m, lower than the surface tensions of diluted microemulsions comprising heptane and d-limonene blends, and so would most likely lower the capillary pressure in a gas well to a greater extent than a diluted microemulsion comprising a blend of heptane and d-limonene.

EXAMPLE 7

This Example compares the surface tensions of diluted microemulsions comprising various solvents and surfactants to the surface tension of otherwise identical compositions lacking the solvents.

Microemulsions comprising various solvents, various surfactants, water, and isopropanol were prepared. For each microemulsion, one of the various solvents, one of the various surfactants, water, and isopropanol were combined to form a microemulsion comprising 20 wt % of the solvent, 20 wt % water, 30 wt % isopropanol, and 30 wt % of the surfactant. The microemulsion was then added to water comprising 2 wt %/vol KCl to form a diluted microemulsion comprising the microemulsion in an amount of 2 gpt. The water comprising the 2 wt %/vol KCl was stirred with a stir bar as the microemulsion was added. Otherwise equivalent compositions lacking the solvents and including 40 wt % water (diluted surfactant solutions) were also prepared by this procedure. The various solvents included in the diluted microemulsions were alpha-terpineol, alpha-pinene, d-limonene, methyl laurate, and o-xylene. The various surfactants included in the diluted microemulsions were $C_{12}$-$C_{15}$ $E_7$ and $C_{12}$-$C_{18}$ $E_{10}$. The surface tension of each diluted microemulsion at 20° C. and each diluted surfactant solution at 20° C. was measured using the capillary rise technique.

Figure 10A:
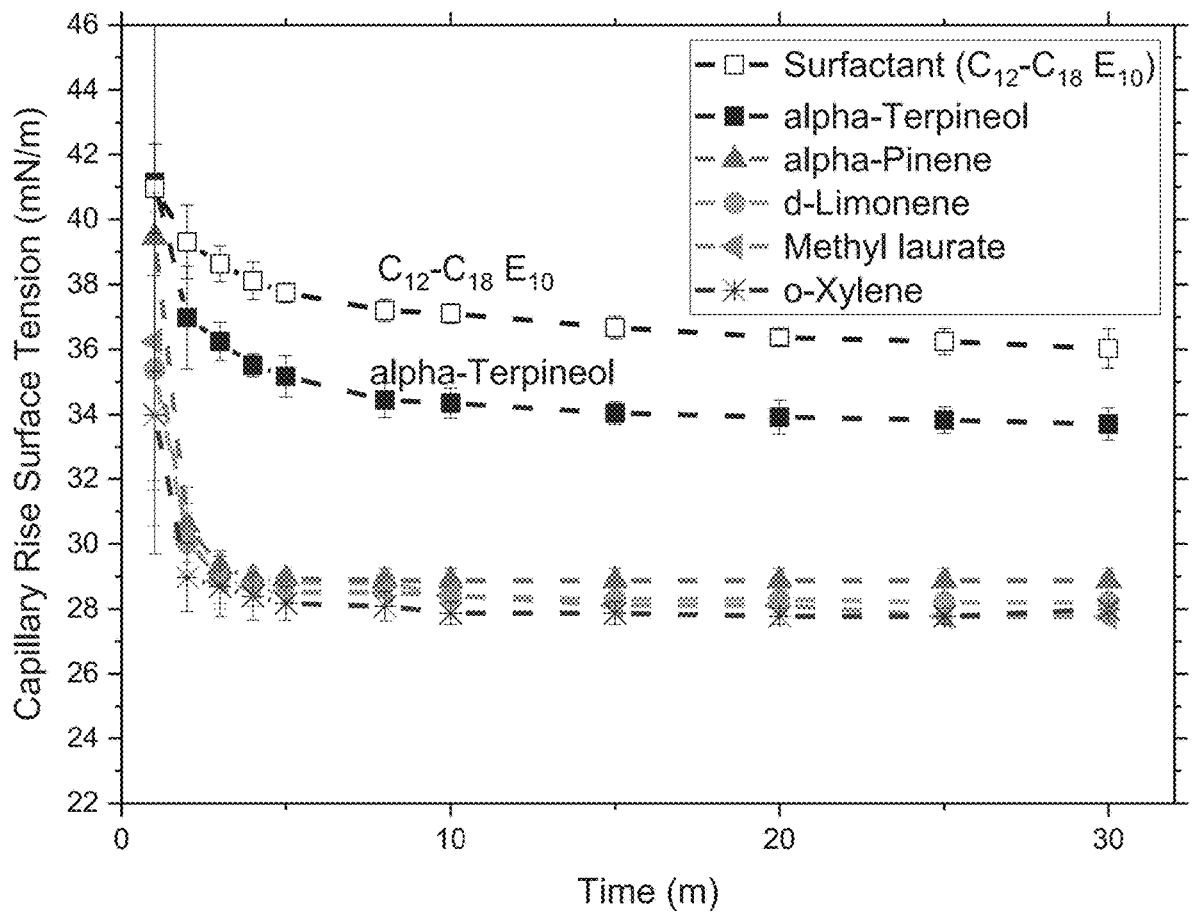
FIGS. 10A-10B (FIGS. 10A-10B) show plots showing surface tensions measured using the capillary rise technique for a variety of diluted microemulsions and diluted surfactant solutions, according to some embodiments.
Figure 10B:
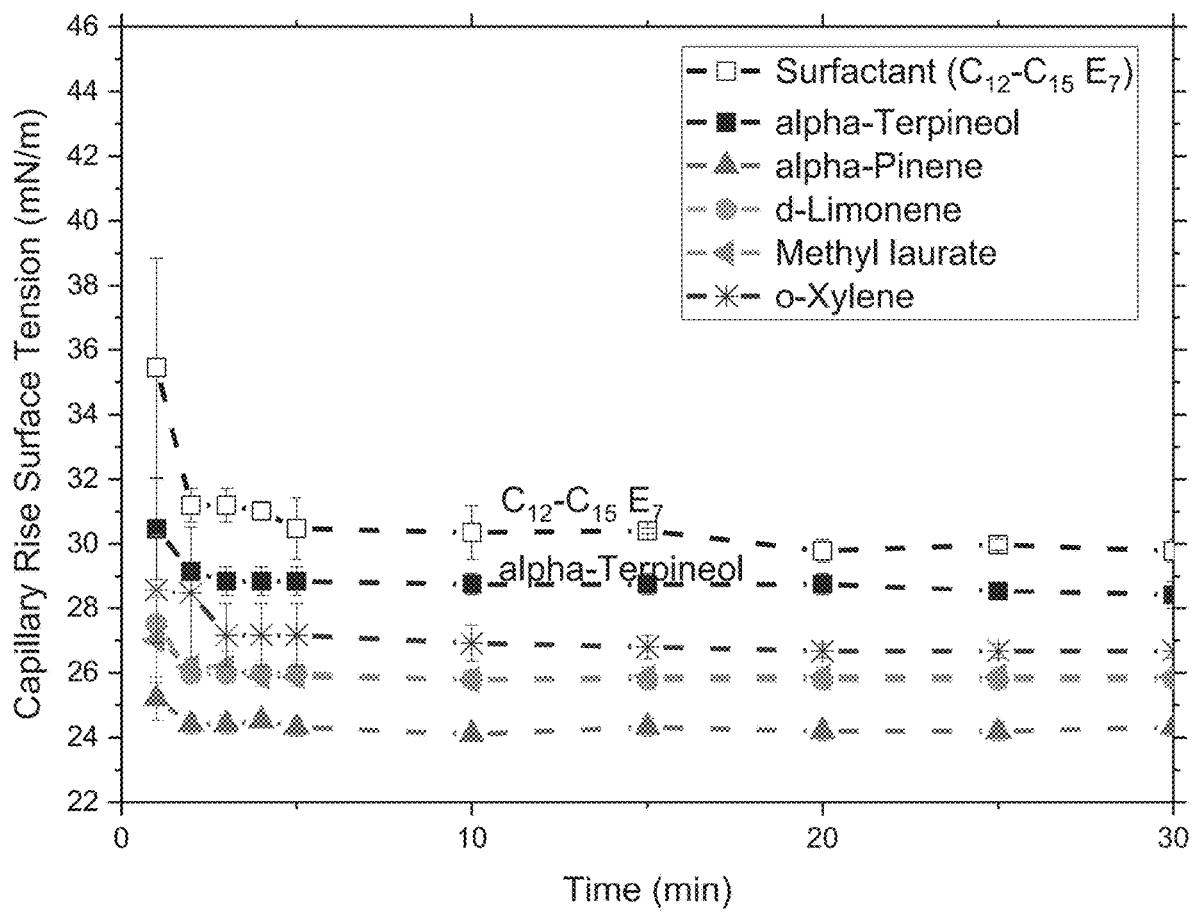
Figure 10C:
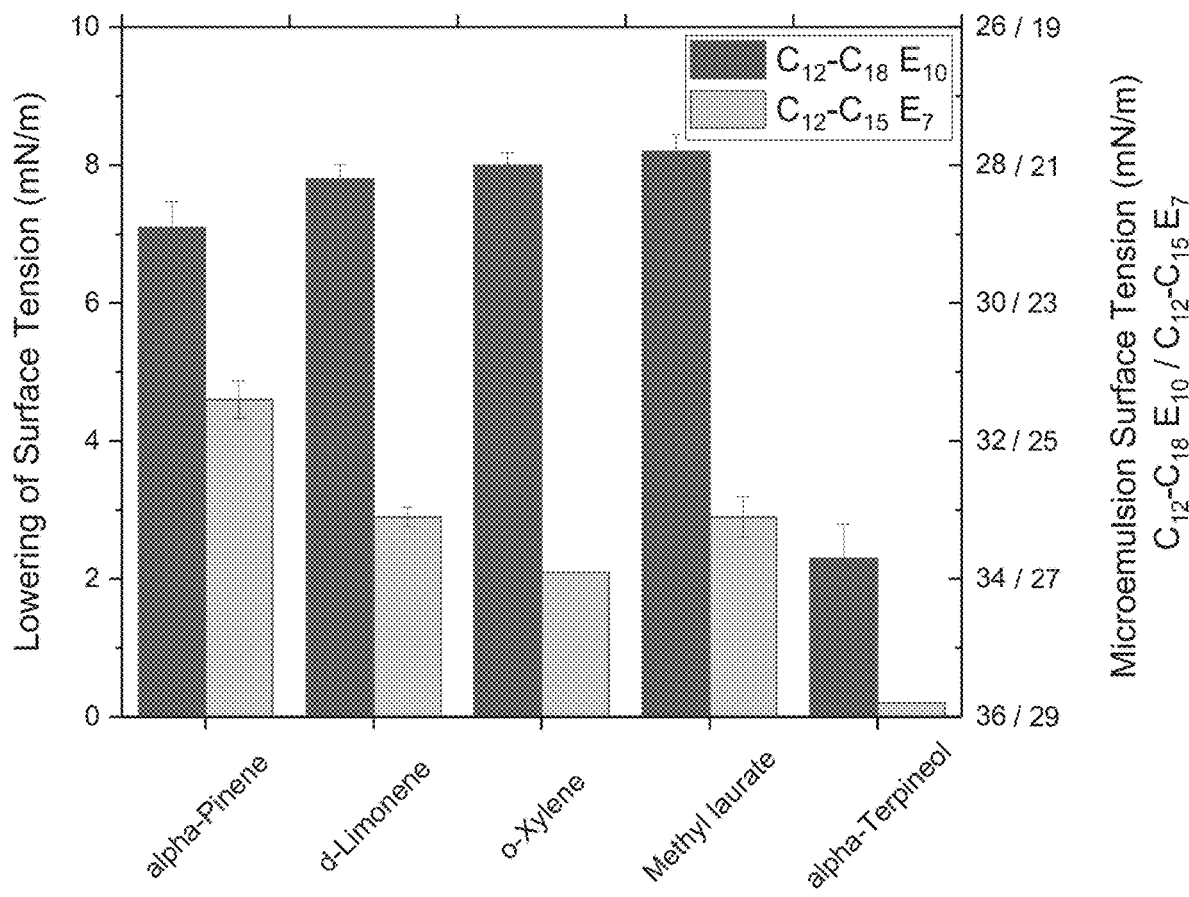
FIG. 10C (FIG. 10C) shows a plot showing surface tensions measured using the capillary rise technique for a variety of diluted microemulsions, according to some embodiments.

FIG. 10A shows the measured surface tensions of the diluted microemulsions comprising $C_{12}$-$C_{18}$ $E_{10}$. FIG. 10B shows the measured surface tensions of the diluted microemulsions comprising $C_{12}$-$C_{15}$ $E_7$, and FIG. 10C shows both the amount by which each solvent lowered the surface tension of diluted microemulsion and the surface tension of each diluted microemulsion. As can be seen from these Figures, for each of the solvents tested, the presence of the solvent in the diluted microemulsion lowered the measured surface tension in comparison to the otherwise equivalent surfactant solution lacking the solvent. Compositions including $C_{12}$-$C_{18}$ $E_{10}$, which has a higher surface tension than $C_{12}$-$C_{15}$ $E_7$, exhibited a larger reduction in measured surface tension upon solvent addition than otherwise equivalent compositions including $C_{12}$-$C_{15}$ $E_7$. Although the magnitude of surface tension lowering for the diluted microemulsions comprising the inefficient surfactant $C_{12}$-$C_{18}$ $E_{10}$ are substantial, the diluted microemulsions have surface tensions of 28-29 mN/m. These diluted microemulsion surface tensions are comparable to those of the more efficient surfactant solution $C_{12}$-$C_{15}$ $E_7$, and may be sufficiently high to not result in appreciable lowering the capillary pressure of a gas well. The surfactant $C_{12}$-$C_{15}$ $E_7$ is highly efficient and is more useful in a gas well treatment. The diluted microemulsions including $C_{12}$-$C_{15}$ $E_7$ and a solvent had lower surface tensions than the otherwise equivalent diluted microemulsions including $C_{12}$-$C_{18}$ $E_{10}$. Surface tensions of the diluted microemulsions comprising $C_{12}$-$C_{15}$ $E_7$ with d-limonene, o-xylene, and methyl laurate were 26-27 mN/m, which may be sufficiently high to not result in a reduction in capillary pressure comparable to that of an efficient surfactant for a gas well treatment. Prior examples above describe diluted microemulsions comprising hydrocarbon solvents with the $C_{12}$-$C_{12}$ $E_7$ surfactant that have a much greater reduction in surface tension.

EXAMPLE 8

This Example compares the surface tensions of diluted microemulsions comprising various solvents and surfactants to the surface tension of the pure solvents.

Microemulsions comprising 20 wt % of various solvents, 30 wt % of various surfactants, 20 wt % water, and 30 wt % isopropanol were prepared and diluted to 2 gpt concentration as described in Example 7. The various solvents included in the diluted microemulsions were alpha-terpineol, alpha-pinene, d-limonene (d-L), methyl laurate, and o-xylene. The various surfactants included in the diluted microemulsions were $C_{12}$-$C_{15}$ $E_7$, $C_{12}$-$C_{18}$ $E_{10}$, and an alcohol ethoxylate surfactant with a hydrocarbon group of 12 carbon atoms and an ethoxylate group of 7 ethylene oxide units ($C_{12}$ $E_7$). The surface tension of each diluted microemulsion at 20° C. was measured using the capillary rise technique. The surface tension of each of the pure solvents at 20° C. was measured using the Wilhelmy plate technique.

Figure 11:
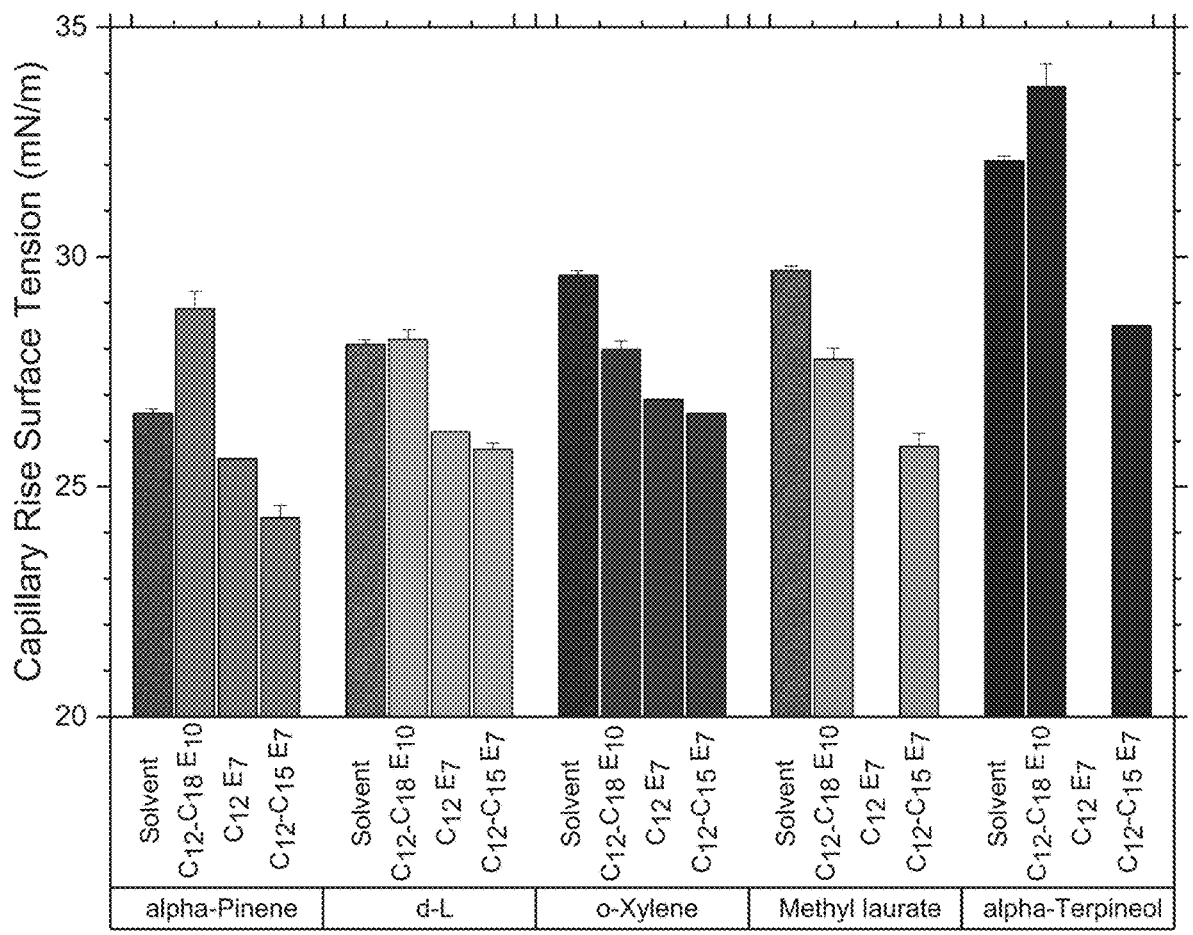
FIG. 11 (FIG. 11) shows a plot showing surface tensions measured using the capillary rise technique for a variety of diluted microemulsions and surface tensions measured using the Wilhelmy plate technique for a variety of pure solvents, according to some embodiments.

FIG. 11 shows the measured surface tensions of the various diluted microemulsions and pure solvents. For each solvent and surfactant combination, the surface tension of the diluted microemulsion comprising the solvent was within 4 mN/m of the surface tension of the solvent. However, the surface tension of the diluted microemulsion comprising the solvent is not the same as the pure solvent, and so may be challenging to predict from the surface tension of the pure solvent. The surface tension is higher than the solvent for some combinations of solvent and surfactant and lower than the solvent for other combinations of solvent and surfactant. Not all combinations of solvent and surfactant result in a diluted microemulsion which substantially lowers the surface tension compared to the equivalent pure surfactant solution. The lowest surface tension for each solvent was obtained with a diluted microemulsion comprising $C_{12}$-$C_{15}$ $E_7$. However, diluted microemulsions comprising d-limonene, o-xylene, methyl laurate, and alpha-terpineol with $C_{12}$-$C_{15}$ $E_7$ had surface tensions of 26-29 mN/m. It is thus believed that these microemulsions will be less useful for lowering capillary pressure and reducing water blocks within a gas well treatment than diluted microemulsions comprising hydrocarbons described previously, which have lower surface tensions.

EXAMPLE 9

This Example compares the surface tensions of diluted microemulsions comprising various solvents at varying levels of dilution.

Microemulsions comprising 20 wt % of either o-xylene or d-limonene, 30 wt % $C_{12}$-$C_{18}$ $E_{10}$, 20 wt % water, and 30 wt % isopropanol were prepared as described in Example 7. Each microemulsion was diluted to form diluted microemulsions comprising the microemulsion in varying amounts. An otherwise equivalent composition lacking o-xylene and d-limonene and including 40 wt % water was also prepared as described in Example 7. This composition was also diluted in varying amounts to form diluted surfactant solutions. The surface tension of each diluted microemulsion at 20° C. and the surface tension of the diluted surfactant solution at 20° C. was measured using the capillary rise technique.

Figure 12:
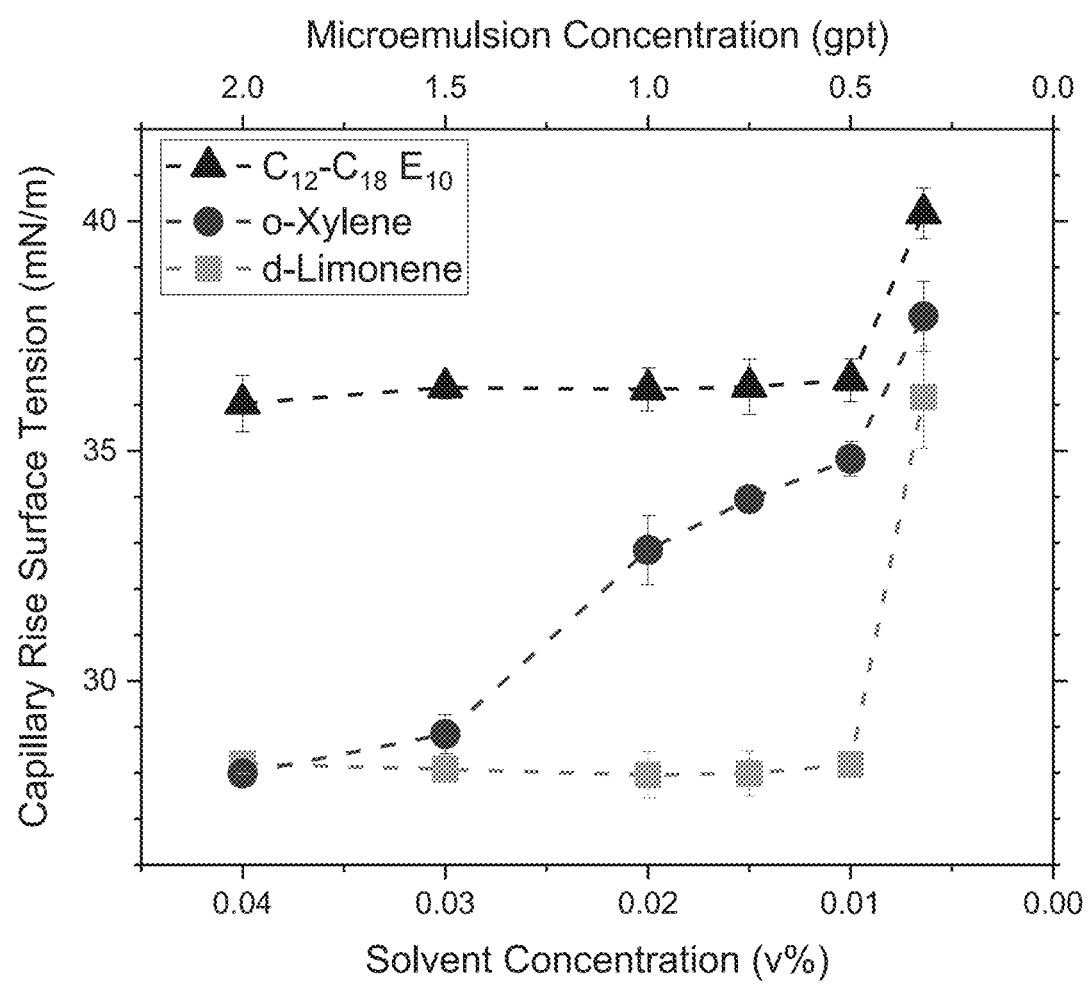
FIG. 12 (FIG. 12) shows a plot showing surface tensions measured using the capillary rise technique for diluted microemulsions comprising d-limonene and diluted surfactant solutions lacking d-limonene, according to some embodiments.

FIG. 12 shows the measured surface tensions of the diluted microemulsions and the diluted surfactant solutions. For both the diluted microemulsion and diluted surfactant solutions, as the degree of dilution decreased (i.e., as the amount of the microemulsion or surfactant solution in the diluted microemulsion or surfactant solution increased), the measured surface tension decreased. The decrease in surface tension with decreasing degree of dilution was sharpest at higher degrees of dilution, and leveled off at lower degrees of dilution. The greatest reduction in surface tension was obtained with the highest final concentration of diluted microemulsion, which was 2 gpt. Across the 0.5-2 gpt diluted microemulsion concentration range that is common for gas well treatments, the diluted microemulsions comprising d-limonene and o-xylene lowered the surface tension relative to the pure surfactant solution. However, the diluted microemulsions always had surface tensions greater than or equal to 28 mN/m, which is greater than those of the highly efficient surfactant solutions and diluted microemulsions comprising hydrocarbons mentioned in other Examples. Increasing the dilution factor of a diluted microemulsion comprising d-limonene or o-xylene was not observed to make the diluted microemulsion more effective at lowering surface tension and reducing water blocks in a gas well treatment.

EXAMPLE 10

This Example compares the surface tensions of diluted microemulsions comprising various solvents in various amounts.

Microemulsions comprising 25 wt % $C_{12}$-$C_{15}$ $E_7$, 25 wt % isopropanol, and a combination of water and solvents totaling 50 wt % were prepared and diluted as described in Example 7. The surface tension of each diluted microemulsion at 20° C. was measured using the capillary rise technique. Table 3, below, shows the various diluted microemulsions and their measured surface tensions. As shown in Table 3, varying the amount of solvent in the microemulsion does not have a strong effect on the measured surface tension of the diluted microemulsion for amounts of solvent in excess of 5 wt % of the microemulsion. Diluted microemulsions comprising 5-25 wt % d-limonene and blends of d-limonene with alpha-terpineol do not lower the surface tension below 25-26 mN/m. The d-limonene and blends comprising d-limonene with alpha-terpineol do not result in diluted microemulsions with sufficiently low surface tension to be expected to substantially lower capillary pressure and reduce water blocks in a gas well treatment compared with an efficient conventional surfactant.

TABLE 3

| Sample no. | Type of solvent | wt % solvent | Measured surface tension (mN/m) |
|---|---|---|---|
| 1 | d-limonene | 25 | 25 |
| 2 | d-limonene | 10 | 26 |
| 3 | d-limonene | 5 | 26 |
| 4 | 1:1 wt % blend of d-limonene and alpha-terpineol | 25 | 32 |
| 5 | 1:1 wt % blend of d-limonene and alpha-terpineol | 10 | 26 |
| 6 | 1:1 wt % blend of d-limonene and alpha-terpineol | 5 | 26 |
| 7 | 1:1 wt % blend of d-limonene and octanol | 25 | 26 |
| 8 | 1:1 wt % blend of d-limonene and octanol | 10 | 26 |

EXAMPLE 11

This Example describes the prediction of the surface tensions of diluted microemulsions at higher temperatures and pressures such as might be encountered in the producing formation of a gas well (the bottom hole temperature and pressure). The calculation illustrates how to predict the surface tension of a diluted microemulsion at 60° C. based on measurements of surface tension at 20° C. and vapor pressure at 20° C. of a solvent therein, and compares the predicted values for surface tension to values of surface tension measured at 60° C. using the capillary rise technique.

Figure 13:
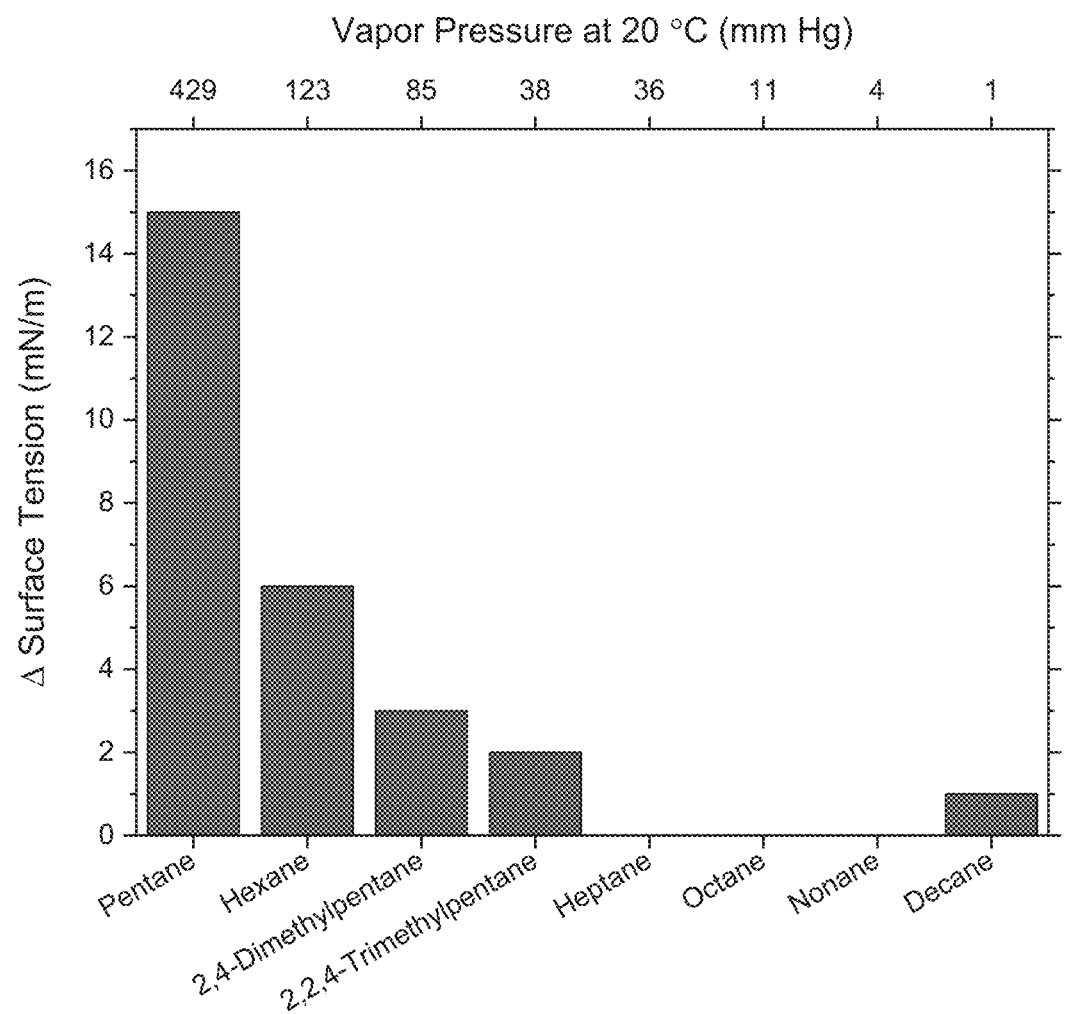
FIG. 13 (FIG. 13) shows a plot showing the difference between surface tensions of diluted microemulsions measured using the capillary rise technique and surface tensions of solvents therein, according to some embodiments.
Figure 14:
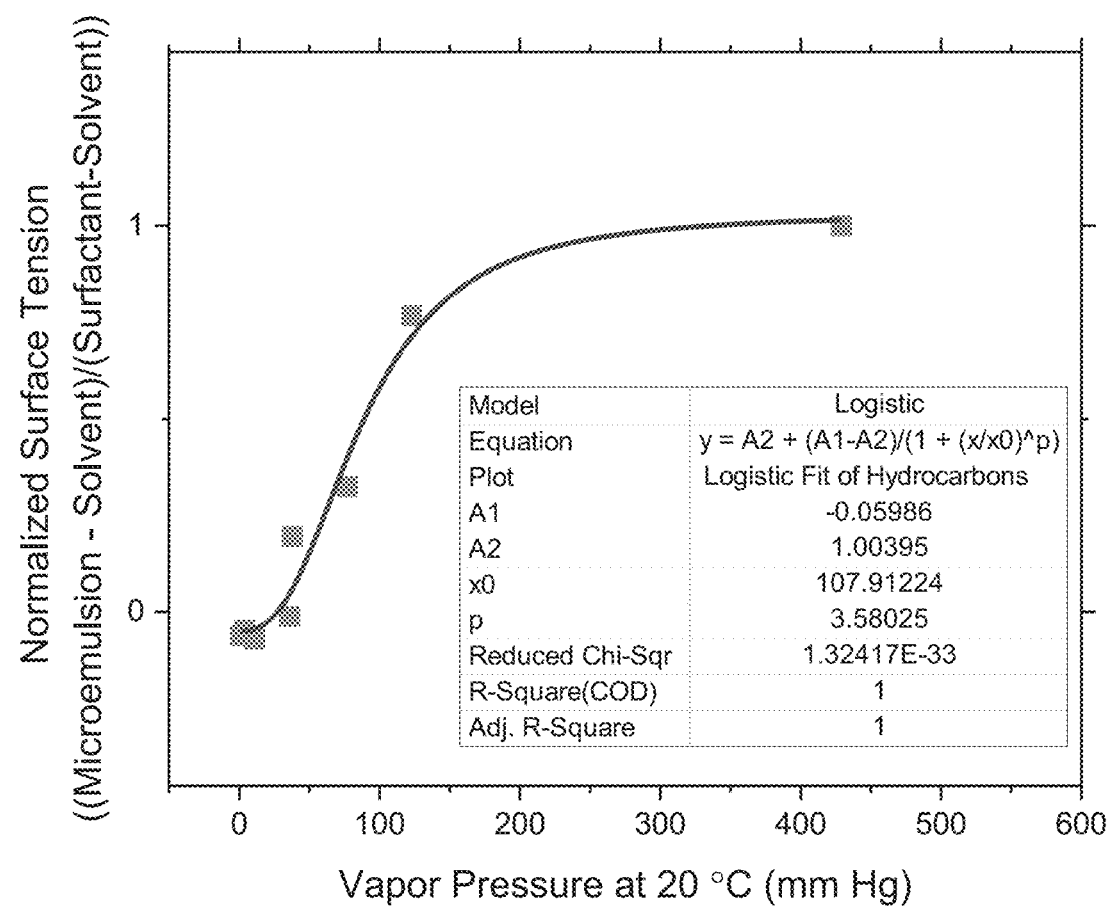
FIG. 14 (FIG. 14) shows a plot showing a model fit to the normalized difference between the surface tension of a diluted microemulsion measured using the capillary rise technique and the surface tension of a solvent therein as a function of vapor pressure of the solvent therein, according to some embodiments.

Microemulsions comprising a solvent, a surfactant, and water were prepared and then diluted into aqueous phases to form diluted microemulsions. The surface tensions of the diluted microemulsions at 20° C. were measured using the capillary rise technique, and the surface tensions of the pure solvents at 20° C. were measured using the Wilhelmy plate technique. The difference between the measured surface tension of each diluted microemulsion and the measured surface tension of the solvent therein are shown in FIG. 13. As can be seen from FIG. 13, the difference between the measured surface tension of the diluted microemulsion and the measured surface tension of the solvent therein increased as the vapor pressure of the solvent increased. FIG. 14 shows a model fit to the normalized difference between the surface tension of a diluted microemulsion measured using the capillary rise technique and the surface tension of a solvent therein as a function of vapor pressure of the solvent therein.

Figure 15:
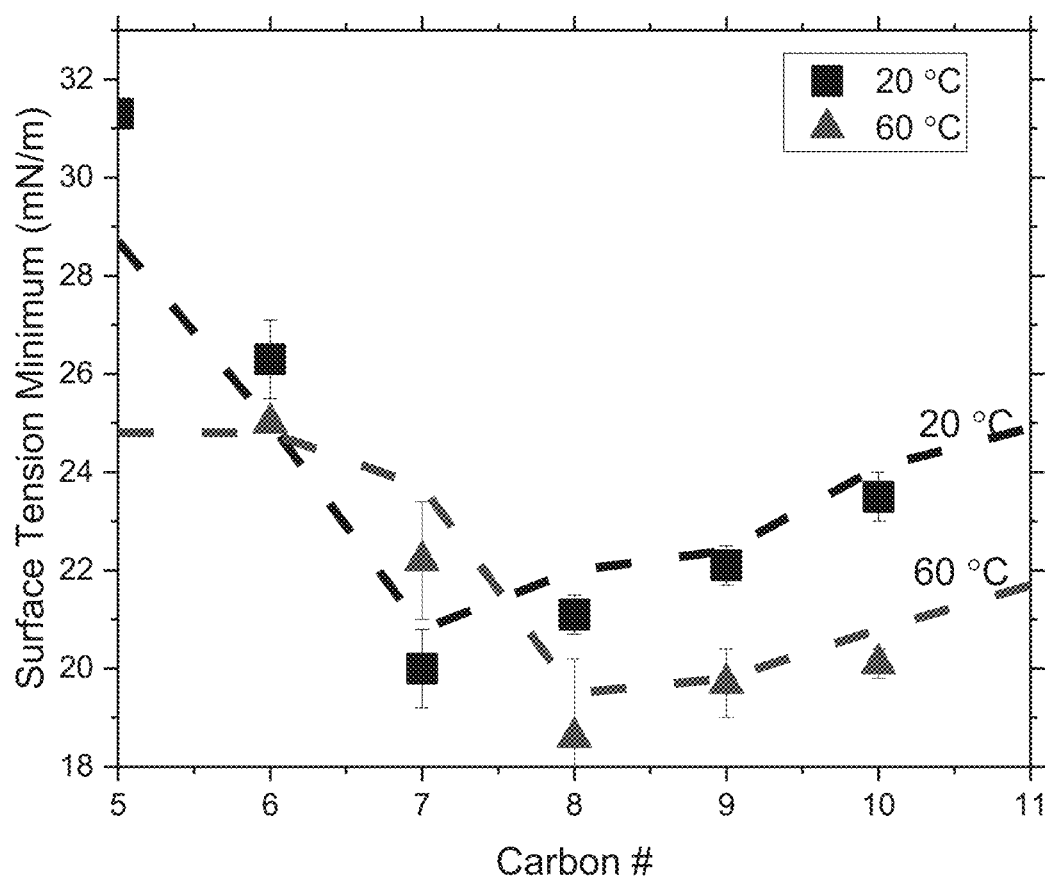
FIG. 15 (FIG. 15) shows the predicted surface tensions of a variety of diluted microemulsions and the actual surface tensions of these microemulsions measured using the capillary rise technique, according to some embodiments.

The Clausius-Clapeyron equation was used to predict the vapor pressures of the solvents at 60° C. based on their vapor pressures at 20° C. The surface tensions of the solvents at 60° C. were predicted based on their surface tensions at 20° C. and the relationship between surface tension and temperature described in Grigoryev, B. A., Nemzer, B. V., Kurumov, D. S. & Sengers, J. V. Surface tension of normal pentane, hexane, heptane, and octane. *Int. J. Thermophys.* (1992), in which the surface tension of the solvent is predicted to decrease by approximately 1 mN/m for every 18-19° F. increase in temperature. The model fit shown in FIG. 14 was used to predict the surface tension of each diluted microemulsion at 60° C. based on the predicted vapor pressure and surface tension at 60° C. of the solvent therein. The surface tension of each diluted microemulsion at 60° C. was also measured using the capillary rise technique. FIG. 15 shows the predicted surface tension of each diluted microemulsion at 20° C. and at 60° C. (dashed lines) and the measured surface tension of each diluted microemulsion at 20° C. and at 60° C. (data points). As can be seen in FIG. 15, the predicted surface tensions of the diluted microemulsions match the measured surface tensions of the diluted microemulsions fairly well.

This Example shows that the lowering of surface tensions that are disclosed for certain solvents incorporated into diluted microemulsions would also occur at the higher temperatures and pressures in the hydrocarbon gas producing formation (e.g., at the bottom hole temperature and pressure of the gas well).

Diluted microemulsions comprising linear $C_6$-$C_{10}$ solvents are able to substantially lower the surface tension relative to a pure surfactant solution, which it is believed enables them to lower the capillary pressure and reduce water blocks in a gas well treatment, which leads to increased gas production from the gas well. The diluted microemulsions comprising $C_6$-$C_{10}$ solvents have an even greater effect on surface tension at the higher temperature. At 60° C., which is representative of the bottom hole temperature within certain gas wells, the diluted microemulsions have surface tensions of 18-25 mN/m, providing strong evidence that the diluted microemulsions comprising $C_6$-$C_{10}$ solvents will substantially lower the capillary pressure and reduce water blocks in a gas well treatment, which leads to increased gas production from the gas well.

EXAMPLE 12

This Example compares the surface tensions of diluted microemulsions comprising various solvents.

Microemulsions comprising 3.4 wt % siloxane solvent, 16.2 wt % $C_{12}$-$C_{15}$ $E_7$ surfactant, 16.2 wt % isopropanol, and a combination of water and isooctanol totaling 64.2 wt % were prepared and diluted as described in Example 1. The surface tension of each diluted microemulsion at 20° C. was measured using the rising bubble technique. Table 4, below, shows the various diluted microemulsions and their measured surface tensions. As shown in Table 4, diluted microemulsions comprising siloxane solvents had substantially lower surface tensions than an otherwise equivalent surfactant solution lacking the siloxane solvents. The surfactant solution of alcohol ethoxylate $C_{12}$-$C_{15}$ $E_7$ and isooctanol had a surface tension of 26 mN/m, while the surface tensions of the diluted microemulsions comprising siloxane solvent were 17-25 mN/m. It is thus believed that the diluted microemulsions comprising siloxane solvents would significantly lower capillary pressure and reduce water blocks within a gas well treatment, which leads to increased gas production from the gas well.

TABLE 4

| Sample Number | Composition | Measured surface tension (mN/m) |
| --- | --- | --- |
| 9 | Diluted alcohol ethoxylate ($C_{12}$-$C_{15}$ $E_7$) and isooctanol surfactant solution | 26 |
| 10 | Diluted microemulsion comprising alcohol ethoxylate ($C_{12}$-$C_{15}$ $E_7$), isooctanol, and hexamethyldisiloxane | 17 |
| 11 | Diluted microemulsion comprising alcohol ethoxylate ($C_{12}$-$C_{15}$ $E_7$), isooctanol, and octamethylcyclotetrasiloxane | 19 |
| 12 | Diluted microemulsion comprising alcohol ethoxylate ($C_{12}$-$C_{15}$ $E_7$), isooctanol, and decamethylcyclopentasiloxane | 19 |
| 13 | Diluted microemulsion comprising alcohol ethoxylate ($C_{12}$-$C_{15}$ $E_7$), isooctanol, and polydimethylsiloxane 2 cSt | 21 |
| 14 | Diluted microemulsion comprising alcohol ethoxylate ($C_{12}$-$C_{15}$ $E_7$), isooctanol, and polydimethylsiloxane 3 cSt | 25 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, e.g. elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, e.g. the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element or a list of elements. In general, the term "or" as used herein shall only be interpreted as indicating exclusive alternatives (e.g. "one or the other but not both") when preceded by terms of exclusivity, such as "either," "one of," "only one of," or "exactly one of," "Consisting essentially of," when used in the claims, shall have its ordinary meaning as used in the field of patent law.

As used herein in the specification and in the claims, the phrase "between" in reference to a range of elements or a range of units should be understood to include the lower and upper range of the elements or the lower and upper range of the units, respectively. For example, the phrase describing a molecule having "between 6 to 12 carbon atoms" should mean a molecule that may have, e.g., from 6 carbon atoms to 12 carbon atoms, inclusively. For example, the phrase describing a composition comprising "between about 5 wt % and about 40 wt % surfactant" should mean the composition may have, e.g., from about 5 wt % to about 40 wt % surfactant, inclusively.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, e.g. to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A microemulsion suitable for treating a gas well, comprising:
    an aqueous phase;
    a surfactant; and
    a non-aqueous phase comprising a combination of solvents,
    wherein the combination of solvents comprises one or more methylated cyclic alkane solvents and/or one or more methyl siloxane solvents of less than or equal to 800 g/mol molecular weight; and
    wherein the combination of solvents further comprises linanool, geraniol, nopol, menthol, eucalyptol, 1,8-cineol, a terpene containing an aldehyde, a terpene containing an ether, and/or a terpene containing a ketone.

2. The microemulsion of claim 1, wherein the combination of solvents further comprises one or more $C_6$-$C_{10}$ linear or branched alkane solvents comprising one or more of hexane, heptane, octane, isooctane, nonane, decane, isomers of methylpentane, isomers of dimethylpentane, isomers of trimethylpentane, and/or 4-methylheptane.

3. The microemulsion of claim 1, wherein the one or more methylated cyclic alkane solvents comprise one or more of methylcyclopentane, dimethylcyclopentane, methylcyclohexane, dimethylcyclohexane, trimethylcyclohexane, methylcycloheptane, and/or isopropylcyclohexane.

4. The microemulsion of claim 1, wherein the one or more methyl siloxane solvents of less than or equal to 800 g/mol molecular weight comprise one or more of hexamethyldisiloxane, octamethyltrisiloxane, decamethyltetrasiloxane, dodecamethylpentasiloxane, tetradecamethylhexasiloxane, hexadecamethylheptasiloxane, octamethylcyclotetrasiloxane, decamethylcyclopentasiloxane trimethylsiloxy-terminated 2 cSt polydimethylsiloxane, and/or trimethylsiloxy terminated 3 cSt polydimethylsiloxane.

5. The microemulsion of claim 1, wherein the surfactant comprises one or more of an alcohol ethoxylate comprising a hydrocarbon group of 12 to 15 carbon atoms and 7 ethylene oxide units, castor oil with 30 ethylene oxide units, an alcohol ethoxylate comprising a hydrocarbon of 12 to 18 carbon atoms and 10 ethylene oxide units, tristyrylphenol with 16 ethylene oxide units, an alcohol ethoxylate comprising a hydrocarbon of 12 to 15 carbon atoms and 9 ethylene oxide units, an alcohol ethoxylate comprising a hydrocarbon of 12 to 15 carbon atoms and 12 ethylene oxide units, and/or an alcohol ethoxylate comprising a hydrocarbon with 12 carbon atoms and 7 ethylene oxide units.

6. The microemulsion of claim 1, wherein the surfactant comprises a nonionic surfactant.

7. The microemulsion of claim 6, wherein the nonionic surfactant comprises an alkyl polyglycoside surfactant.

8. The microemulsion of claim 1, wherein the surfactant comprises an anionic surfactant.

9. The microemulsion of claim 1, wherein the surfactant comprises a cationic surfactant.

10. The microemulsion of claim 1, wherein the surfactant comprises a zwitterionic surfactant.

11. The microemulsion of claim 10, wherein the zwitterionic surfactant comprises a betaine surfactant.

12. The microemulsion of claim 1, wherein the combination of solvents has a vapor pressure of less than or equal to 130 mm Hg at 20° C.

13. The microemulsion of claim 1, wherein the combination of solvents has a vapor pressure of less than or equal to 20 mm Hg at 20° C.

14. The microemulsion of claim 1, wherein the combination of solvents has a vapor pressure of less than or equal to 2 mm Hg at 20° C.

15. The microemulsion of claim 1, wherein the microemulsion further comprises a paraffin control additive.

16. The microemulsion of claim 1, wherein the combination of solvents further comprises one or more $C_6$-$C_{10}$ linear or branched alkane solvents.

17. A microemulsion suitable for treating a gas well, comprising:
    an aqueous phase, a surfactant, and a non-aqueous phase comprising a combination of solvents,
    wherein the microemulsion has a surface tension of less than or equal to 24 mN/m and greater than or equal to 15 mN/m as measured by a capillary rise technique or a rising bubble technique, and wherein the combination of solvents comprises linanool, geraniol, nopol, menthol, eucalyptol, 1,8-cineol, a terpene containing an aldehyde, a terpene containing an ether, and/or a terpene containing a ketone; and wherein the combination of solvents further comprises one or more methylated cyclic alkane solvents and/or one or more methyl siloxane solvents of less than or equal to 800 g/mol molecular weight.

18. The microemulsion of claim 17, wherein the surface tension is less than or equal to 24 mN/m and greater than or equal to 23 mN/m as measured by the capillary rise technique or the rising bubble technique.

19. The microemulsion of claim 17, wherein the surface tension is less than or equal to 23 mN/m and greater than or equal to 20 mN/m as measured by the capillary rise technique or the rising bubble technique.

20. The microemulsion of claim 17, wherein the surface tension is less than or equal to 20 mN/m and greater than or equal to 18 mN/m as measured by the capillary rise technique or the rising bubble technique.

21. The microemulsion of claim 17, wherein the surface tension is less than or equal to 18 mN/m and greater than or equal to 15 mN/m as measured by the capillary rise technique or the rising bubble technique.

* * * * *